US011083967B1

(12) United States Patent
Summit

(10) Patent No.: US 11,083,967 B1
(45) Date of Patent: Aug. 10, 2021

(54) VIRTUAL REALITY HAPTIC SYSTEM AND APPARATUS

(71) Applicant: Scott Summit, Mill Valley, CA (US)

(72) Inventor: Scott Summit, Mill Valley, CA (US)

(73) Assignee: Ethereal Matter, Inc., Mill Valley, CA (US)

( * ) Notice: Subject to any disclaimer, the term of this patent is extended or adjusted under 35 U.S.C. 154(b) by 0 days.

(21) Appl. No.: 15/930,311

(22) Filed: May 12, 2020

Related U.S. Application Data

(63) Continuation-in-part of application No. 16/603,690, filed as application No. PCT/US2018/028423 on Apr. 19, 2018, application No. 15/930,311, which is a continuation-in-part of application No. 16/095,016, filed as application No. PCT/US2017/028460 on Apr. 19, 2017, now Pat. No. 10,646,768.

(60) Provisional application No. 62/324,519, filed on Apr. 19, 2016.

(51) Int. Cl.
| | |
|---|---|
| *A63F 13/65* | (2014.01) |
| *A63F 13/285* | (2014.01) |
| *G06F 3/01* | (2006.01) |
| *A63B 21/00* | (2006.01) |

(52) U.S. Cl.
CPC ........ *A63F 13/65* (2014.09); *A63B 21/00181* (2013.01); *A63F 13/285* (2014.09); *G06F 3/011* (2013.01); *G06F 3/016* (2013.01); *A63F 2300/1037* (2013.01); *A63F 2300/8082* (2013.01); *G06F 2203/012* (2013.01); *G06F 2203/013* (2013.01)

(58) Field of Classification Search
CPC ............. A63F 13/65; A63F 13/285; A63F 2300/1037; A63F 2300/8082; A63F 13/28; G06F 3/011; G06F 3/016; G06F 2203/012; G06F 2203/013; A63B 21/00181; A63B 22/0076; A63B 22/06; A63B 71/0622; A63B 2071/0636; A63B 2071/0638; A63B 2071/0644; A63B 2071/0655; G06T 19/006
See application file for complete search history.

(56) References Cited

U.S. PATENT DOCUMENTS

| | | | | |
|---|---|---|---|---|
| 6,162,189 | A * | 12/2000 | Girone | G16H 20/30 600/592 |
| 10,646,768 | B2 * | 5/2020 | Summit | A63B 24/00 |
| 2009/0011907 | A1 * | 1/2009 | Radow | A63B 24/0084 482/57 |
| 2011/0082009 | A1 * | 4/2011 | Ranky | A63B 24/0062 482/8 |
| 2018/0290017 | A1 * | 10/2018 | Fung | G06F 3/011 |

\* cited by examiner

*Primary Examiner* — Jeffery A Brier
(74) *Attorney, Agent, or Firm* — Staniford Tomita LLP

(57) ABSTRACT

A virtual reality (VR) system includes a VR display and a VR movement apparatus that includes hand user interfaces (UIs) and foot UIs that can support the hands, feet, and total weight of a user. The VR movement apparatus allow the user's hands and feet to move in 3-dimensional space that include vertical, lateral, and fore-aft direction movements. A computer running VR software coordinate and synchronizes the VR movement apparatus and the VR display to provide system users with simulated activities in a VR environment.

20 Claims, 39 Drawing Sheets

VIRTUAL REALITY HAPTIC SYSTEM AND APPARATUS

CROSS REFERENCE TO RELATED APPLICATIONS

This application is a continuation in part (CIP) application of U.S. patent application Ser. No. 16/095,016, "Virtual Reality Haptic System And Apparatus" filed Oct. 19, 2018, now U.S. Pat. No. 10,646,768 which is a 371 of PCT/US2017/028460, "Virtual Reality Haptic System And Apparatus" filed Apr. 19, 2017 which claims priority to U.S. Provisional Patent Application No. 62/324,519 "Virtual Reality Haptic System And Apparatus" filed Apr. 19, 2016. This application is also a continuation in part (CIP) application of U.S. patent application Ser. No. 16/603,690, "Virtual Reality Haptic System And Apparatus" filed Oct. 8, 2019, which is a 371 of PCT/US2018/028423, "Virtual Reality Haptic System And Apparatus" filed Apr. 19, 2018. U.S. patent application Ser. Nos. 16/095,016, 16/603,690 and 62/324,519, and International Application Nos. PCT/US2017/028460 and PCT/US2018/028423 are hereby incorporated by reference in its entirety.

BACKGROUND

Virtual reality (VR) systems are computer-based systems that provide experiences to a participant acting in a simulated environment that forms a three dimensional virtual world. Most VR system use a visual headset that allows the user to view and virtually move within a computer generated environment. Some VR system improve upon the visual experience by adding mechanical devices that are coupled to the body of the user to provide tactile forces or resistance to the movement of the user's body. However, these types of VR suits are often complex mechanical devices that must be worn by the user. Others offer only a limited haptic experience that loses its appeal due to an uncompelling overall experience. Others simulate flight, often leaving the user nauseated, since bird-like flight remains an unfamiliar sensation to humans. What is needed is an improved system that allows a system user to experience physical resistance and feedback but does not require the user to wear mechanical devices.

SUMMARY OF THE INVENTION

A VR system can include a VR movement apparatus that includes hand interfaces and foot interfaces that can support the hands and feet of a system user. The VR movement apparatus allow the user's limbs to move in 3-dimensional space and not only along a vertical or horizontal motion plane. Since the user's motion may include vertical (Y direction), lateral (X direction) and/or fore-aft (Z direction) movements, the VR movement apparatus can provide users with simulated real physical activities such as climbing just as they would in a real-world climbing environment.

The VR system can include a VR program that runs on a computer that synchronizes the motion of a user in a VR environment visually through a display and through the VR movement apparatus for a haptic experience. The display can be built into a VR headset, which can include an audio system. The visual signals are coordinated or synchronized with the control signals to the VR movement apparatus so that the visual virtual environment exactly matches with the movement limitations of the hand and feet interfaces of the VR movement apparatus. More specifically, the VR program can display a topographical VR environment that includes virtual objects such as land, mountains, structures, vehicles, etc. The VR software can allow the hand and feet interfaces to move in free space, but can prevent movement through the virtual objects so that the user's movement will stop when virtual contact is made with any virtual structures. These physical objects can be synchronized with the VR visual display so that a user can see and feel the virtual objects, in order to maintain the VR illusion.

In different embodiments, the VR system can be used to simulate various physical activities such as: walking, running, climbing, skating, skiing, snowboarding, driving, cycling, swimming, rowing, windsurfing, water skiing, wake boarding, kite boarding, etc. The VR machine can also provide a means for: training simulations, physical therapy, physical exercise, etc. The VR system can be a safe way to train in simulated environments for hazardous activities such as: rock climbing, skydiving, paragliding, extreme skiing, etc. The inventive VR system can be used in: gyms, health clubs, hotels, and other locations where one might find gym or experience devices.

DETAILED DESCRIPTION

Figure 1:
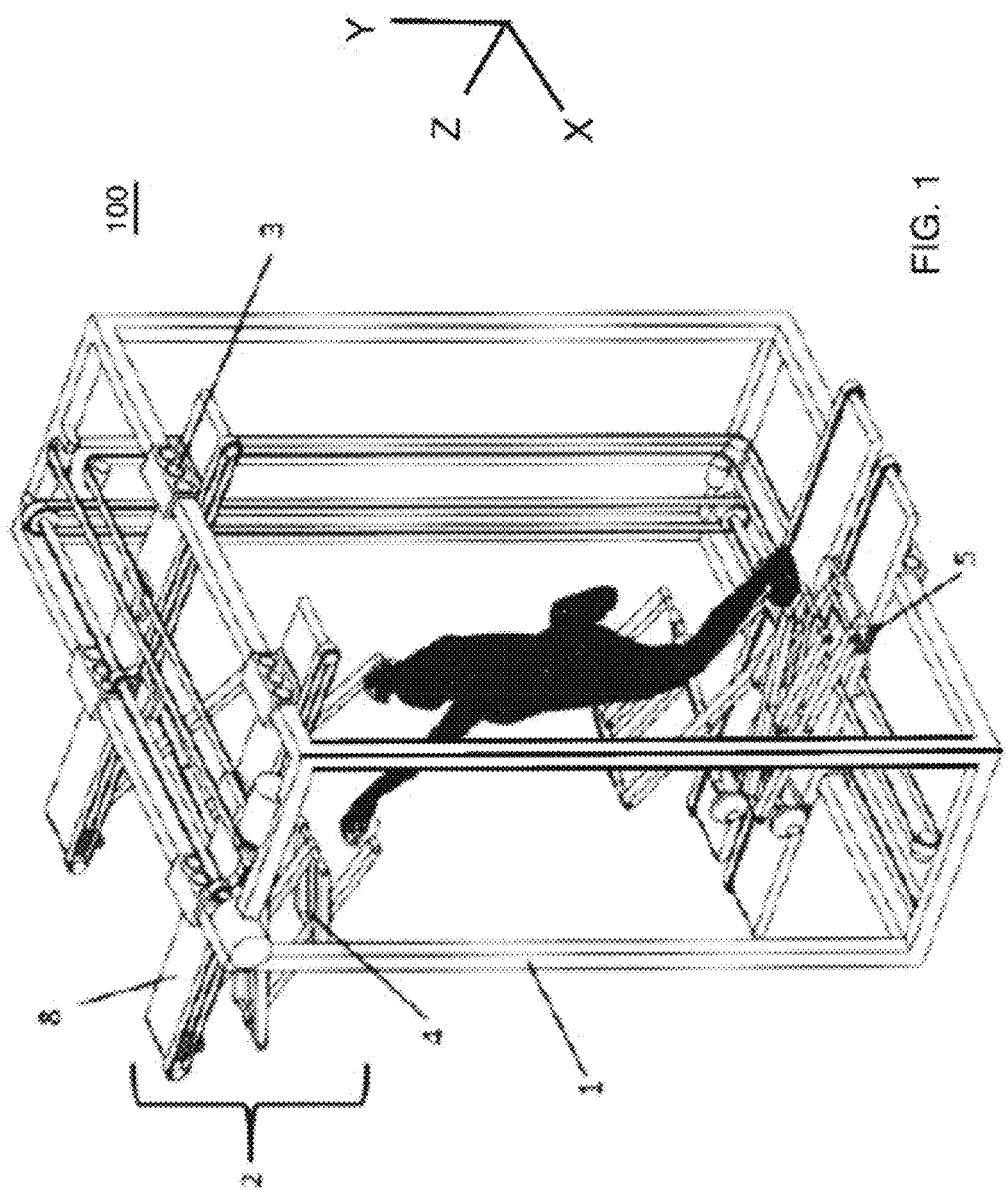
FIG. 1 illustrates a perspective view of an embodiment of a VR movement apparatus with a user.

The present invention is directed towards a VR system that simulates visual and physical interaction with a digital, three-dimensional, VR environment. The inventive VR system can include a headset and a mechanical VR device that can support the user. A computer generated VR three dimensional (3D) environment can be seen by a user through the VR headset and the visual VR environment can be creating a 'haptic robot' movement apparatus that coordinates a physically simulated force felt by the user with the expected physical force that would exist in the VR environment. The result is an experience that deceives both the vision and the physical interaction, as felt by hands and feet and, by extension the user's arms, back, legs, core muscles, etc. By adding the bodily forces, the inventive VR system can create a more complete sensation of VR immersion. The user 'sees' a stereoscopically and spatially feels an accurate facsimile of a VR world about them. As the user interacts within the VR environment, the user would 'feel' a simulated, physical response from such interaction.

For example, in an embodiment a user might choose to virtually climb a structure such as the Eiffel Tower. Visually, they would use the headset to 'see' an accurate facsimile of the Tower, along with Paris in the background, complete with atmospheric haze, clouds, etc. In the foreground, the user would see their digitally created hands moving within their field of vision, reaching to grip a spar, or pulling down as they ascend. The user would be in physical contact with a haptic VR exercise apparatus. Physically, the user's hands and feet would move relative to each other and relative to the virtual environment with the expected physical resistance as seen in the VR headset, as if they were actually climbing upward. In an embodiment, the machine does not provide resistance to upward movement. Gravity can be used to re-center the user as the user ascends so that the system user is moving in place. In a running application, the VR environment can be an incline. The system user can move the legs in a running motion in the VR environment and the VR movement apparatus can re-center the user using gravitational forces so the user is actually running in place. Similarly, if the user is in a mountain climbing VR environment, the VR movement apparatus can re-center the user using gravitational forces so the user is climbing in place.

In other embodiments, a user may use the inventive VR system to virtually experience various other types of activities for play, medical purposes, fantasy, escape, entertainment, fitness, training, etc. Such VR simulations could be designed to for various purposes such as: burning calories, working specific muscle groups, rehabilitating specific areas of focus, developing muscle memory, etc. Since a digital controller drives the entire process, each motion could be stored and analyzed for the effectiveness of the overall routine. This would in turn, offer accurate physical activity compliance monitoring or physical therapy progress information for a patient that can be provided to a doctor. In other embodiments, the inventive VR system can be used for other purposes such as client training monitoring for a coach or personal trainer.

With reference to FIG. 1, an embodiment of a VR exercise apparatus 100 is illustrated which can include a rigid frame 1 that can hold all members of the assembly. In an embodiment, the frame 1 can includes four identical armature assemblies 2 that can be mounted on linear bearings 3 that can slide on the frame 1. The movement of the armature assemblies 2 can be described with reference to an XYZ coordinate system. The linear bearings 3 can allow the armature assemblies 2 to slide laterally in the X direction on the frame 1 with minimal friction. The armature assemblies 2 can include scissor jack mechanisms 4 that are coupled to carriages 8 attached to the linear bearings 3. The carriages 8 can allow the scissor jack mechanisms 4 to move in the Y direction relative to the frame 1. The scissor jack mechanisms 4 can each have a proximal portion that is coupled to the carriages 8 and distal ends which can have user interface mechanisms. The scissor jack mechanisms 4 expand and contract in the Y direction relative to the frame 1. The user can interact with the distal ends of four scissor jack mechanisms 4. The distal ends of the scissor jack mechanisms 4 can be coupled to: a left hand interface, a right hand interface, a left foot interface and a right foot interface which can move to any X, Y, Z position in a 3 dimensional space defined by the frame 1. In an embodiment, the frame 1 can define an X-Y "movement perimeter" and the left hand interface, the right hand interface, the left foot interface and the right foot interface can move within the X-Y movement perimeter. In the illustrated example, the left hand interface, the right hand interface, the left foot interface, the right foot interface and the user 20 may be outside the Z perimeter plane of the frame 1.

Figure 2:
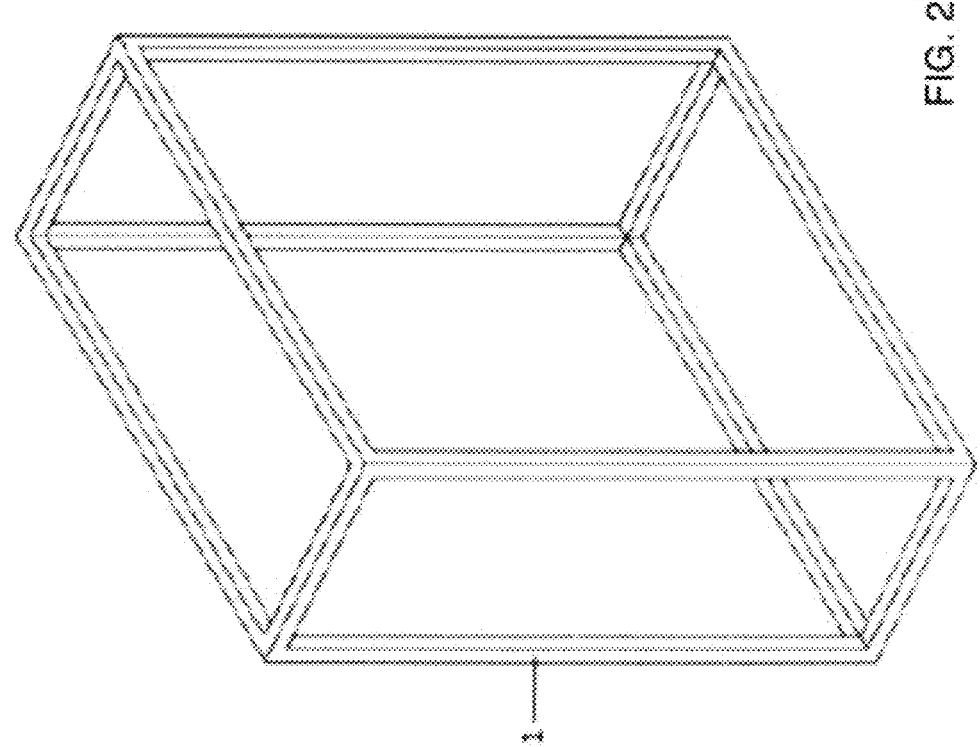
FIG. 2 illustrates a perspective view of an embodiment of a frame of a VR movement apparatus.

With reference to FIG. 2, an embodiment of a rigid frame 1 is illustrated. The frame 1 provides a support structure for the haptic apparatus and can be made of a plurality of straight sections of tubing which can have a uniform cross section such as: square, rectangular, circular, or any other suitable cross section. The tubes can function as tracks for the linear bearings. In another embodiment, the frame 1 may be used as a rigid structure on which linear bearing slides and tracks are mounted. In the illustrated embodiments, frame 1 is a 3D box that has parallel tubes extending the X, Y and Z directions to define a movement space within the apparatus. The linear bearings can slide over the outer surfaces of the tubes. In other embodiments, the tubes may have slots and the linear bearings may slide on inner surfaces of the tubes.

Figure 3:
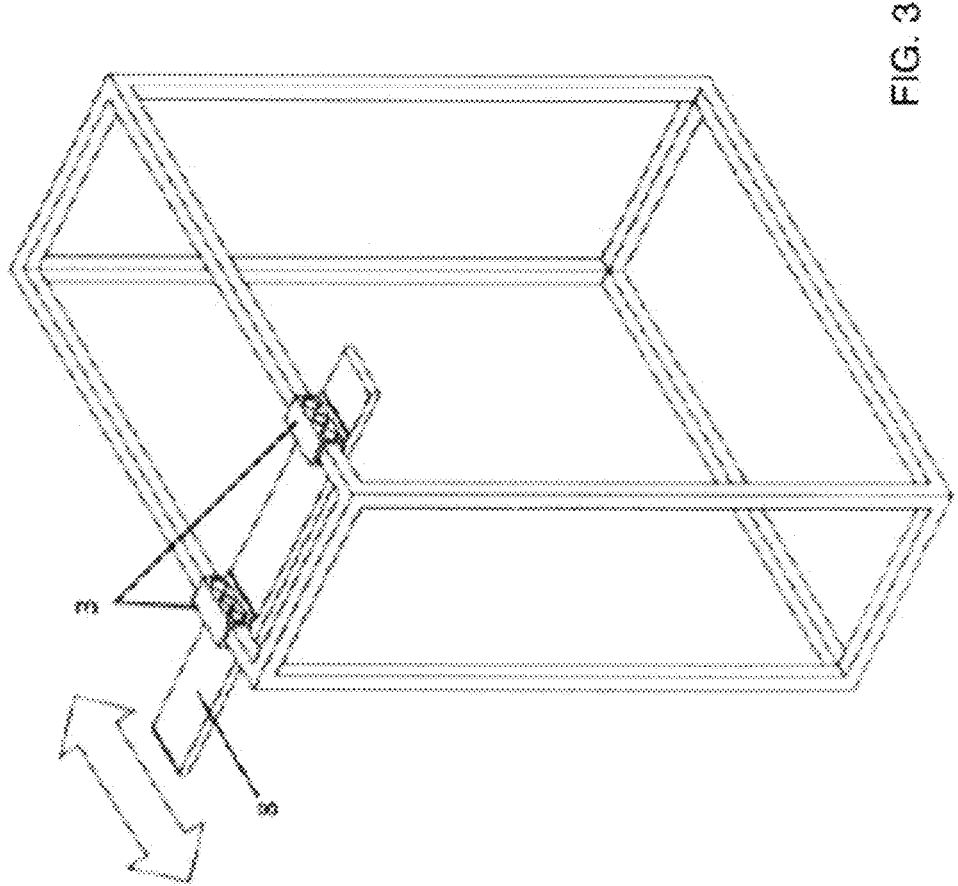
FIG. 3 illustrates a perspective view of an embodiment of a frame and a carriage of a VR movement apparatus.

With reference to FIG. 3, an embodiment of an upper left carriage 8 is coupled to linear bearings 3 which allow the upper left carriage to slide laterally along the upper lateral tracks of the frame 1 with minimal friction. Only one carriage 8 has been shown here for clarity. The linear bearings 3 allow the carriage 8 to move in the X direction.

Figure 4:
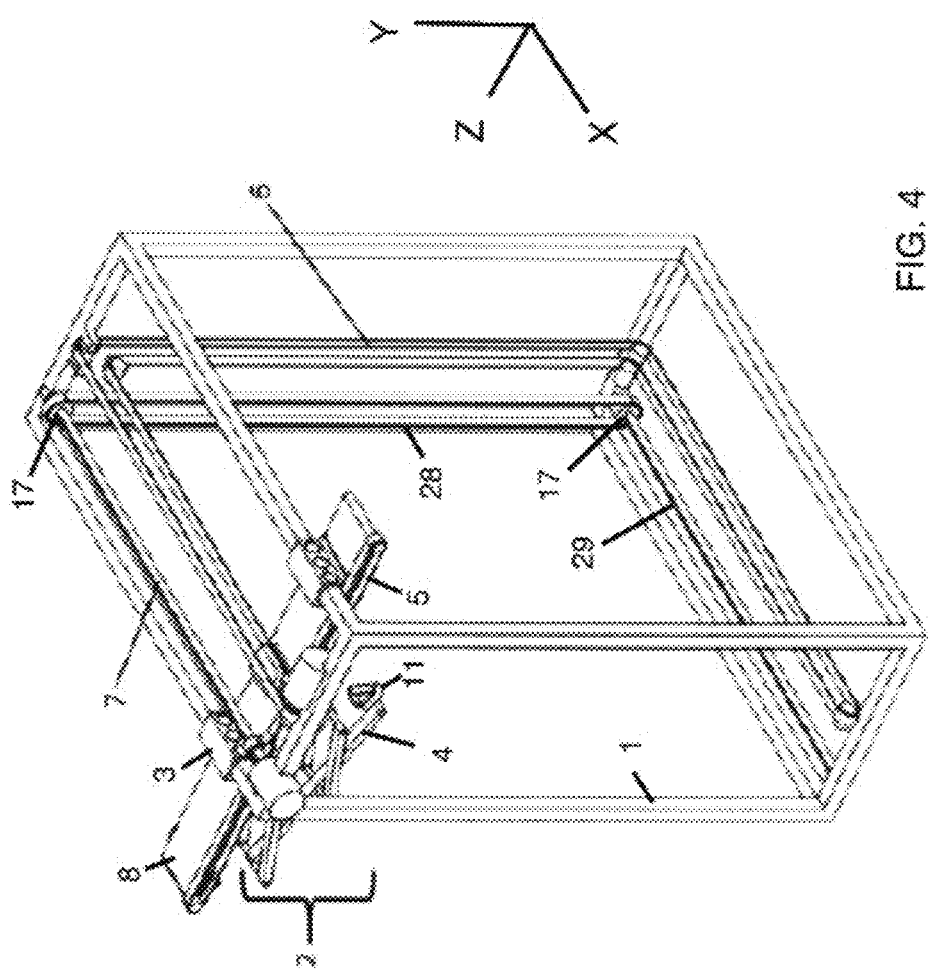
FIGS. 4-6 illustrate perspective views of an embodiment of a frame, carriage and scissor jack mechanism of a VR movement apparatus.

With reference to FIG. 4, an embodiment of a scissor jack mechanism 4 is illustrated with the upper left carriage 8 and the frame 1. The scissor jack mechanism 4 is coupled to the carriage 8 with additional linear bearings that allow the scissor jack mechanism 4 to move in the Z direction relative to the frame 1. The scissor jack mechanism 4 can extend and contract to adjust the vertical position of a distal end. The distal ends of the scissor jack mechanism 4 can include hand or foot connections. Clamp and linear bearing assembly 5 controls fore-aft motion, while the scissor jack mechanism 4 can include a computer controlled brake that regulates the gravity-driven descent of an end effector 11. The computer can monitor the component movement and makes sure that all the end effectors 11 move at the same pace during re-centering movements. When 'vertical motion only' is happening, then the brake 4 is regulating its motion toward the proximal end (for the hands, opposite for the feet). Thus, the scissor jack mechanism 4 can control the vertical Y direction location of the user and the vertical movements of the user. The linear bearings 3, carriage 8 and scissor jack mechanism 4 of the haptic apparatus, link all of the user's three-dimensional motions.

In addition to providing 3D movement, the haptic apparatus, can be configured to prevent or resist movement of the distal ends of the scissor jack mechanisms 2, in order to simulate a haptic 3D VR environment. In the illustrated embodiment, the movement of the carriage 8 and scissor jack mechanism 2 are controlled using a plurality of timing belts 6 and shafts 7 coupled to gears 17 that can control the motion of all moving components in the haptic apparatus. The timing belts 6 can include teeth that engage the teeth on gears. The downward motion of the linked scissor jack mechanism 2 can result from gravitational pull on the distal ends by a user. This downward movement can be regulated by electric motors or brakes controlled by the microprocessor. Timing belts 5 and spline gears 17 and shafts 7 link all lateral and fore-aft motions of the foot and hand couplings at the distal ends of the scissor jack mechanism 2. This forces the motion vector of all four end effectors to be identical and synchronized. In an embodiment, the four end effectors can be a left hand interface, a right hand interface, a left foot interface and a right foot interface.

Figure 5:
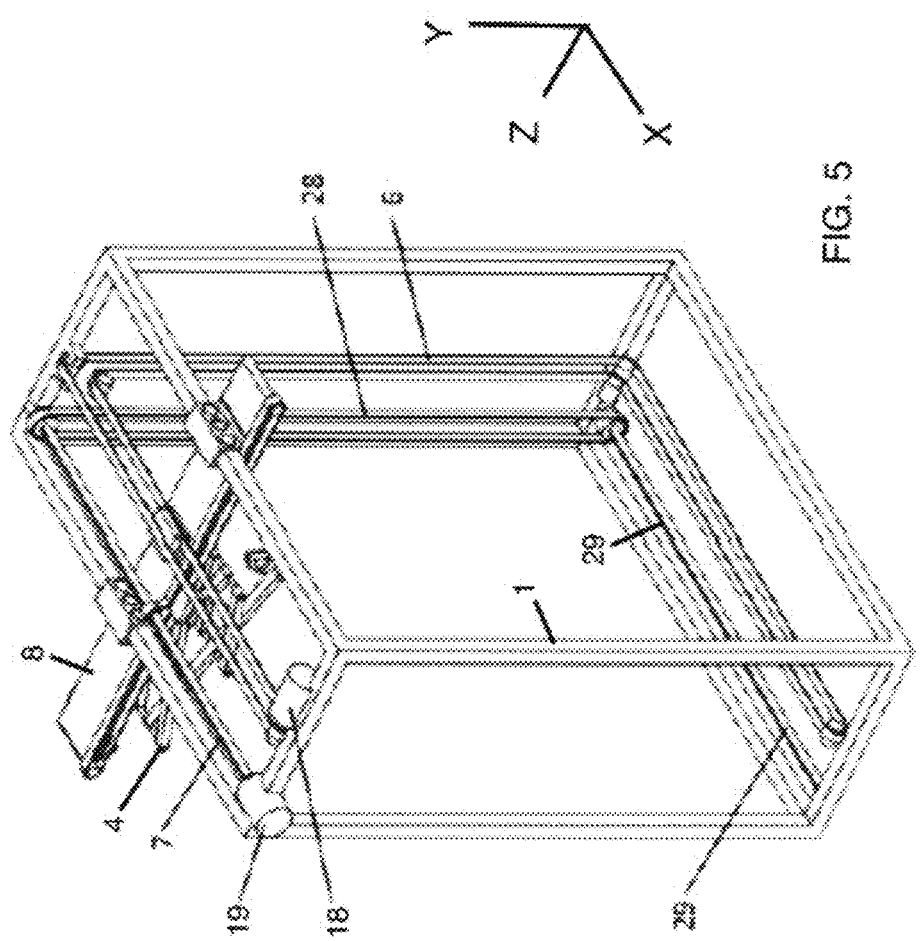

With reference to FIG. 5, the fore-aft motion and lateral motion of the scissor jack mechanisms 4 can be controlled by a fore-aft control motor 19 and a lateral control motor 18, respectively. The lateral control motor 18 can drive a first timing belt 6 that connects all four carriages 8 of the haptic system, when engaged, in a single synchronized motion in the same direction. The fore-aft control motor 19 can be connected to a splined gear 17 which drives a splined shaft 7, which when rotated can move all four scissor jack mechanisms 2 forward simultaneously in the Z direction. When fore-aft control motor 19 rotates in the opposite direction, the reverse movement of the splined gear 17 and splined shaft 7 can move all four scissor jack mechanisms 2 rearward simultaneously. The splined gear 17 and the shaft 7 at the top of the frame 1 and another shaft 29 at the base of the frame 1 are connected with a timing belt 28, forcing simultaneous motion between the upper and lower scissor jack mechanisms 2.

Figure 6:
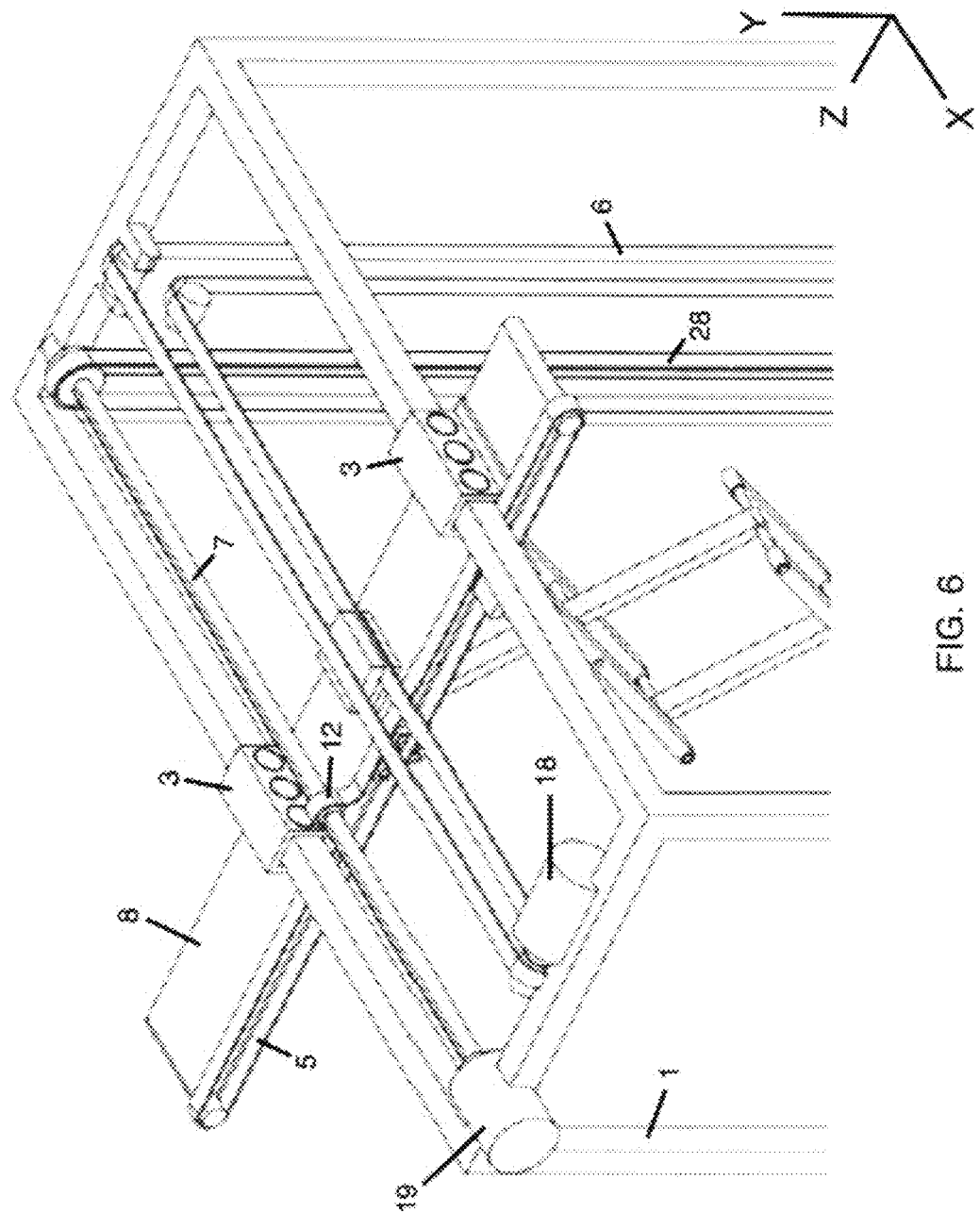

FIG. 6 illustrates a close up perspective view of the haptic apparatus. In this embodiment, the fore-aft control motor 19 can be directly coupled to the splined shaft 7, which extends across the width of the frame 1. The gear 17 is mounted on the opposite end of the splined shaft 7 and a belt 28 surrounds the gear 17 and extends down on the right side of the frame 1 to control the rotation of another splined shaft 29 that extends across the bottom edge width of the frame 1. A sliding shaft gear 12 can be mounted around the splined shaft 7 that can slide along the length and also rotate with the splined shaft 7. The sliding shaft gear 12 is mounted on the carriage 8 and controls the movement of the scissor jack mechanism 4 in the Z direction relative to the carriage 8. The splined shaft 17 can rotate a gear that controls the fore-aft movement of the carriage 8 can also include a belt which controls the fore-aft movement of the scissor jack mechanisms 2 relative to the carriages 8 in the Z direction.

The lateral control motor 18 is coupled to a gear which controls the movements of the belt 6 which extends across the upper width of the frame 1 and then bends extends downward long the right side of the frame 1 and the bottom horizontal surface of the frame 1. The belt 6 the carriages 8 can be coupled to the belt so that movement of the belt in a first direction can cause the carriages 8 move to the right and movement of the belt 6 in the opposite direction can cause the carriages 8 to move of the left relative to the frame 1.

Figure 7:
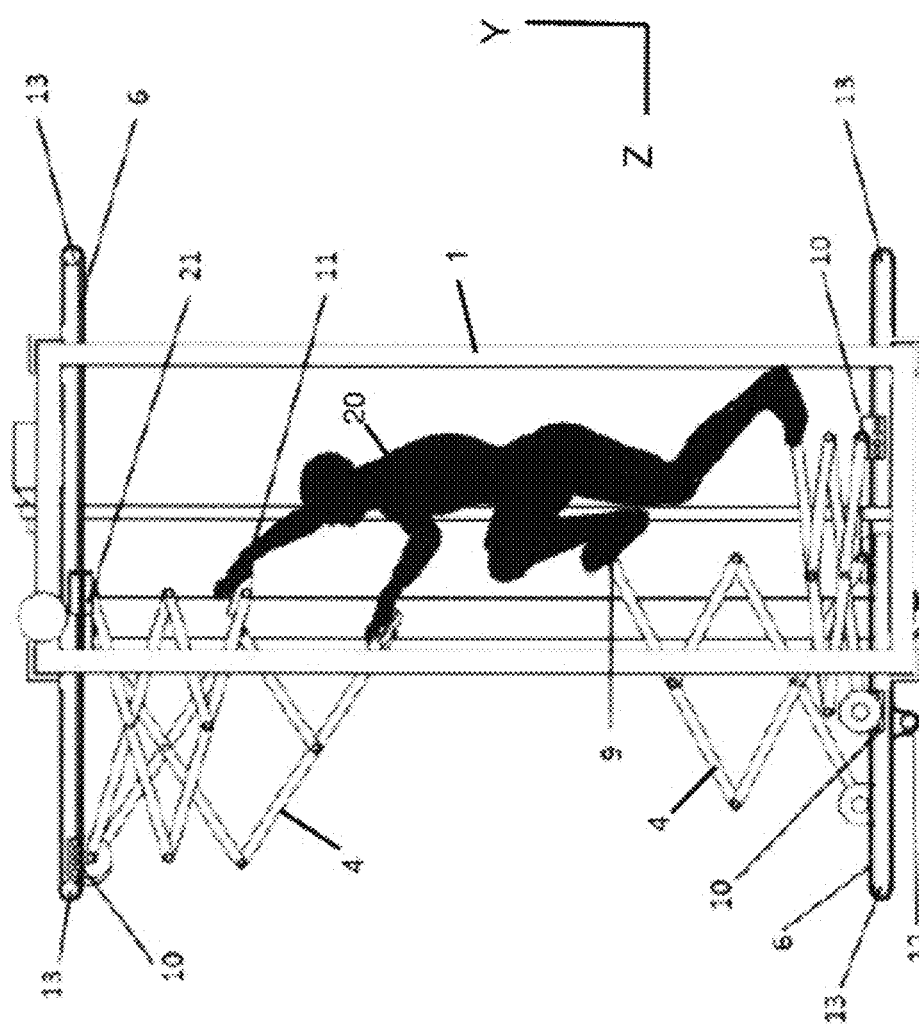
FIG. 7 illustrates a side view of an embodiment of a VR movement apparatus with a user.

FIG. 7 illustrates a left side orthogonal view of an embodiment of the inventive VR movement apparatus. The user 20 holds grips on end effectors 11 with the hands. The end effectors 11 can be a left hand interface and a right hand interface that can be grasped by the user's left and right hands. The user's feet can be affixed to the left foot interface and the right foot interface at the distal ends of the leg scissor jack mechanisms with bindings similar to bicycle bindings or straps across the top of the feet 9. The scissor jack mechanisms slide fore and aft in the Z direction on linear bearings 10.

The bearings 10, carriages and scissor jack mechanisms can move freely when in a 'free motion' state. However, when the user virtually 'grips' a virtual structure through one or both of the end effectors 11, the computer controlled motors and brakes can be actuated to stop further movement to simulate user contact with a VR object. The connected scissor jack mechanism(s) 4 and carriage(s) 2 immediately affix rigidly to their respective specific timing belts 6 by means of a belt-clamps 21 when controlled by the computer to simulate contact with a VR object. At such a VR contact point, some or all of the scissor jack mechanisms 4 can hold the user 20 in a fixed position. If the VR software running on the computer indicates that re-centering is necessary and all of the scissor jack mechanisms 4 can hold the user 20 in a fixed position, the scissor jack mechanisms 4 may move in unison to re-center the user 20 within the movement perimeter of the frame 1. During the re-centering process, the computer can move all of the end effectors 11 in the same relative positions while centering the end effectors 11 within movement perimeter of space as defined by the frame 1.

Each carriage 8 can include is a sliding shaft gear 12 that couples with the fore-aft timing belts 6 mounted to the carriage 8. This sliding shaft gear 12 is keyed to a spline shaft (not shown in this view), allowing all belts to move simultaneously. Freely-spinning Pulleys 13 are mounted to the opposite ends of the carriage 8 so that the fore-aft timing belt 6 forms a tight loop. The movement of the timing belt 6 causes the scissor jack mechanisms 4 to move in the Z direction.

Figure 8:
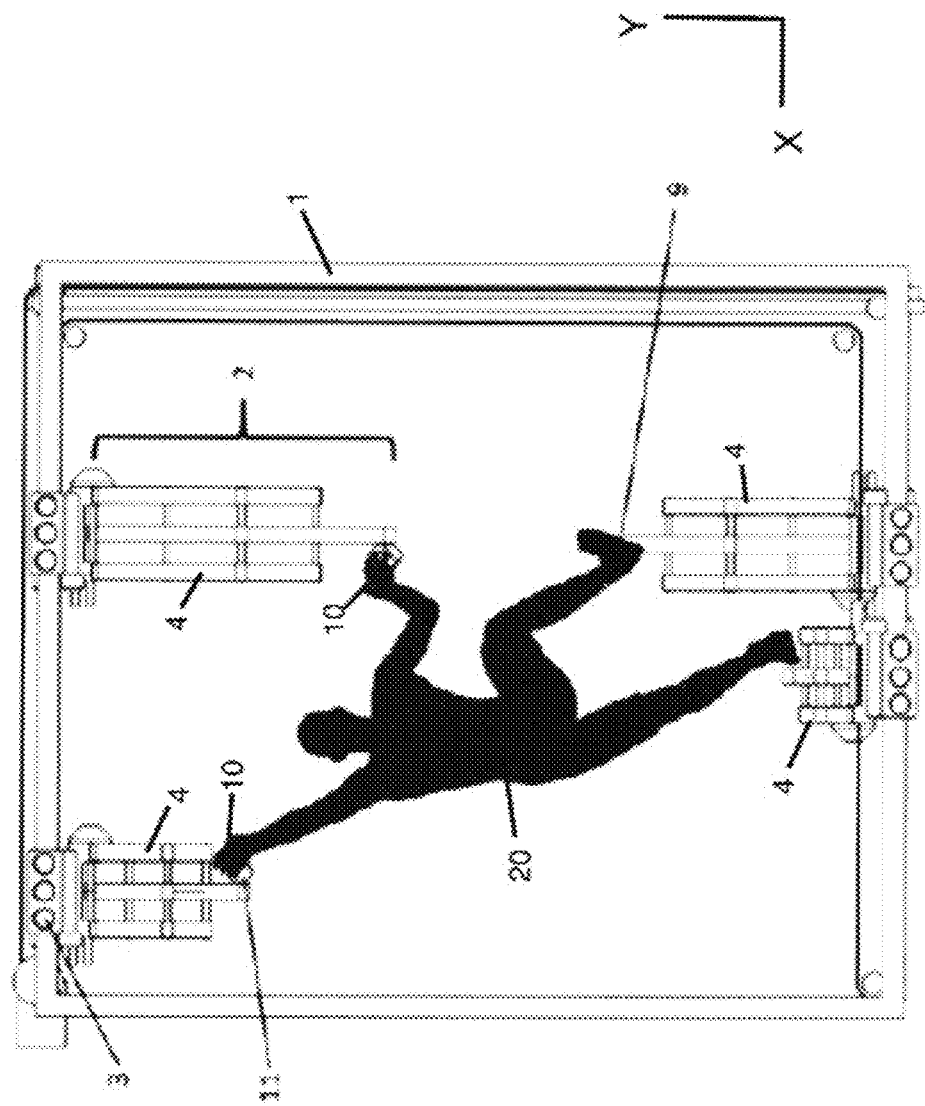
FIG. 8 illustrates a front view of an embodiment of a VR movement apparatus with a user.

FIG. 8 illustrates a rear orthogonal elevation view of an embodiment of the VR apparatus. With the belt-clamps in 'released' states, the four armature assemblies 2 can slide freely in a lateral motion as the linear bearings 3 slide on the frame 1 in the X direction in order to minimize friction. The fore-aft motions (Z direction) and upward-downward (Y direction) motions are similarly free to allow user 20 movement in 'released' state. The user 20 contacts the invention at the end effectors 11 at the hands 10 and feet 9. Since all downward forces are linked using the timing belts and spline shafts, the cumulative downward pressure always can equal the user's total body weight. When the belt-clamps are engaged, some or all of the four scissor jack mechanisms 4 can remain in fixed states, simulating a solid structure to the user's hands and feet. This is reinforced by the visual confirmation of an unmoving structure generated by a computer and seen in the VR headset or other visual display.

When the belt-clamps are engaged and the VR machine needs to re-center the user, all four scissor jack mechanisms 4 can move in X, Y and Z directions—vertical, lateral, fore-aft as needed, in a synchronized motion, in order to return the user 20 to the center of the frame 1 of the machine, preventing the scissor jack mechanisms 4 from moving out of or in contact with a movement perimeter of the VR machine.

Figure 9:
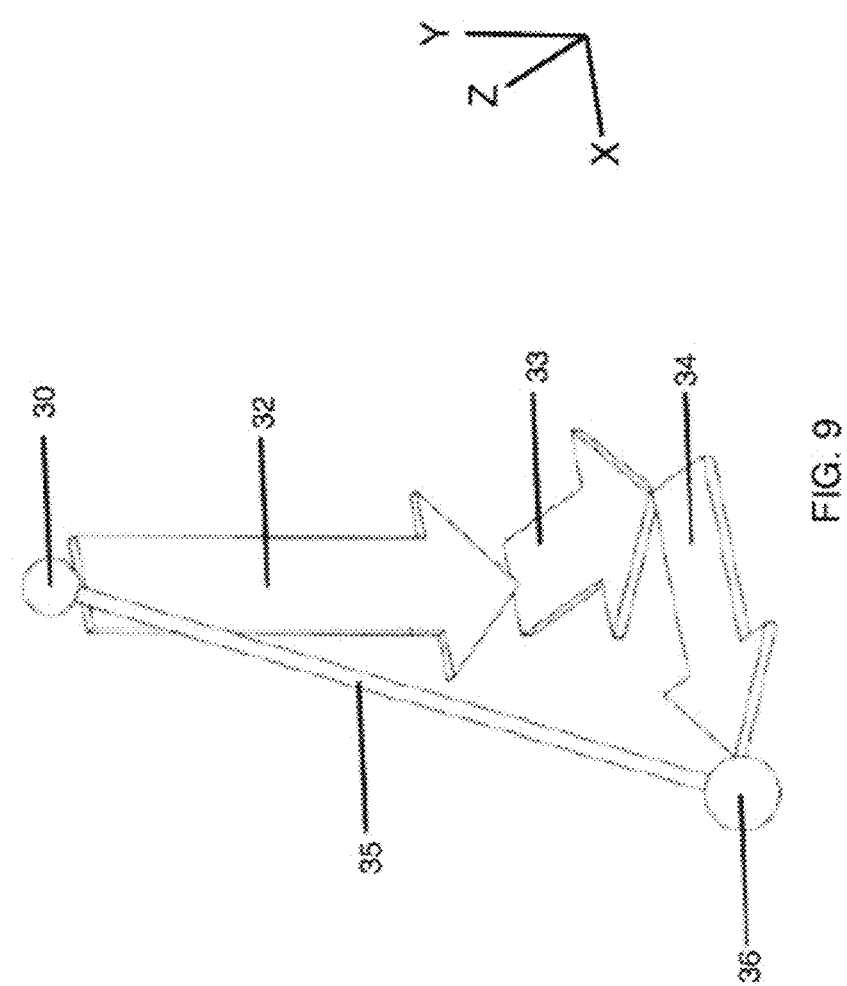
FIG. 9 illustrates an X, Y, and Z direction coordinate force diagram.

With reference to FIG. 9, a plurality of X direction, Y direction and Z direction motion vectors are illustrated. In order to create controlled, deliberate re-centering of the user's body as they 'climb' in place, the scissor jack mechanisms move in a synchronized manner and elongate or contract, move fore and aft, and move laterally. A combination of downward motion 32 and fore-aft motion 33 and lateral motion 34 determines the overall vector 35 of the end effector as it is re-centered from starting location 30 to final position 36. A microprocessor controls the motors and brakes in order to move the end effector along the chosen vector 35.

The velocity of each cartesian vector accelerates and decelerates, in order to minimize the sensation of motion to the user. This velocity may take the form of a spline curve. Since there exist three motions: negative Y movement 32, negative Z movement 33 and positive X movement 14, the top speed may be different for the X movement, Y movement and Z movement, so that they all reach the final position 36 at precisely the same time. In this example, the Y movement 32 is greater than the Z movement 13 or the X movement 34. Therefore, the speed of the Y movement 32 will be greater than the speed of the Z movement 13 or the X movement 34. This assures that the motion from the start location 10 to the finish position 36 feels like a straight line to the user.

Figure 10:
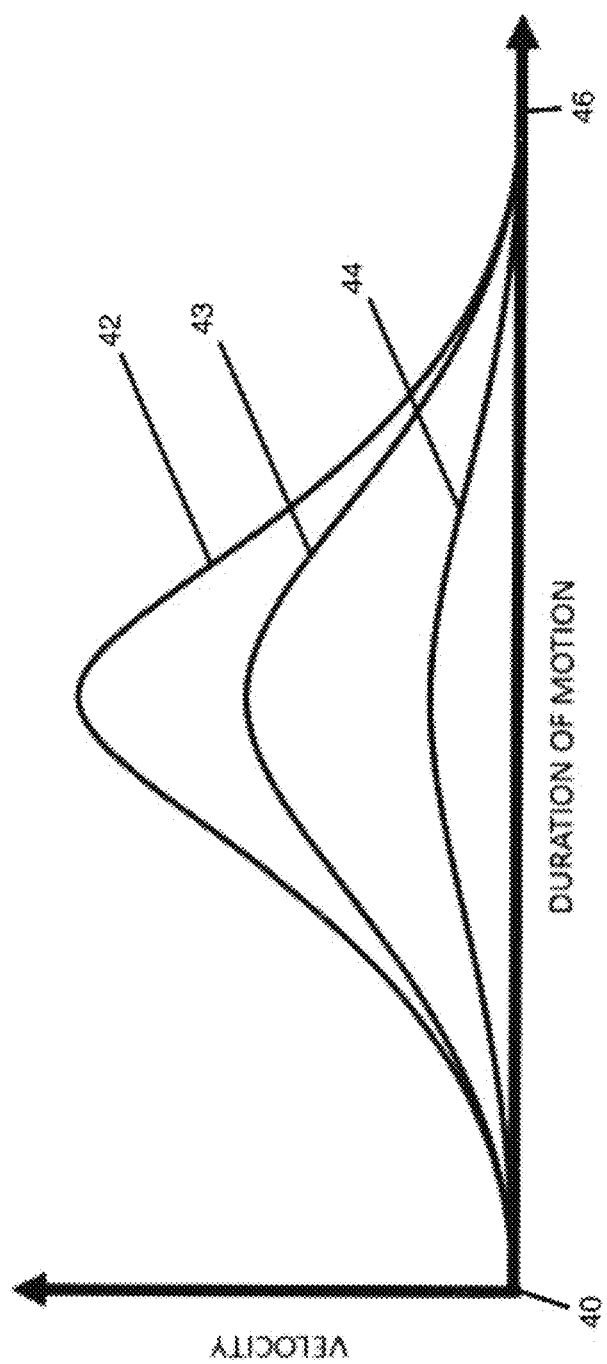
FIG. 10 illustrates an X, Y, and Z direction acceleration graph.

With reference to FIG. 10, a graph illustrating the velocity of the end effector in the X, Y and Z directions over the duration of the motion between the start of the motion 40 at the beginning position and the end of the motion 46 at the final position is illustrated. The X direction velocity 44, Y direction velocity 43 and Z direction velocity 42 all start and finish with very low velocities. However, the X direction velocity 44, Y direction velocity 43 and Z direction velocity 42 all increase to a maximum velocity at the middle of the motion duration and then slow down prior to reaching the end of motion 46 at the final position. Because the motion has a longer vertical travel, the Y velocity 42 is greater than the X velocity 44 or the Z velocity 43. The Z distance and Z velocity 43 is greater than the X distance or X velocity 44. The slow velocities at the starting of the motion 40 and ending of the motion 46 help to minimize the acceleration that can be easily detected so that re-centering is not less detectable by the system user.

Figure 11:
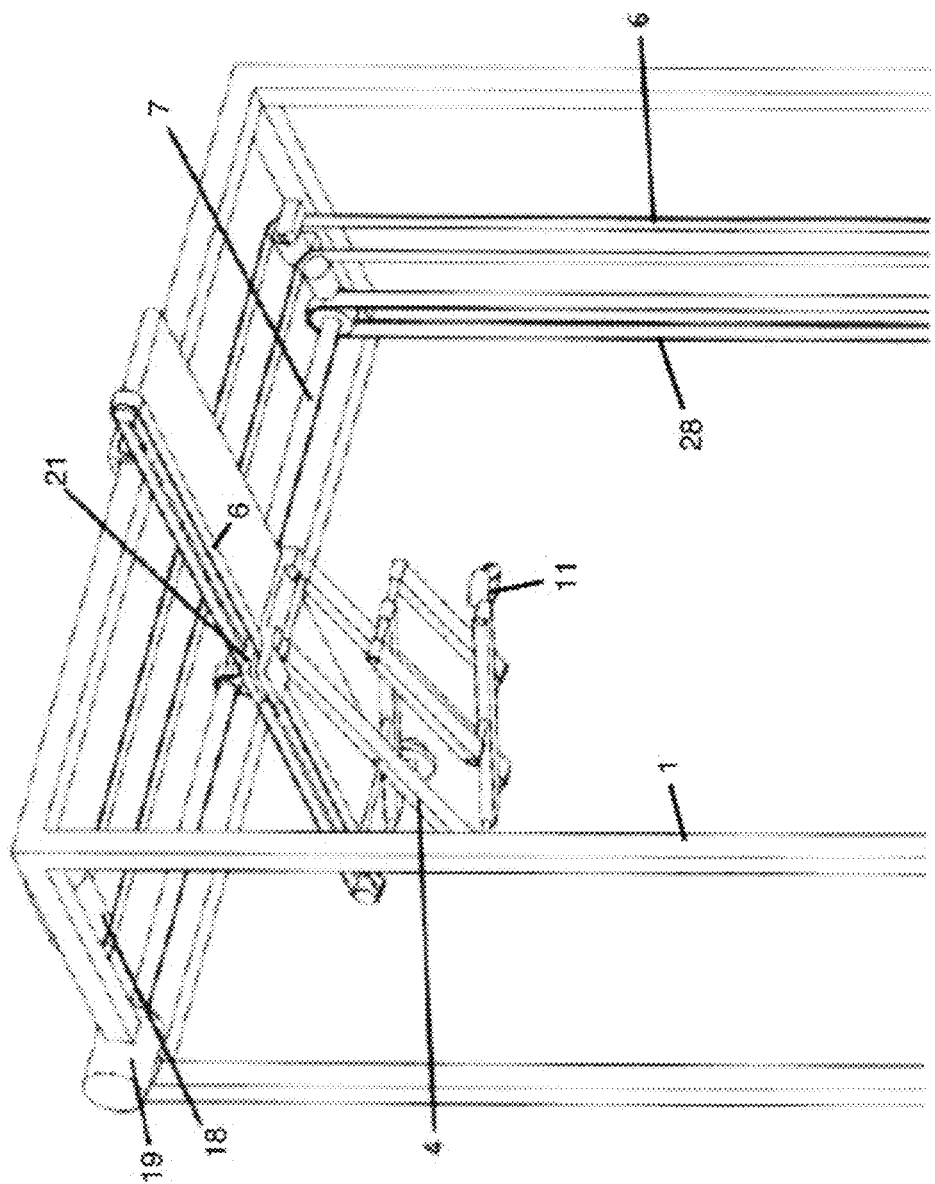
FIGS. 11-14 illustrate perspective views of an embodiment of a VR movement apparatus illustrating movements of the frame, carriage and scissor jack mechanism.

With reference to FIG. 11 a simplified embodiment of a single armature assembly 2 is illustrated in an off centered position. In this embodiment, the armature assembly 2 includes: a scissor jack mechanism 4, belts 6, lateral motion control motor 18, fore-aft motion control motor 19, and a fore-aft belt clamp 21 that is computer controlled. A timing belt 6 can be connected to the upper spline shaft 7 with the lower splined shaft (not shown), in order to connect all fore-aft motion into synchronicity. When the fore-aft motion control motor 19 rotates the splined shafts 7, the sliding gears 17 can rotate and move fore-aft belt along the carriage 8. The scissor jack mechanisms 4 can move in the Z direction relative to the carriage 8 and frame 1. When the motor 18 rotates, the carriage 8 and scissor jack mechanisms 4 can move in the X direction relative to the frame 1. The scissor jack mechanism 4 has two proximal ends, which are coupled to the fore-aft timing belt 5. When the clamp 21 is released, the distal end effector 11 can move freely vertically in the Y direction and then the clamp 21 is actuated, the end effector 11 can be locked in place preventing movement in the Y direction.

Figure 12:
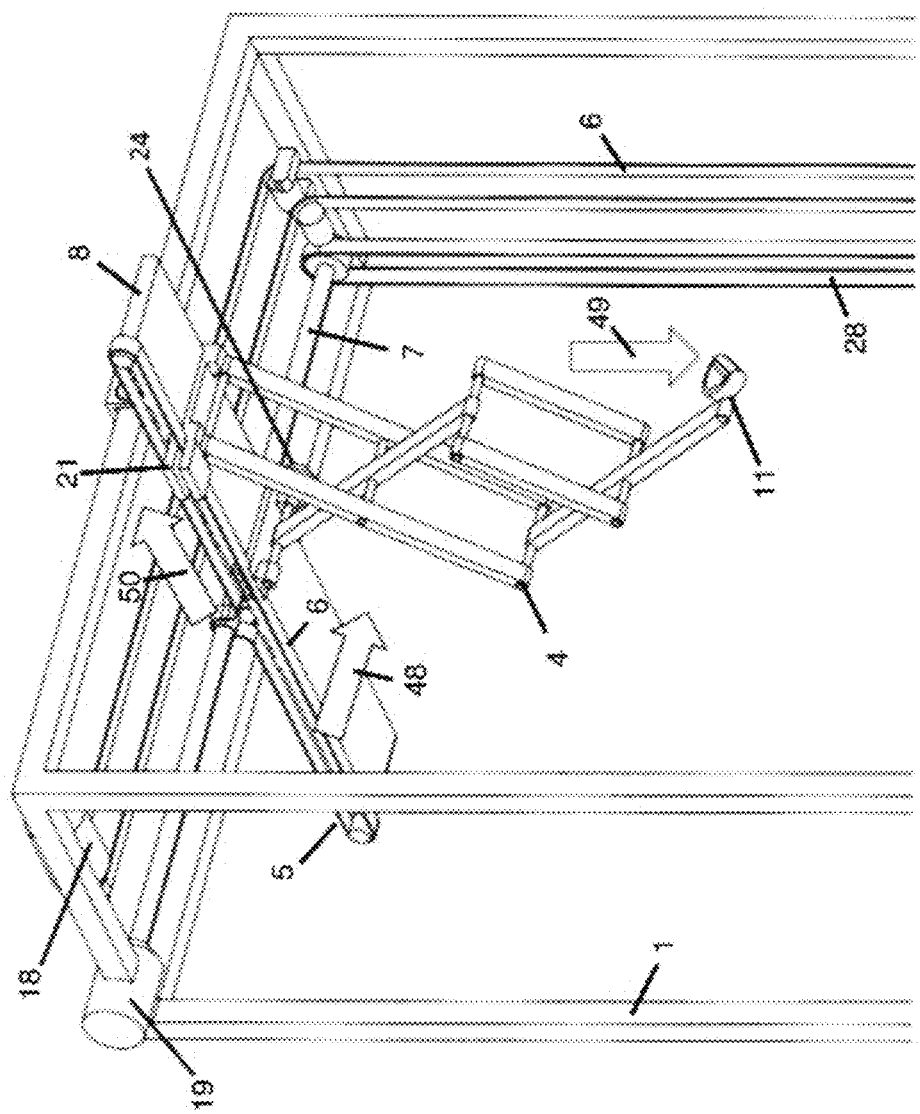

With reference to FIG. 12, a simplified embodiment of a single armature assembly 2 is illustrated moving from an off centered position to a centered position. When re-centering the user's lowest foot once the software has 'decided' the correct motion vector, the lateral motion control motor 18 and the fore-aft motion control motor 19 relocate the end effector along the horizontal motion plane. Simultaneously, the descent motion controller 24 regulates the downward motion of the end effector 11. In one embodiment, the descent motion controller 24 is an electric motor. In another embodiment, the descent motion controller 24 is a mechanical brake, able to regulate motion by creating specified resistance. All motions are designed to move the end effector 11 along the chosen vector so that their start and stop times are synchronous, regardless of distance. The clamp 21 can be modulated to control the vertical movement rate of the end effector 11. In the illustrated example, the re-centering movement of the end effector 11 (from the position illustrated in FIG. 11) includes the following movements: negative X direction 48, negative Y direction 49 and negative Z direction 50. In doing so, the three-dimensional vectors will follow a straight path and variable velocity pattern as discussed above with reference to FIGS. 9 and 10.

Figure 13:
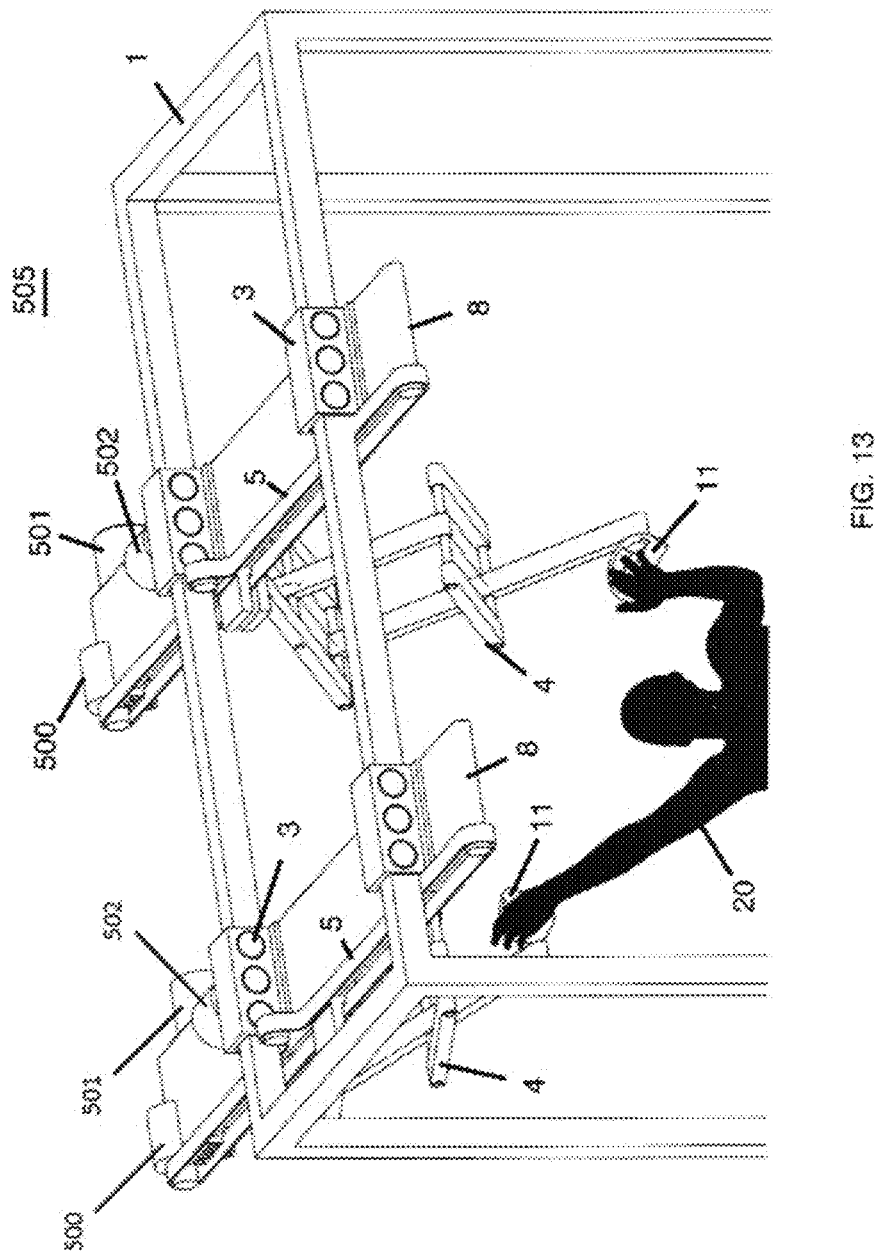
Figure 14:
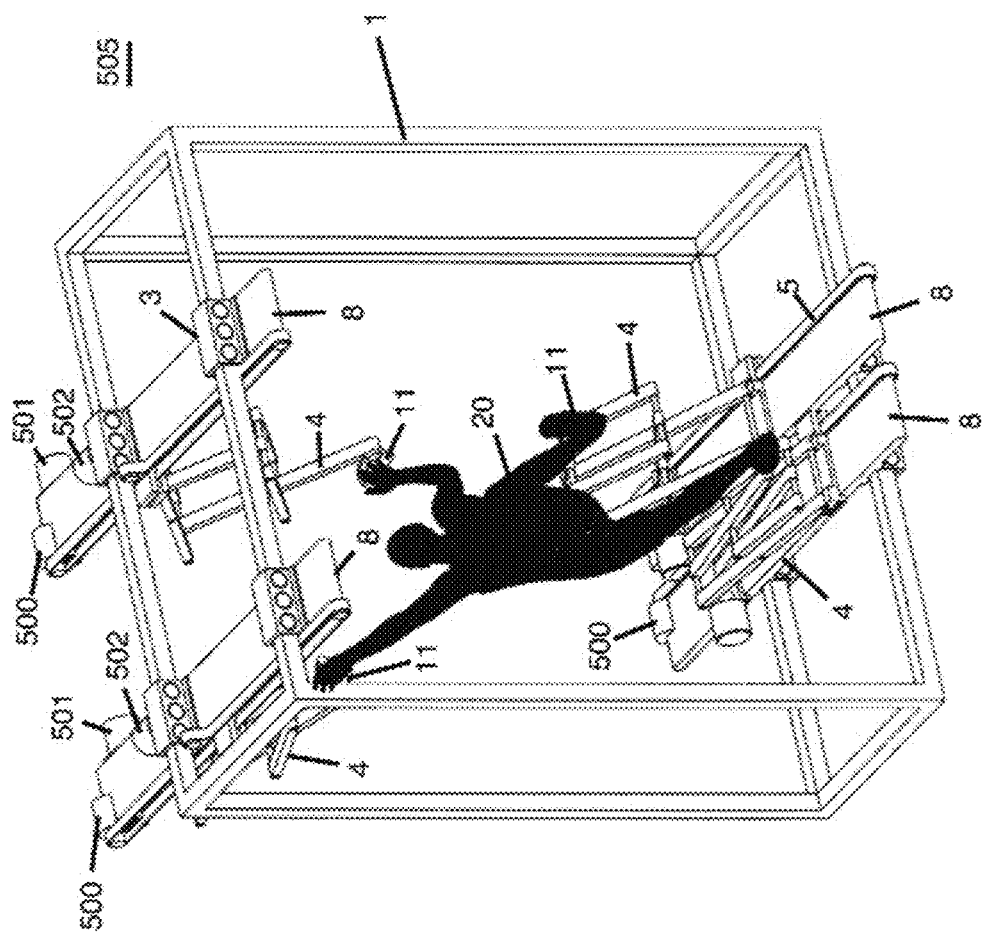

In FIGS. 1-12 an embodiment of a VR movement apparatus was illustrated that used belts, gears and shafts to perform the re-centering movement of the end effectors 11. In other embodiments, other mechanisms can be used to control and restrict the movement of the end effectors 11. In an embodiment with reference to FIGS. 13 and 14, motors 500, 501, 502 can be used to with the VR movement apparatus 505. FIG. 13 illustrates a perspective view of a top portion of a VR movement apparatus 505 and FIG. 14 illustrates a perspective of an entire VR movement apparatus 505. In this embodiment, the vertical motion of the end effector 11 can be controlled by a vertical control motor 500, the fore-aft motion of the end effector 11 can be controlled by a for-aft motor 501 and the lateral movement of the end effector 11 can be control by a lateral motor 502. The motors 500, 501, 502 can be controlled by a computer processor that allows free movement of the end effector 11 in virtual free space and prevents movement of the end effectors 11 through any virtual solid objects. In an embodiment, the motors 500, 501, 502 can be stepper motors that can also provide location information for the end effectors 11 in the X, Y and Z directions. The motors can be energized to resist rotation and movement of the end effectors 11 when the end effectors 11 are determined to be in contact with a surface of a VR object.

Figure 15:
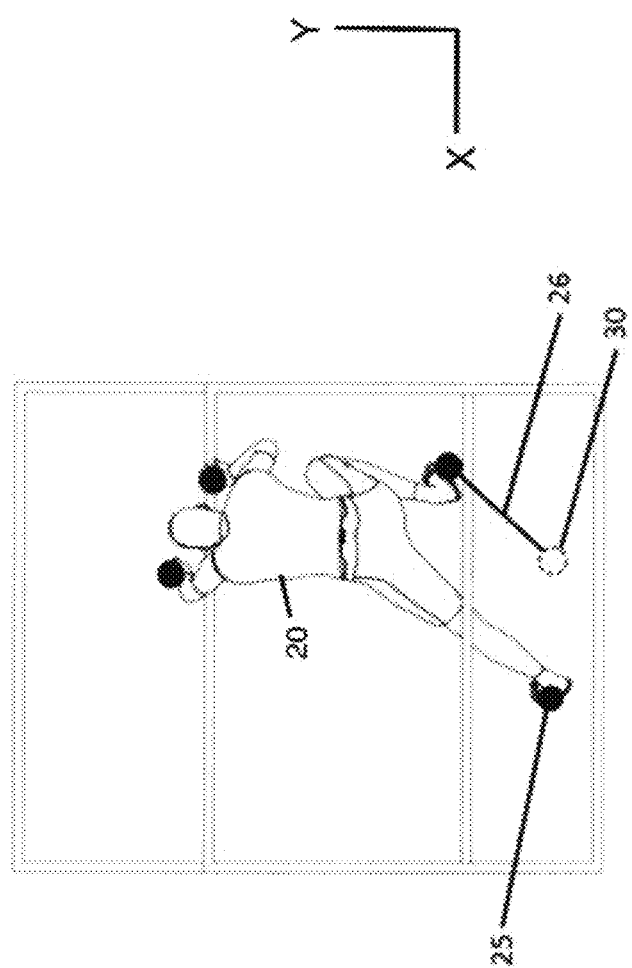
FIGS. 15-17 illustrate front views of a user's movements on an embodiment on a VR movement apparatus.

FIG. 15 shows a front view of a user 20 operating the VR apparatus and illustrates a first step in a user motion cycle. In this case, the user's hands and feet are confirmed on virtual grip points. The machine remains static, since the user's lowest foot is fixed in its neutral starting state 25. In the illustrated embodiment, the left foot end effector determines the lowest point of the user's body. The machine has calculated the motion vector 26 between the right foot end effector and its neutral starting state 30. No re-centering motion can take place until the end effector for the lowest foot lifts, indicating that an ascent motion is taking place. This movement of the lowest foot end effector can trigger the described re-centering motion.

Figure 16:
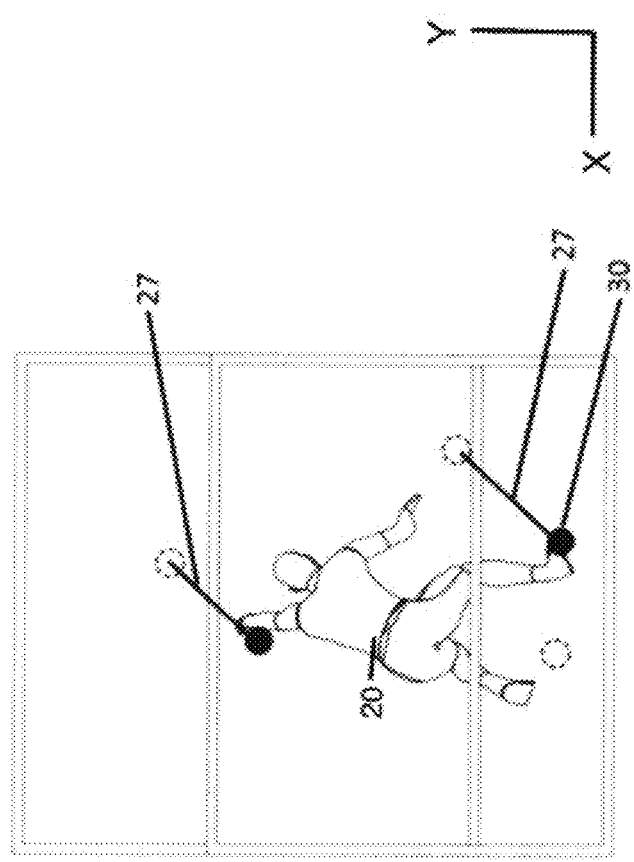

With reference to FIG. 16, the user 20 has released their confirmed grip from their left foot and right hand. The left foot has lifted from its confirmed grip point, initiating the machine's re-centering motion. The remaining, fixed end effectors, the right foot and left hand re-center according to a vector 27 required to relocate the new lowest foot to the neutral starting state 30, in preparation for the next motion of the user. With the user and end effectors now centered, the user has free range of motion in all directions. Although this diagram shows the motion in two dimensions, the motion will include the Z-direction (fore-aft) motion, which allows the user to move in all upward directions before they are automatically re-centered.

Figure 17:
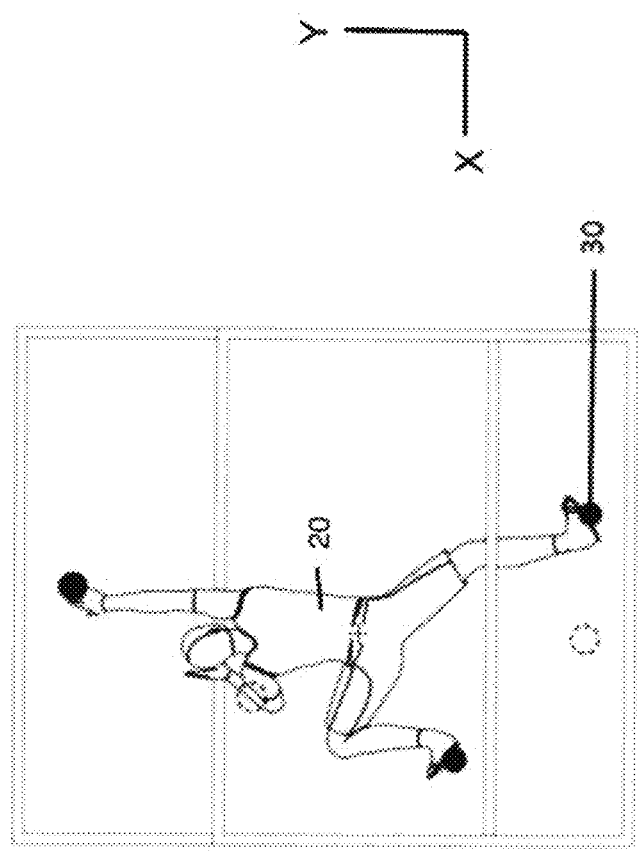

With reference to FIG. 17, the user has chosen a new, fixed position for the left foot, while the right foot remains in its neutral starting state 30. At the moment the user lifts their lowest foot, a new re-centering vector is calculated between the foot that will become the new, lowest foot and its neutral starting state 30, and the re-centering process repeats.

The inventive system can coordinate visual and haptic data that is provided to the user through a VR headset and the described haptic apparatus. In the haptic apparatus, each Cartesian motion vector (X, Y and Z) is defined by a linear bearing direction. The hardware components associated with each direction can be connected to a timing belt. Though these connections the movement of the timing belts can be activated or released as needed by commands from a microprocessor. The flat horizontal plane of motion (X and Z direction) can be controlled by electric motors. The Y direction (the vertical) movements can be controlled by an electronically computer controlled brake. In other embodiments, the Y direction can be controlled by an electric motor or any other suitable control device can be used.

Thus, when the haptic apparatus user is free to move their hand or foot unencumbered, provided that the space of the sensor embedded within the grip or foot binding remains outside the 3D, digital environment. In this way, their motion emulates the 'real world' environment, where a user is free to move hands and feet, provided they do not intersect with solid objects. If the user positions their hand or foot and therefore the positional sensor within that component within the range of an element that is designated as a 'hold' or 'grabable entity', then the mechanical components which had been moving freely now clamp firmly onto their timing belts, thereby locking them into fixed state, as if they had grabbed or otherwise intersected a solid mass. As long as downward pressure is applied to that grip, the clamps remain engaged to the timing belt. If the user lifts the hand or foot above that 'hold', then just as in the 'real world', the grip is released, the timing belts are disengaged, and the user is again free to move their hand or foot unencumbered.

The role of the software is to detect the relationship between the hand and foot interfaces and the VR surface that the user virtually interacts with. If, for example, the user 'punches' the virtual, solid mass, then the timing belt clamps engage immediately upon the virtual impact. The system can calculate timing and physical impact of intersection between the hand sensor and the virtual solid mass. As long as the hand sensor remains in such position, the hand will remain in locked state preventing further movement. If the user withdraws their hand after impact, then this motion away from a virtual object is detected, and the timing belt clamps disengage, releasing the hand back to free motion. The user can wear a VR headset with a visual display that projects a VR environment. The 3D VR environment space can be coordinated by the computer to allow the user to move in an open world VR environment while being physically confined within the frame of the VR apparatus.

In some embodiments, the VR system can use interpret specific actions of the user to transition between simulated physical contact with a virtual object and non-contact. For example, in order to 'release' a grip, the user may simply lift their hand or foot, as they would in a real-world climbing environment to move the corresponding hand or foot interface away from the virtual object and into virtual free space. This movement by the user can provide signals to the microprocessor that the user intends to disengage that particular grip, at which time the machine releases all restrictions to motion for that limb through the VR movement apparatus controls.

Figure 18:
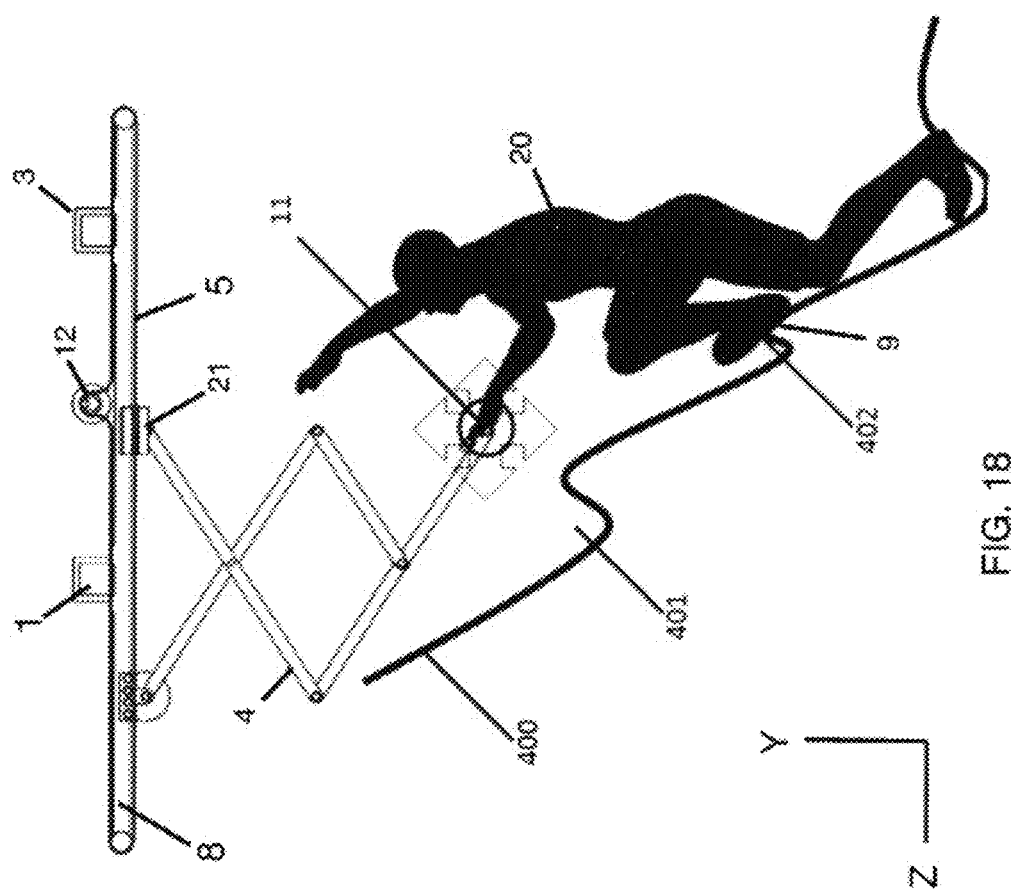
FIGS. 18-20 illustrate side views of a user on an embodiment on a VR movement apparatus with a VR terrain.

FIG. 18 shows a side view of a virtual surface 400 that a user 20 virtually interacts with. The VR software can designate a plurality of points a three dimensional space within this virtual environment as 'solid' surface or a 'not solid' open space. When the user moves the end effectors 11 in 'not solid' space, the user's hands or feet can move unencumbered in all directions. When the user moves the end effectors 11 into a 'solid' surface, the user's hands or feet can move be virtually stopped in the direction of the virtual surface. In this example, the user's foot end effector 9 intersects with a protrusion in the virtual terrain 402. This feels solid to the user, since the VR software has determined that the end effector 9 rests on a legitimately solid VR surface, a virtual protrusion in the virtual terrain 402. Therefore, the VR software has restricted motion of the foot end effector 9 in the downward direction of the virtual terrain 402 relative to the end effector 9 to simulate a foothold on the virtual terrain 402. The VR software may allow the foot end effector 9 in an upward or rearward direction relative to the virtual terrain 402. However, the user's hand end effectors 11 are in not solid open space and therefore they are free to move unrestricted in any direction within the virtual open space.

Figure 19:
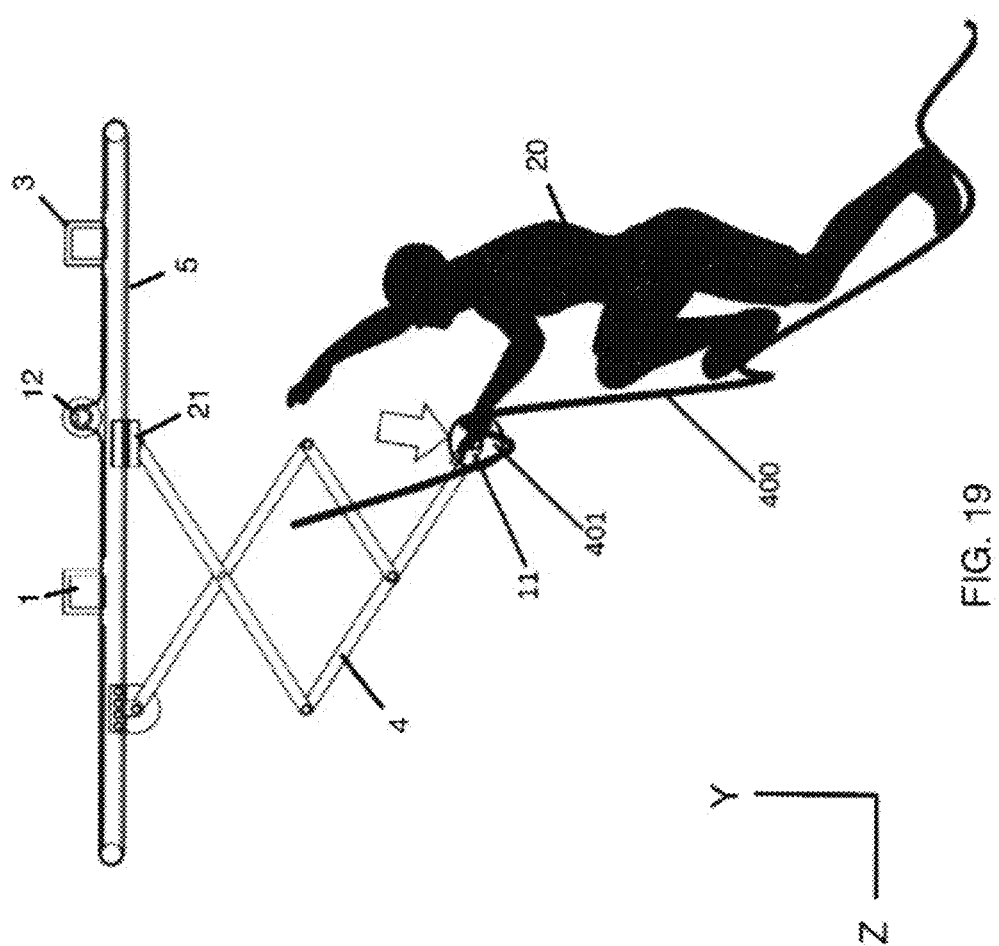

With reference to FIG. 19, the user may choose to locate their hand and end effector 11 into a protrusion 401, in order to climb higher in the virtual terrain 400. The user 20 has virtually grabbed a virtual protrusion 401 in the virtual terrain 400 with a hand. The hand end effector 11 has intersected with a legitimate virtual protrusion 401 feature and performed a grabbing movement. The VR software has determined that the position of the end effector 11 is on the virtual protrusion 401. The VR software can respond to this virtual contact by restricting the movement of the end effector 11 in the downward direction of the virtual terrain 402 relative to the end effector 9. The VR software may also restrict the hand end effector 9 movements in the X and Z directions to simulate a handgrip on the virtual protrusion 401. However, the VR software may not restrict the movement of the hand end effector 9 in a vertical Y direction away from the virtual protrusion 401. Thus, the end effector 9 will no longer have complete free motion, which can provide a solid haptic feel to the user 20 to simulate a handhold of the virtual terrain 402.

Figure 20:
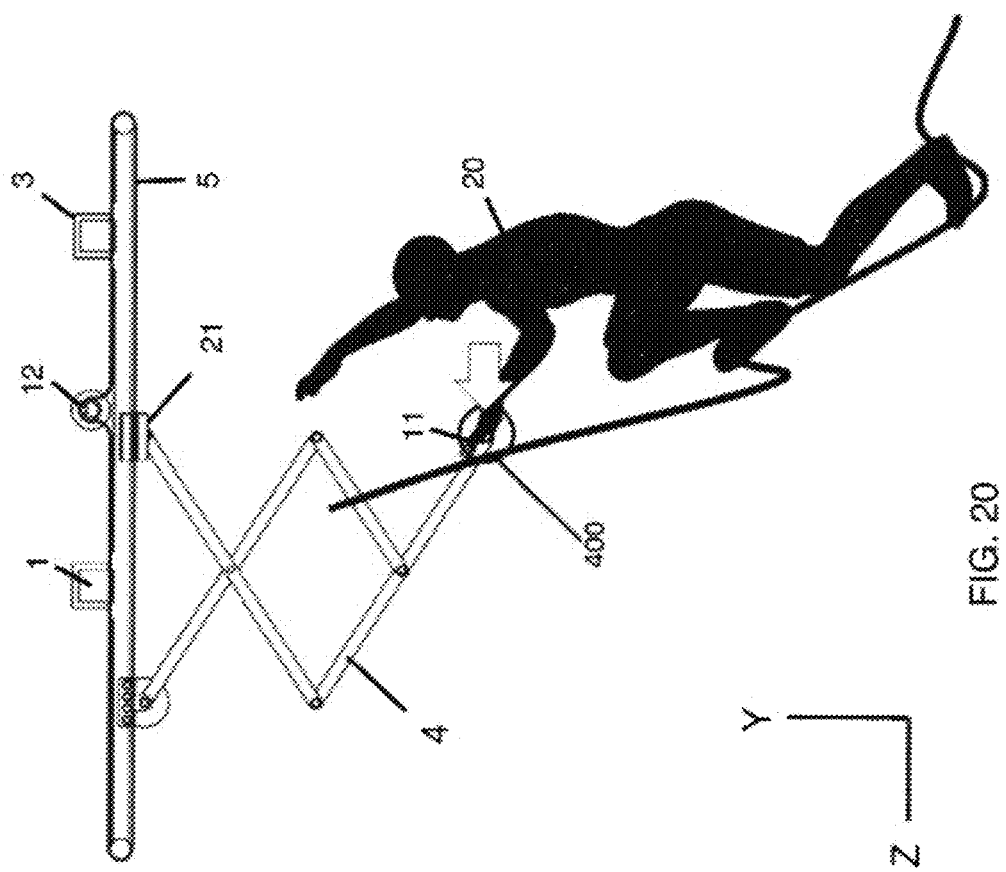

With reference to FIG. 20, a side view of a user 20 on the movement apparatus is illustrated. The user 20 is pushing against a virtual surface 400 that has no features for grabbing. In this case, the VR software has determined that the user's hand end effector 11 intersects with the virtual surface 400, and so it restricts continued motion along that vector in the Z direction into the virtual surface 400. However, the VR software but may not restrict the movement of the hand end effector 11 in the X or Y directions because the virtual surface 400 would not restrict the movement of the hand end effector 11 in these directions. In an embodiment, force sensors can determine that the user continues to push in the Z direction towards the virtual surface 400, and the VR software can continue to restrict this continued motion into the virtual solid surface 400. If the user chooses to withdraw their hand and hand end effector 11 from the virtual surface 400 in a negative Z direction, the VR software will sense motion in the opposite direction, and will immediately allow unencumbered motion in all directions to simulate the free hand movement in open space.

In an embodiment, the VR software can simulate a friction force of a virtual hand against a virtual surface 400. While the movement in the Z direction can be restricted by the virtual surface, movement of the end effector 11 in the X and Y directions can be restricted by a simulated friction force which can be represented by the equation, Friction Force≤(coefficient of friction)×Normal Force. If the coefficient of friction is 0.5 and the normal force is the Z direction force of 20 pounds, then the Friction Force≤10 pounds. This means that if the user exerts a force of less than 10 pounds in the X or Y directions, the end effector will not move because this X or Y direction force is less than 10 pounds. In contrast if the user exerts a force more than 10 pounds in the X or Y directions the end effector 11 will move in the direction of the force in the X or Y directions. The coefficient of friction can be variable and can depend upon the material of the virtual surface 400. A virtual surface 400 that is a slippery material such as ice will have a lower coefficient of friction than a high grip surface such as a rubber track. In an embodiment, the VR system can store multiple virtual surface 400 materials and different coefficients of friction for the different materials. The end effectors 11 can have force transducers, which measure the forces applied by the user 20 and the computer can use the coefficient of friction to calculate the friction forces to apply to the contact of the end effectors 11 with the virtual surfaces 400.

Figure 21:
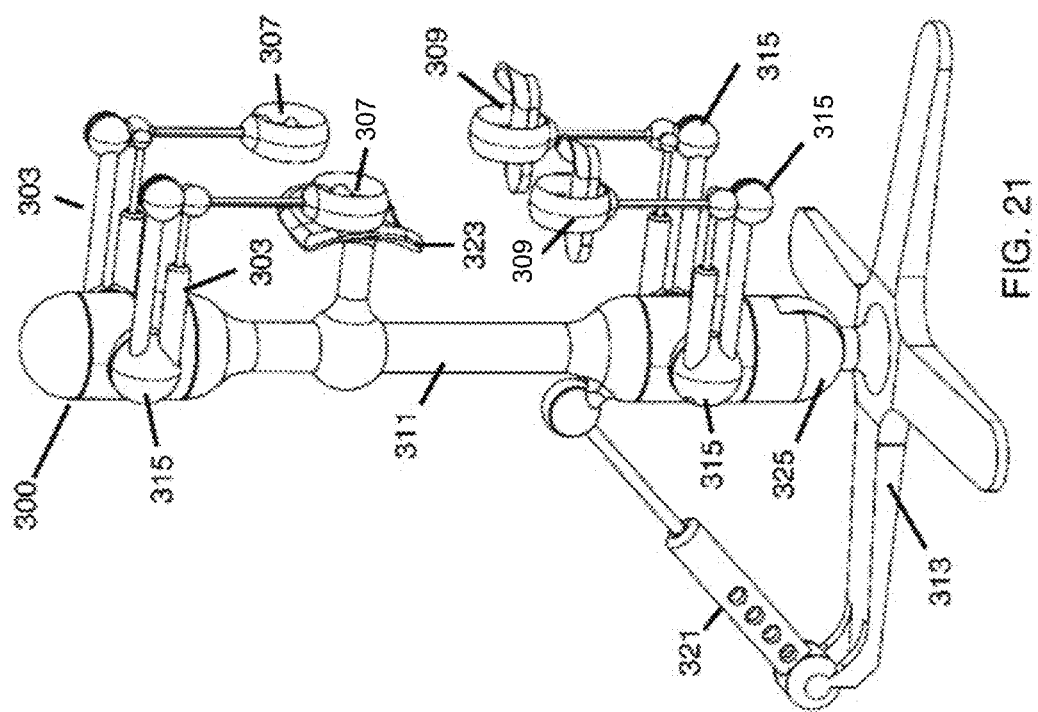
FIG. 21 illustrates perspective view of an embodiment of a VR movement apparatus.

While the present invention has been described with reference to VR movement apparatus that have a frame 1 which defines a movement perimeter and is described above with reference to FIGS. 1-17, in other embodiments, other VR movement apparatus can be used with the inventive system. For example, in an embodiment with reference to FIG. 21, the VR movement apparatus 300 can take the shape of a large robot that can be approximately 10 feet high with four articulated arms 303, each comprising three rotational joints at the X, Y and Z axes. Gimbal grips 307 for the hands, or foot bindings 309 on gimbals to hold the feet can be mounted to the distal ends of the arms 303. Similar gimbal grips 307 and foot bindings 309 can be used with the VR movement apparatus described above with reference to FIGS. 1-17.

To use the VR movement apparatus 300, the user steps into the foot bindings 309, and grips the hand gimbal grips 307. The user can also wear a virtual reality headset that can include a visual display and headphones placed into or over the ears to minimize outside sound and to create stereophonic, three-dimensional sound to further augment the experience.

The appearance of the VR movement apparatus 300 may comprise a central core 311 which can possibly be a cylindrical shaft that may be approximately 6 feet in length and 1 foot in diameter. The arms 303 can rotate about the central core 311, extending toward the user. The central core 311 can include another pivot 325 at the base 313, allowing the central core 311 to tilt rearward into 'prone' position by the movement of a tilt actuator 321, if the user chooses a virtual experience that is improved by lying prone (flying, swimming, etc.). In this case, a pad 323 would rest against the user's abdomen/chest (like a massage table) to steady the body, in order to isolate motion of the limbs.

The foot bindings 309 and the hand gimbal grips 307 allow the foot and hand to rotate around their ankle and wrist respectively, so that, although the hand and foot may rotate naturally, the force is translated back into the armature and overall motion. In an embodiment, the robotic arms 303 can include a motor driving each joint of the arms 303. There can be three joints 315 for each of the four arms 303 for a total of twelve joints 315. The total range of motion of each of the robotic arms 303 covers most or all of the range of motion of the corresponding human limb, allowing the user full range of motion while interacting with the VR movement apparatus 300. The motors can be integrated with the central core 311 of the VR movement apparatus 300, and coupled to the distal ends of the robotic arms 303 by drive shafts, belts or chain drives, thereby de-weighting the arm, thereby reducing the inertia caused by the arm's structure.

In an embodiment, the VR movement apparatus 300 can also include position sensors at each joint 315, thereby giving positional feedback to the CPU for each motion and location. Force sensors may also exist at each joint 315, enabling accurate control of the amount of force that can be applied to each motion path. These also accumulate data on the total amount of force given by the user, in order to determine the quality of their workout and the progress of their treatment.

In an exercise application, this user movement and force data can be sent to approved caregivers, in order to allow compliance monitoring, and to improve the quality of care. Because the VR environment is controlled by a computer processor, the 'Motion Environment' can function independently of an 'overlay', to allow the same workout (or physical therapy) to be offered to users with different VR tastes. Physical therapy motion paths to rehabilitation after hip replacement surgery, for example, may be overlaid with a VR environment that can simulate walking in a Tuscan hill-town for one, or storming Normandy for another, since different virtual experiences may be overlaid at will.

In another embodiment, the four-arm, articulated VR movement apparatus 300 can be used without motors. Instead, each of the 12 main joints 315 can be use with an electronically-activated clutch to engage, disengage, or precisely vary the amount of resistance at any vector of the arms 303 and connected linkages. In this way, the user would feel the force feedback, for example, when their hand 'touched' a table, since that motion direction would be denied by the engaging of the clutch to stop motion in that particular direction. A combination of clutch engagements (X, Y and Z) would result in the simulation of a physical surrounding.

In another embodiment, the foot bindings 309 and the hand gimbal grips 307 can each contain electromagnetic clutches at each pivot or joint 316 that can allow the VR software to control the VR movement apparatus 300. Depending up the VR environment being simulated, the VR software can allow free motion, stop all motion, or adjust the resistive force of the motion for each of the foot bindings 309 and the hand gimbal grips 307. This improves the quality of the simulation, for example, if a user chooses to 'virtually climb' the Eiffel Tower, the handgrips should suggest that they are gripping a solid, stationary object. In this case, the VR software would deny motion of the gimbal at the grip to improve the illusion. As the arms 303 of the VR movement apparatus 300 can move in sync with the climbing motion of the user, the grip would release pressure in a regulated manner so that the grip would move along with the motion that the user might expect.

In an embodiment, the inventive systems can be used with virtual gaming systems where users can wear VR headsets, where the player's eyes are focused on stereoscopic projections of a single environment, can provide visual images that provide a sense of transposition in a computer generated 3D virtual environment. These VR systems can effectively trick the eyes of a system user into believing that a transformation has taken place. Other VR systems can instead or additionally create a simulated immersive environment, where the user may turn their head in any direction, as one would in the 'real' world, further enhancing the sense of a virtual reality. However, this visual VR effect can be limited to the eyes, since the VR system only includes a headset that covers the eyes. These headsets used with the VR systems may only provide a limited overall sense of transposition, since the reality seen by the eyes often contradicts what should be felt by the hands and feet of the user. The inventive VR system overcomes these issues by coordinating the haptic senses with the visual senses in a VR environment. Coordinated motion of the four armatures may be used to create effects within the experience. The armatures may suddenly create a rapid descent, momentarily simulating the weightlessness that the user would feel in a real-world free-fall.

In different embodiments, the VR systems can be used for other applications including exercise. The obesity epidemic facing the US and beyond often points back to the sedentary lifestyle. Minimal exercise is required to maintain decent health, though a gym environment which may be the only option for many in bad weather locations can be less than compelling to many who are most in need of exercise. As discussed, the VR system can be a possible exercise apparatus, which can more enjoyable, more private and adjustable to the needs of the user.

Because the VR movement apparatus can be tuned to the specific needs of the user, it can be useful for physical therapy (PT). If undertaken for the correctly prescribed amount of PT exercise, will often rehabilitate a patient recovering from a medical intervention. But this PT treatment can be tedious and laborious, and is often dismissed by patients who may need to do PT alone. This, in effect, undermines the efficiency of the treatment. Physical Therapy often must be done with accurate, limited and deliberate motion (direction and range), and with specific force pressures correlated to the progress of the treatment. A PT would ideally prefer to prescribe a course of treatment with exact specifications, and closely monitor the results and progress. The VR movement apparatus can run VR software which can require a specific type of exercise and body movement, monitor the force feedback to insure compliance with a PT exercise schedule, store and forward the patient data to a physical therapist and doctors.

Both physical therapy and personal training base their success upon compliance and progress monitoring. Currently, the physical therapists and personal trainers outline a course of action for their patients and clients, assuming that they will receive honest and accurate progress reports from the patients and clients. The reality of this may vary greatly. For best results, the physical therapists and personal trainers could watch the progress remotely, and adjust the course of treatment as needed. The VR movement apparatus can run physical therapy or personal training software which can require a specific type of exercise and body movement, monitor the force feedback to insure compliance with a PT exercise schedule, store and forward the patient data to a physical therapist and doctors.

In different embodiments, the VR movement apparatus 100, 300, 505 can be used for various other applications. For example, Spinal Cord Injury (SCI) patients who require wheelchairs for motion must have professional physical therapy in order to allow regular motion to their limbs. This is costly, and requires dependence on another person for simply moving the legs. In an embodiment, the VR movement apparatus 300 can be used to exercise the patient's legs only. Additionally, for this population, a source of escapism and sense of physical freedom offers a quality of life improvement.

In some embodiments, the VR movement apparatus 100, 300, 505 can be used for other health issues. Obesity remains a major health concern for the world. Children now grow up playing video games, sedentary, for long hours. This is a primary cause of Type II Diabetes, heart issues, digestive issues, and, ultimately, limb loss. Children often prefer video games over gyms, playgrounds, fields and other physical outdoor activities. They need a source of exercise that, in their perception, is a video game. Ideally, this 'video game' is more compelling than what can be found at home, giving them a reason to immerse in a greater experience. In an embodiment, the VR movement apparatus 100, 300, 505 can be used with video game VR software that can be designed to be entertaining to the children and may simulate outdoor physical activity.

People with different personalities may be motivated to physical activity by different forms of motivation. While one person may be inspired by competition, another may choose escapism, and another chooses instead physical training or learning new skills. Current gym equipment does not respond to individual interests or inspirations. Equipment that could deliver user-tailored workout environment experiences would likely motivate a new range of people to enjoy the benefits of physical fitness.

The proposed invention allows the user free range of motion, while giving the force feedback of physical contact with a virtual environment. The users may choose where to locate their handholds and footholds as they climb, inviting them to explore however they choose. Because the virtual environment is created by computer, it may be scaled or adapted to the needs of each user.

Figure 22:
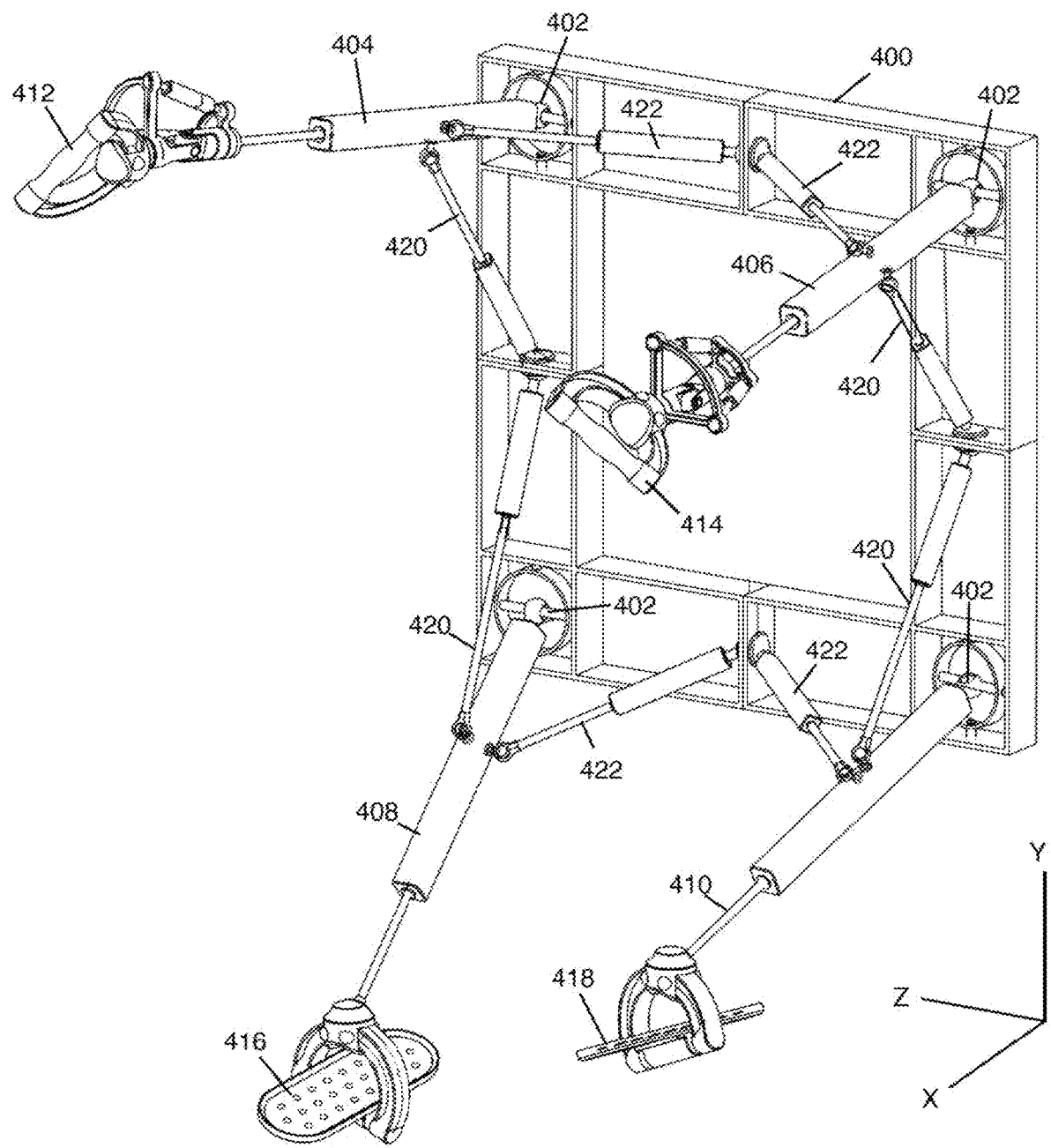
FIG. 22 illustrates perspective view of an embodiment of a VR movement apparatus.
Figure 23:
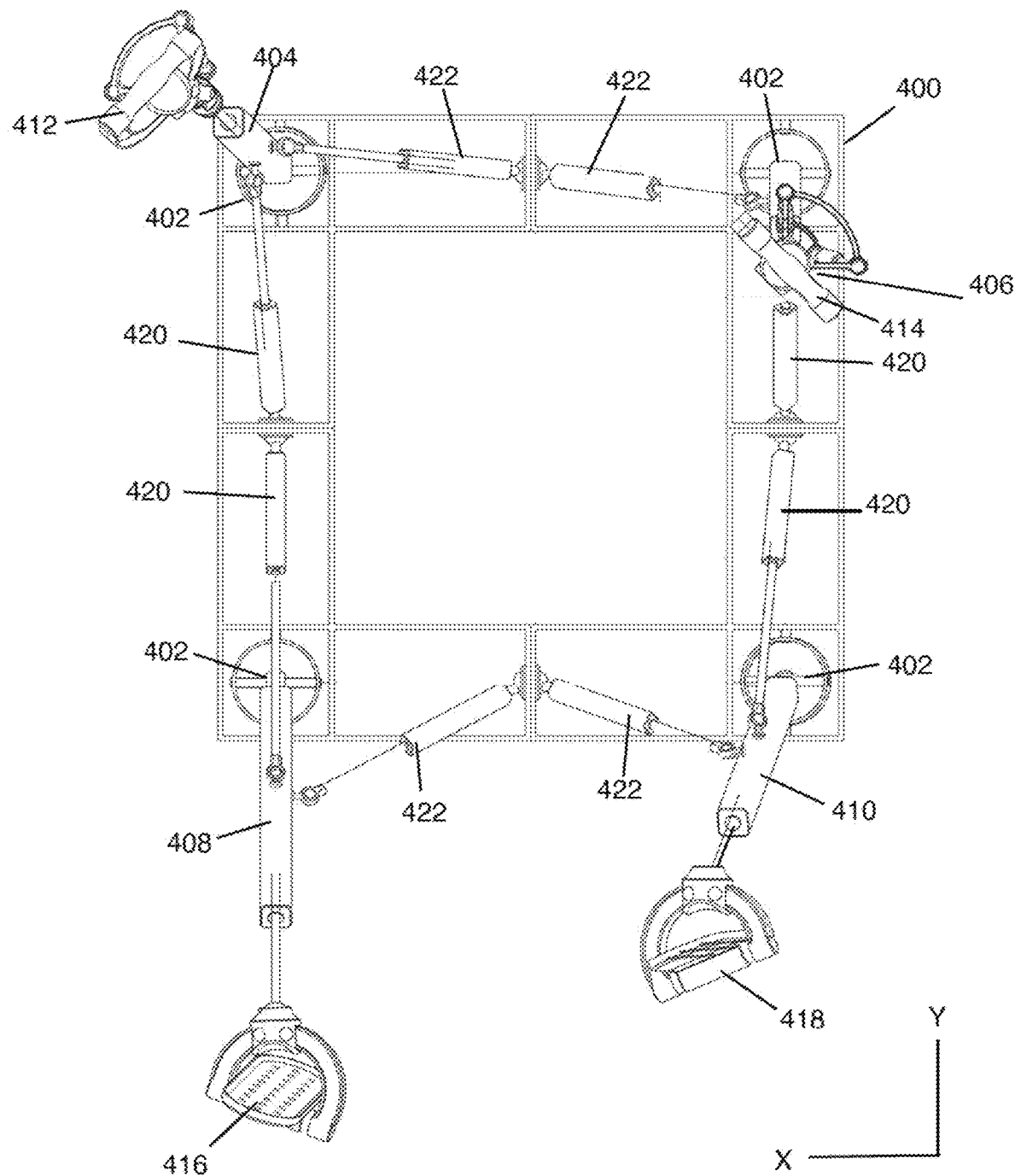
FIG. 23 illustrates front view of an embodiment of a VR movement apparatus.
Figure 24:
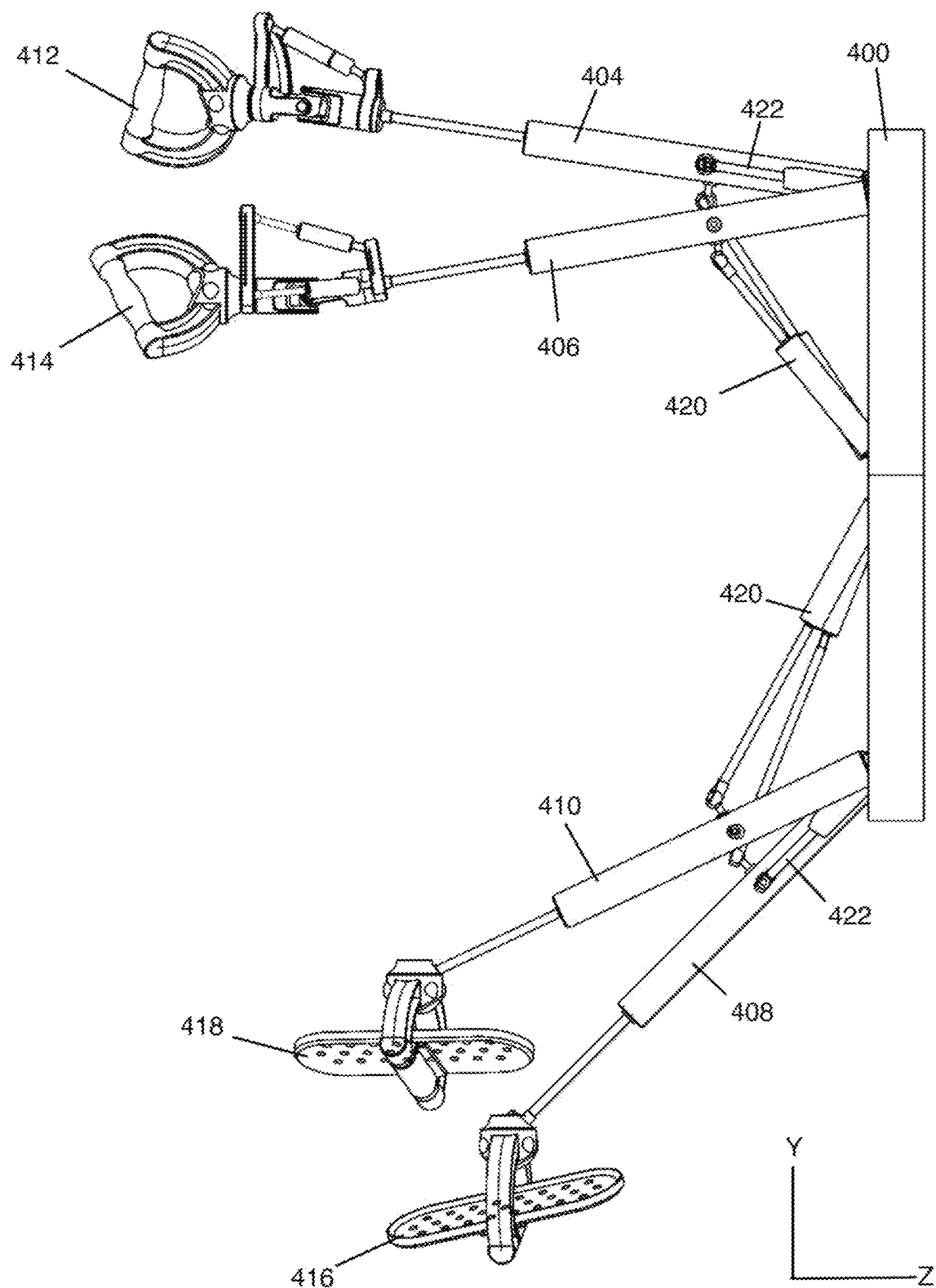
FIG. 24 illustrates side view of an embodiment of a VR movement apparatus.

With reference to FIGS. 22-24, in yet another embodiment the VR haptic movement apparatus. FIG. 22 illustrates a perspective view, FIG. 23 illustrates a front view and FIG. 24 illustrates a side of the VR haptic movement apparatus. The VR haptic movement apparatus can utilize four linear actuators 404, 406, 408, 410 which have proximal ends that are mounted on a frame 400 and distal ends coupled to the hand grips 412, 414 and foot holds 416, 418. The frame 400 can be rigidly mounted to a wall or the frame 400 can be rigidly secured to a floor. In the illustrated embodiment, the VR movement apparatus has four actuators: a left hand actuator 404, a right hand actuator 406, a left food actuator 408, and a right foot actuator 418. Each of the hand actuators 404, 406 and foot actuators 408, 410 can have a primary linear actuator that extends outward in the X direction away from the frame 400. Frame gimbals 402 can be mounted to the frame 400 to allow the hand actuators 404, 406 and foot actuators 408, 410 to rotate freely relative to the frame 400. The distal ends of the hand actuators 404, 406 are coupled to the hand grips 412, 414 with hand grip interfaces 426. The distal ends of the foot actuators 408, 410 are coupled to the foot holds 416, 418 with foot hold interfaces 428.

In the illustrated embodiment, two angular control linear actuators 420, 422 can control the angular positions of each of the primary linear actuators 404, 406, 408, 410 relative to the frame 400. The distal ends of the angular control linear actuators 420, 422 can be coupled to a middle portion of the primary linear actuators 404, 406, 408, 410 and the proximal ends of the angular control linear actuators 404, 406, 408, 410 can be coupled to the frame 400. In the illustrated embodiment, vertical angular control linear actuators 420 can be configured to control the vertical rotational position of the corresponding hand grip 412, 414 or foot hold 416, 418. Horizontal angular control linear actuators 422 can be configured to control the horizontal rotational position of the corresponding hand grip 412, 414 or foot hold 416, 418.

In the illustrated embodiment, the proximal end of the vertical angular control linear actuators 420 can be vertically aligned with the proximal end of the primary linear actuators 404, 406, 408, 410 and the proximal end of the horizontal angular control linear actuators 422 can be horizontally aligned with the proximal end of the primary linear actuators 404, 406, 408, 410. The proximal ends of the primary linear actuators 404, 406, 408, 410 and the angular control linear actuators 420, 422 can be rotational couplings that allow the primary linear actuators 404, 406, 408, 410 to rotate relative to the frame 400. By controlling the extensions of the primary linear actuators 404, 406, 408, 410 and the angular control linear actuators 420, 422, the positions of the corresponding hand grips 412, 414 and foot holds 416, 418 can be precisely positioned within a limited hemispherical volume extending away from the plane of the frame 400. The range of motion of the primary linear actuators 404, 406, 408, 410 can control the range of motion of the hand grips 412, 414 and foot holds 416, 418.

In the illustrated embodiment, the hand grips 412, 414 can coupled to angular and rotational controls that are coupled to a controller. The primary linear actuators 404, 406, 408, 410 and the angular control linear actuators 420, 422, control the positions of the corresponding hand grips 412, 414 and foot holds 416, 418. Each of the linear actuators can be coupled to a controller which can normally allow free movement or prevent movement of the user's hands and feet. The controller can also restriction the movements of the hand grips 412, 414 and foot holds 416, 418. The restricted movements can correspond or be synchronized with visual signals that is displayed on a VR headset worn by the system user. As discussed, the controller can prevent the movement of the hand grips 412, 414 and foot holds 416, 418 through virtual solid objects which can also be displayed through the VR headset. The controller can allow but provide resistance against movement of the hand grips 412, 414 and foot holds 416, 418 through virtual loose, elastic or fluid materials. For example, the system may provide movement resistance to the foot holds 416, 418 when a user is virtually running through surfaces such as snow, sand, water, mud, etc.

In the illustrated embodiment, the linear actuators 404, 406, 408, 410, 420, 422 are elongated structures that extend and contract in a straight line. The variable length of the linear actuators 404, 406, 408, 410, 420, 422 are controlled by a controller that can transmit control signals to the linear actuators 404, 406, 408, 410, 420, 422. The control signals can be electrical signals which drive electric motors. In an embodiment, the linear actuators 404, 406, 408, 410, 420, 422 can include a rod that moves within a housing. The movement of the linear actuators 404, 406, 408, 410, 420, 422 can be controlled by linear motors in the housings which can be functionally the same as a rotary electric motor with the rotor and stator circular magnetic field components laid out in a straight line. The linear motor can have magnetic pole faces and magnetic field structures that extend across the length of the actuator. Since the linear motor moves in a linear fashion, no lead screw is needed to convert rotary motion to linear. The linear actuators can be telescoping linear actuators made of concentric tubes that extend and retract like sleeves, one inside the other, such as the telescopic cylinder. The linear actuators can use actuating members that act as rigid linear shafts when extended. In other embodiments, the linear actuators 404, 406, 408, 410, 420, 422 can be controlled by other mechanisms such as pistons that slide within cylinders with hydraulic pressure or threaded lead screws that rotated within threaded couplings where the speed of the rods is proportional to the rotational velocity of the rods. In an embodiment, the linear actuator can be made an electric cylinder EPCO made by Festo.

Figure 25:
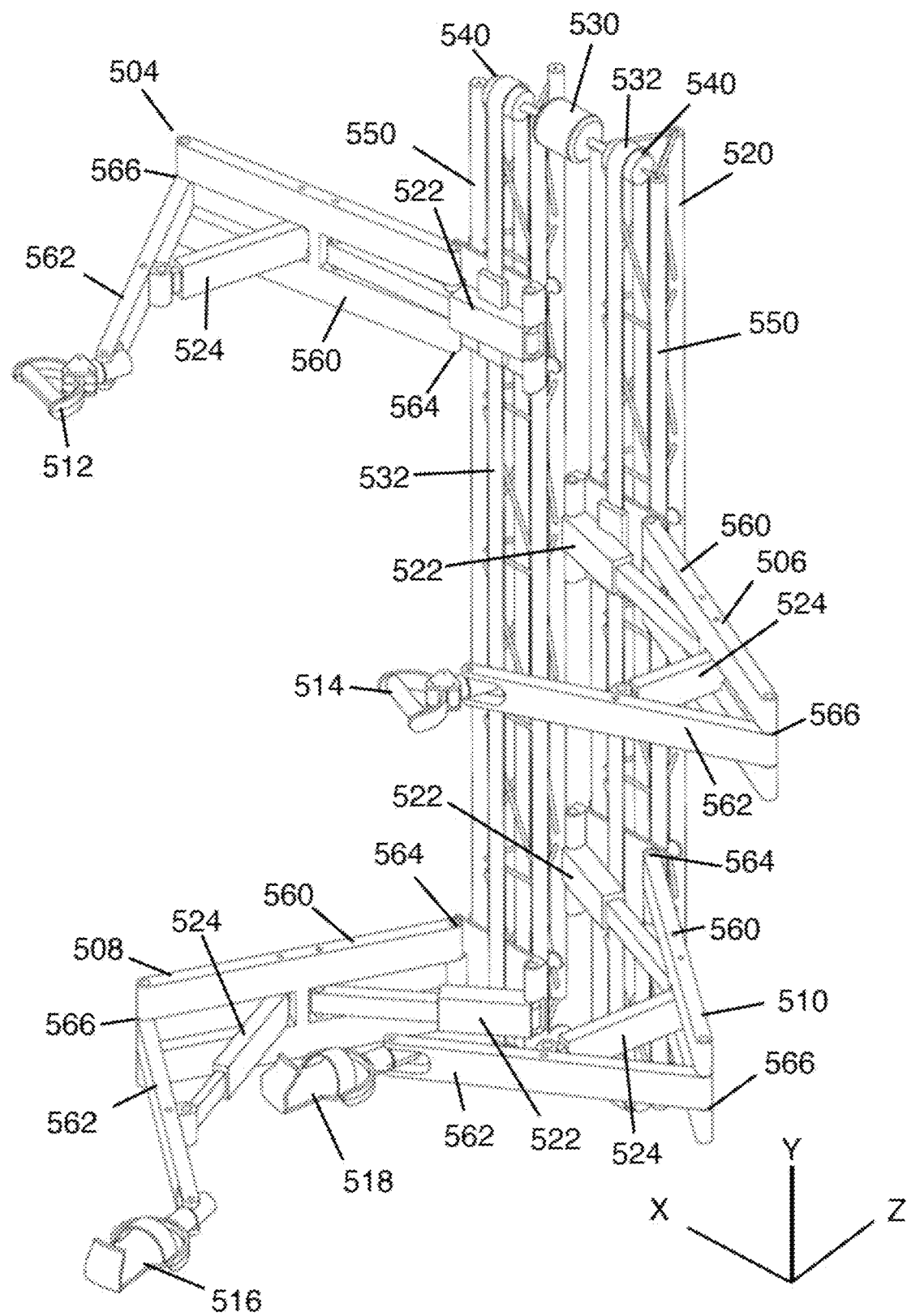
FIG. 25 illustrates perspective view of an embodiment of a VR movement apparatus.

With reference to FIG. 25 in yet another embodiment of the VR haptic movement apparatus is illustrated. In this embodiment, the frame 520 coupled to a left hand actuator 504, a right hand actuator 506, a left foot actuator 508, and a right foot actuator 510. Each of the limb actuators 504, 506, 508, and 510 are coupled to vertical actuators which include: cars 542, belts 532, tracks 550, motors 530 and pulleys 540. The cars 542 are coupled to belts 532. The cars 542 travel on vertical tracks 550 which are rigidly coupled to the frame 520. The belts 532 are configured parallel to the vertical tracks 550 and the belts 532 and cars 542 can be moved with motors 530 which control the vertical positions of cars 542 which are coupled to the left hand actuator 504, the right hand actuator 506, the left foot actuator 508, and the right foot actuator 510. The belts 532 can be mounted on pulleys 540 that are on the top and bottom of the frame 520. The pulleys 540 can rotate on axis that is horizontal and parallel to the plane of the frame 520.

The left hand actuator 504, the right hand actuator 506, the left foot actuator 508, and the right foot actuator 510 can each include an inner arm 560 and an outer arm 562. Proximal ends of the inner arms 560 can be coupled to the cars 542 with car hinges 564 having a vertical axis of rotation. Similarly, the distal ends of the inner arms 560 can be coupled to outer arms 562 with arm hinges 566 also having a vertical axis of rotation. Thus, the vertical axis of rotation of the car hinges 564 and the arm hinges 566 are parallel to the plane of the frame 520. The left hand grip 512 is coupled to the distal end of the left hand actuator 504 and the right hand grip 514 is coupled to the distal end of the right hand actuator 506. The left foot hold 516 is coupled to the distal end of the left foot actuator 508 and the right foot hold 518 is coupled to the distal end of the right foot actuator 510.

The vertical positions of the left hand actuator 504, the right hand actuator 506, the left foot actuator 508, and the right foot actuator 510 are controlled by the positions of the cars 542 and vertical belts 532. The inner arms 560 and outer arms 562 can move within horizontal planes which are perpendicular to the plane of the frame 520. Extension actuators 524 can each have a proximal end coupled to a middle portion of the inner arms 560 and a distal end coupled to a middle portion of the outer arms 562. The extension actuators 524 can contract to reduce or expand to increase the distances between the cars 542 and the corresponding distal ends of the left hand actuator 504, the right hand actuator 506, the left foot actuator 508, and the right foot actuator 510. The angular position of the distal ends of the left hand actuator 504, the right hand actuator 506, the left foot actuator 508, and the right foot actuator 510 relative to the corresponding cars 542 can be controlled by the horizontal angular actuators 522. In the illustrated embodiment, contraction of the horizontal angular actuators 522 in the left hand actuator 504 and the left foot actuator 508 will cause the distal ends of these actuators 504, 508 to move from left to right in a negative X-axis direction and expansion of the horizontal angular actuators 522 in the left hand actuator 504 and the left foot actuator 508 will cause the distal ends of these actuators 504, 508 to move from right to left in a positive X-axis direction. Conversely, contraction of the horizontal angular actuators 522 in the right hand actuator 506 and the right foot actuator 5100 will cause the distal ends of these actuators 506, 510 to move from right to left in a positive X-axis direction and expansion of the horizontal angular actuators 522 in the left hand actuator 504 and the left foot actuator 508 will cause the distal ends of these actuators 504, 508 to move from left to right in a negative X-axis direction. The inner arm of the actuators 504, 506, 508, 510 are coupled to cars 542 with a car hinge having a vertical axis. Thus, the movement of the horizontal angular actuators 522 causes the actuators 504, 506, 508, 510 to rotate about the hinge coupled to cars 542.

In the illustrated embodiment, the actuators 504, 506, 508, 510 have an inner arm 560 and an outer arm 562 that are coupled to an arm hinge having a vertical axis. The extension actuator 524 can include a proximal end coupled to a middle portion of the inner arm 560 and a distal end coupled to the middle portion of the outer arm 562. The contraction of the extension actuator 524 causes the outer arm 562 to rotate about the arm hinge towards the inner arm 560 and expansion of the extension actuator 524 causes the outer arm 562 to rotate about the arm hinge away from the inner arm 560. The horizontal positions of the left hand grip 512, right hand grip 514, left foot hold 516 and right foot hold 518 are controlled by the angular actuator 522 and extension actuator 524. Thus, linear movement of the left hand grip 512, right hand grip 514, left foot hold 516 and right foot hold 518 in the horizontal plane requires the coordinated controlled actuation of the angular actuator 522 and extension actuator 524. Similarly, linear movement in three dimensional space of the left hand grip 512, right hand grip 514, left foot hold 516 and right foot hold 518 in the horizontal plane requires the coordinated controlled actuation of the angular actuator 522, extension actuator 524 and the vertical actuators.

In the illustrated embodiment, the left hand actuator 504, the right hand actuator 506, the left foot actuator 508, and the right foot actuator 510 are each coupled to a car 542 which is coupled to a belt 532 driven by a motor 530 that moves the car 542 on a track 550. The tracks 550 can be tubular straight structures. The cars 542 can have bearings, bushings or wheels that allow the cars 542 to smoothly travel up and down the track 550 with low movement friction.

In an embodiment, two cars 542 can be releasably attached to each of the two belts 532. More specifically, a first belt 532 can be releasably coupled to a first car 542 attached to the left hand actuator 504 and a second car 542 attached to the right hand actuator 506. When the car 542 is attached to the belt 532, the car 542 will move with the belt 532 and when detached from the belt 532, the car 542 can be locked in a stationary position on the track 550. The cars 542 A user will normally move the left hand vertically, while the right hand is vertically stationary and move the right foot vertically while the left foot is stationary. The system can respond by attaching the left hand actuator 504 to the belt 532 and moving the belt 532 in the direction of user's left hand movement. Simultaneously, the right hand car 542 can be released from the belt 542 and held in a stationary position on the track 550 while the right foot is stationary. The right hand actuator 504 can be attached to the belt 532 and the belt 532 can be moved in the vertical direction of user's right foot movement. Simultaneously, the left foot car 542 can be released from the belt 542 and held in a stationary position on the track 550 while the left foot is stationary. The user may then switch the vertical movements by stopping the vertical movement of the left hand and right foot and switching to move the right hand and the left foot. The system can respond by releasing the left hand car 542 and the right foot car 542 and locking these cars 542 in stationary vertical positions on the track 550 and attaching the right hand car 542 and the left foot car 542 to the belts 532. The system can track the movement of the user's right hand and left foot. The system can track these movements and move the belts 532 to match the right hand and left foot movements.

Figure 26:
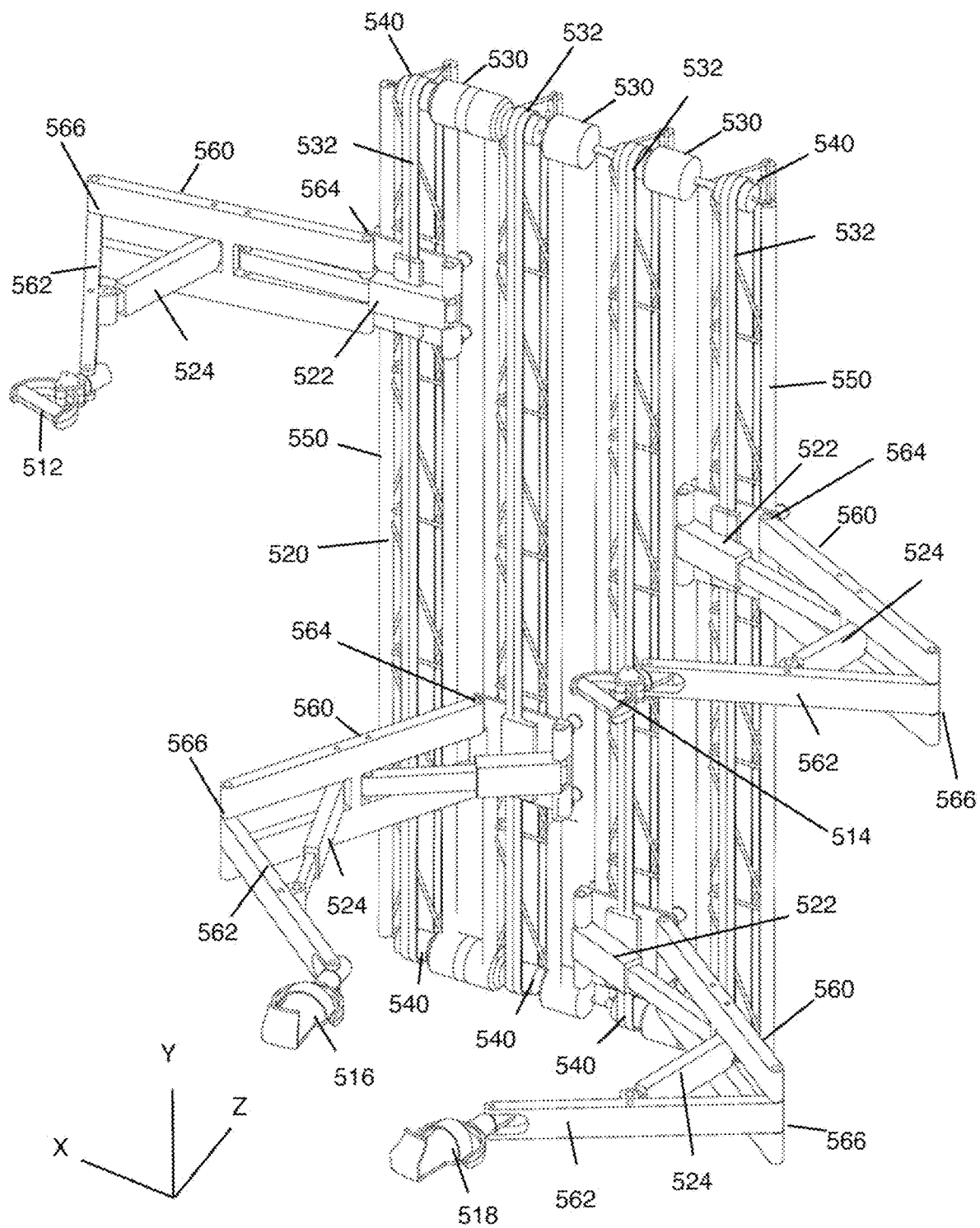
FIG. 26 illustrates perspective view of an embodiment of a VR movement apparatus.

In other embodiments, with reference to FIG. 26, the cars 542 of the left hand actuator 504, the right hand actuator 506, the left foot actuator 508 and right foot actuator 510 of the VR haptic system can each be coupled to one of the four separate belts 532. In this embodiment, the cars 542 can be attached to the belts 532 without having a release mechanism that releases the car 542 from the belt 532 and secures the car 542 to the track 550. In this system, the controller can move each of the cars 542 attached to the left hand actuator 504, the right hand actuator 506, the left foot actuator 508 and right foot actuator 510 independently based upon the detected or predicted movements of the user's hands and feet.

Figure 27:
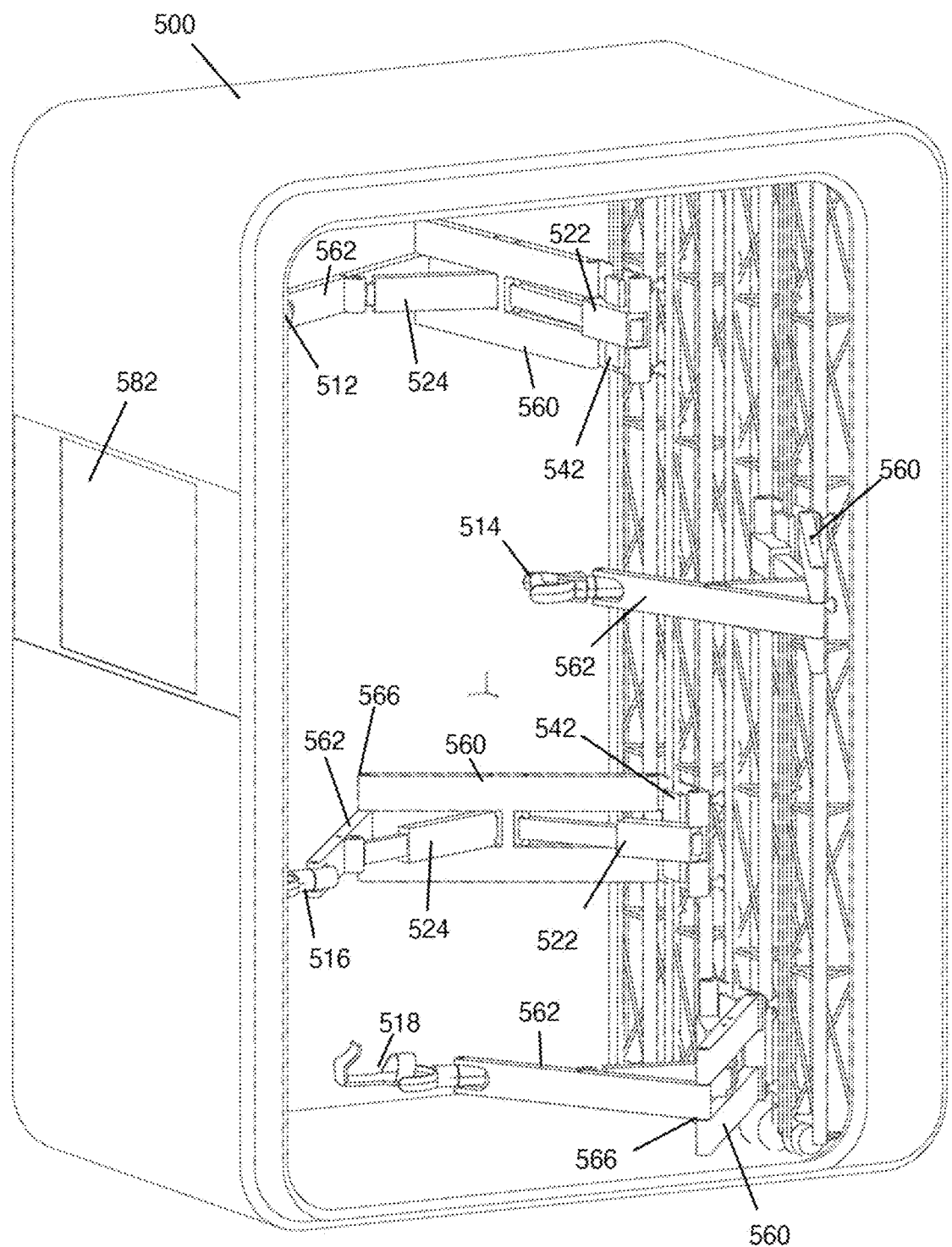
FIG. 27 illustrates perspective view of an embodiment of a VR movement apparatus in a housing.

With reference to FIG. 27, the VR haptic movement apparatus is illustrated in a housing unit 500 which surrounds the user. The housing 500 can provide a rigid structure which can provide support the user's weight and the entire VR haptic movement apparatus. In this embodiment, the housing 500 is a box structure which has open sides. The user can enter the housing 500 through a side opening and place the feet in the foot holds 516, 518, wear the VR googles and grasp the hand grips 512, 514. The interior volume of the housing 500 can be sufficient to allow the user to move in the full range of motion of the VR haptic movement apparatus. Thus, the full extension of the outer arm 562 and the inner arm 560 relative to the car 542 on the track 550. In an embodiment, the housing unit 500 can also include a user interface 582 which can be a visual touch screen device which can allow users or observers to control the settings or view the VR environment that the user is experiencing.

In an embodiment, the handholds and possibly the footholds can utilize universal joint grips that are coupled to joystick potentiometers for movement "intention detection." When using the haptic system, the user's quality of the experience correlates to the tactile 'invisibility' of the mechanical interface. The virtual reality physical illusion created by the system can depend on the users feeling that their hands are moving in an unencumbered manner. This physical unencumbered illusion can occur when the user does not feel the presence of that physical armature coupled to the handhold.

In an embodiment, the haptic system can detect a user's hand motion using sensitive pressure sensors in all directions in order to detect the slightest pressure. However, pressure sensors are expensive, may cause physical resistance to the user's motion in order to detect motion, and must be located relatively orthogonally to any potential motion by the user. Furthermore, sensors may only detect a narrow range of hand force pressures. Thus, both a fine pressure sensor and a heavier pressure sensor may be needed to cover the entire pressure range that a user's hand may exert during the operation of the haptic system. Achieving this illusion result can be difficult, since the device must detect the slightest intention of motion by the user's hand, without causing physical feedback detectable by the user.

With reference to FIGS. 28-33, an embodiment of a hand hold interface 451 with integrated pressure sensors 453 is illustrated. The hand hold interface 451 can have a handgrip 463 that is always held by the system user. The handgrip 463 can be connected to the machine using a universal joint, which allows for free, unencumbered motion of the user's hand in rotation and translation. The handgrip 463 can have a rod 459 which can have a rotational coupling that can allow or resist rotational movement of the handgrip 463. The rod 459 can be suspended by spring, piston, counterweight, or other method to a surrounding frame housing 457. In the illustrated embodiment, the rod 459 can be concentrically positioned within the interior volume of the cylindrical housing 457. A gimbal 455 is coupled to a proximal portion of the rod 459 and the housing 457. A sensor 453 can be coupled to a proximal portion of the housing 457 and the proximal end of the rod 457 so that movement of the handgrip 463 relative to the housing 457 will result in movement of the sensor 453. In an embodiment, the sensor 453 can have a joystick lever 465 mechanism which can detect the movement of the handgrip 463 relative to the housing 457 causes movement of the joystick sensor 453.

Figure 28:
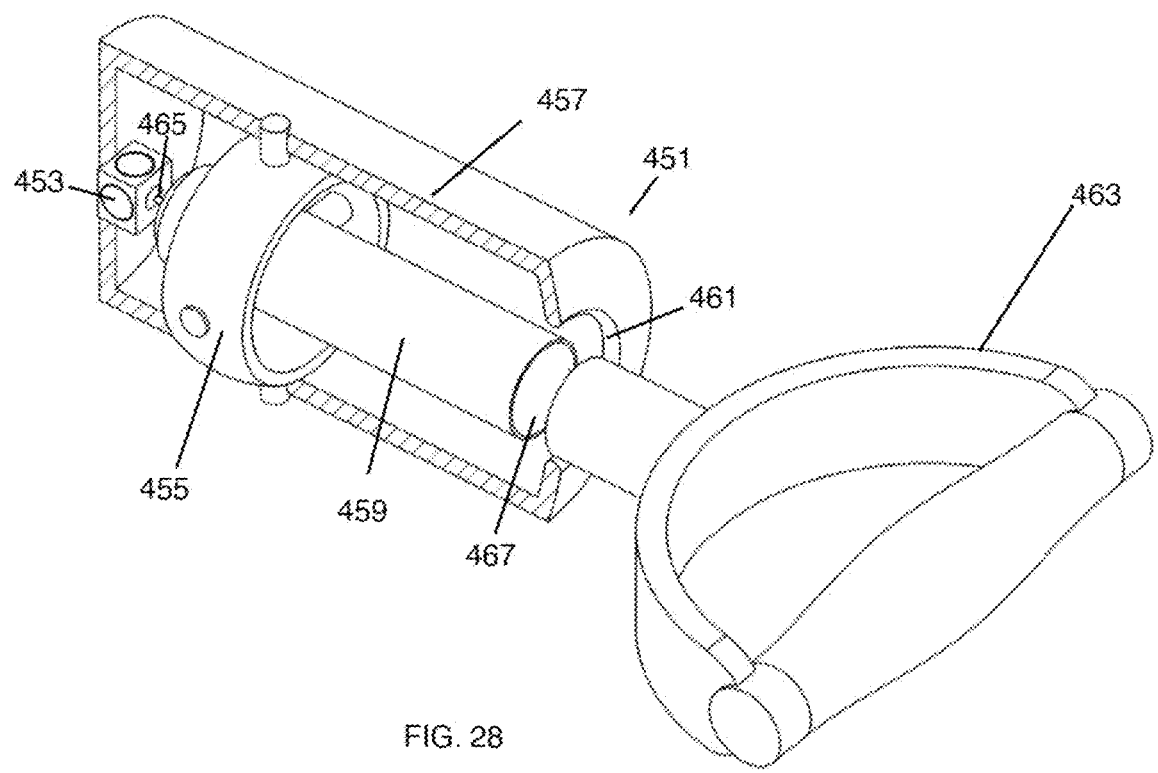
FIGS. 28-33 illustrates perspective and side views of an embodiment of a hand hold interface.
Figure 29:
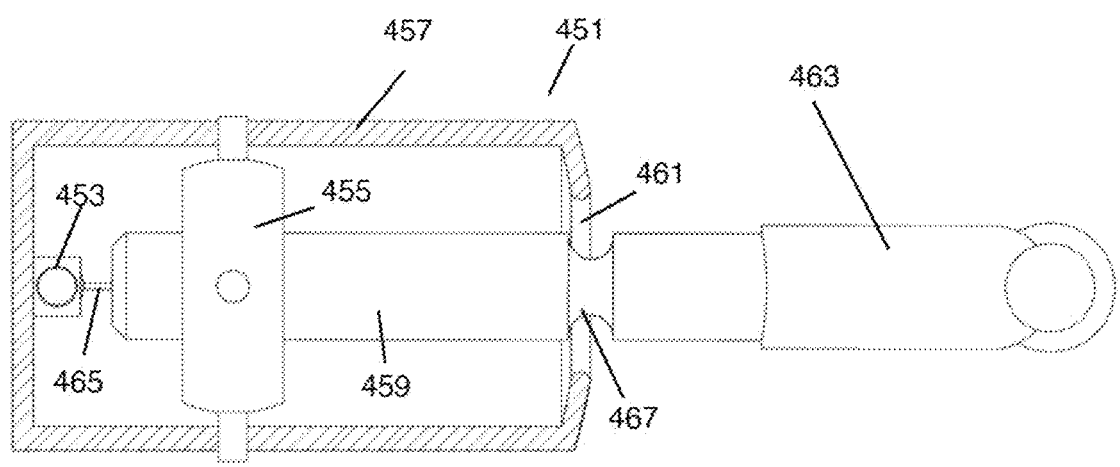

FIG. 28 is a perspective view of the sensor handgrip 451 and FIG. 29 is a side view of the sensor handgrip 451 that is suspended in a 'center-neutral' position with the rod 459 positioned in the center of the circular opening 461. The rod 459 can have a groove 467 which can be positioned adjacent to the edge of the circular opening 461. In an embodiment, the sensor handgrip 451 is able to translate in and out along a center axis, using telescoping components, which are connected to a linear potentiometer in order to measure that linear motion. In an embodiment, the telescoping components and linear potentiometer can be placed in the rod 459. In an embodiment, the telescoping components can also include a spring mechanism that can hold the telescoping components in a normal position when no compression or tension forces are applied to the telescoping components. When a compression force is applied to the sensor handgrip 451, the spring can be compressed and the linear potentiometer can output a compression signal. Conversely, when a tension force is applied to the sensor handgrip 451, the spring can be extended and the linear potentiometer can output a tension signal. By using a combination of a sensor 453 coupled to gimbal 455 and linear potentiometer coupled with sliding mechanical components, the handgrip 451 is able to move a specified amount in any direction, and the motion can be accurately measured by the potentiometers. A sensor 453 component is mounted to either the handgrip 451 or the housing 457, with the moving sensor 453 component interfacing with the opposite component. More specifically, the sensor 43 housing can be mounted to the rod 459 and a movement mechanism can detect relative movement with the housing 457. In the illustrated embodiment, the sensor 453 housing is mounted to the housing 457 and a component interfacing with the proximal end of the rod 459 is a joystick lever 465.

The joystick lever 465 of the sensor 453 in the handgrip 451 and the linear potentiometer can be in communication with a controller which can receive electrical signals from the joystick sensor 453 and the potentiometer. Thus, the controller can detect any movement of the handgrip 451. In this way, any motion of the grip 451 from its 'center/neutral' position is immediately detected by a displacement of the lever of the joystick sensor 453, relative to the machine's armature rod 459. The controller can include a processor running software that is configured to make the articulated armature keep the joystick lever of the joystick sensor 453 always at 'center-neutral' position (rod 459 centered in the circular opening 461) when the hand grip is in a virtual free movement space. More specifically, the controller will cause the corresponding primary linear actuator to be moved to counteract any displacement of the joystick lever so the articulated armature rod 459 is moved to the center of the circular opening 461 and the joystick lever 465 of the joystick sensor 453 is re-centered. The overall effect is that the user does not feel weight or resistance of the armature, since it always 'follows' the motion of a neutrally suspended grip 451, at a faster pace than the user can move. However, the controller can prevent or resist movement of the hand grip or foot hold through virtual objects.

Figure 30:
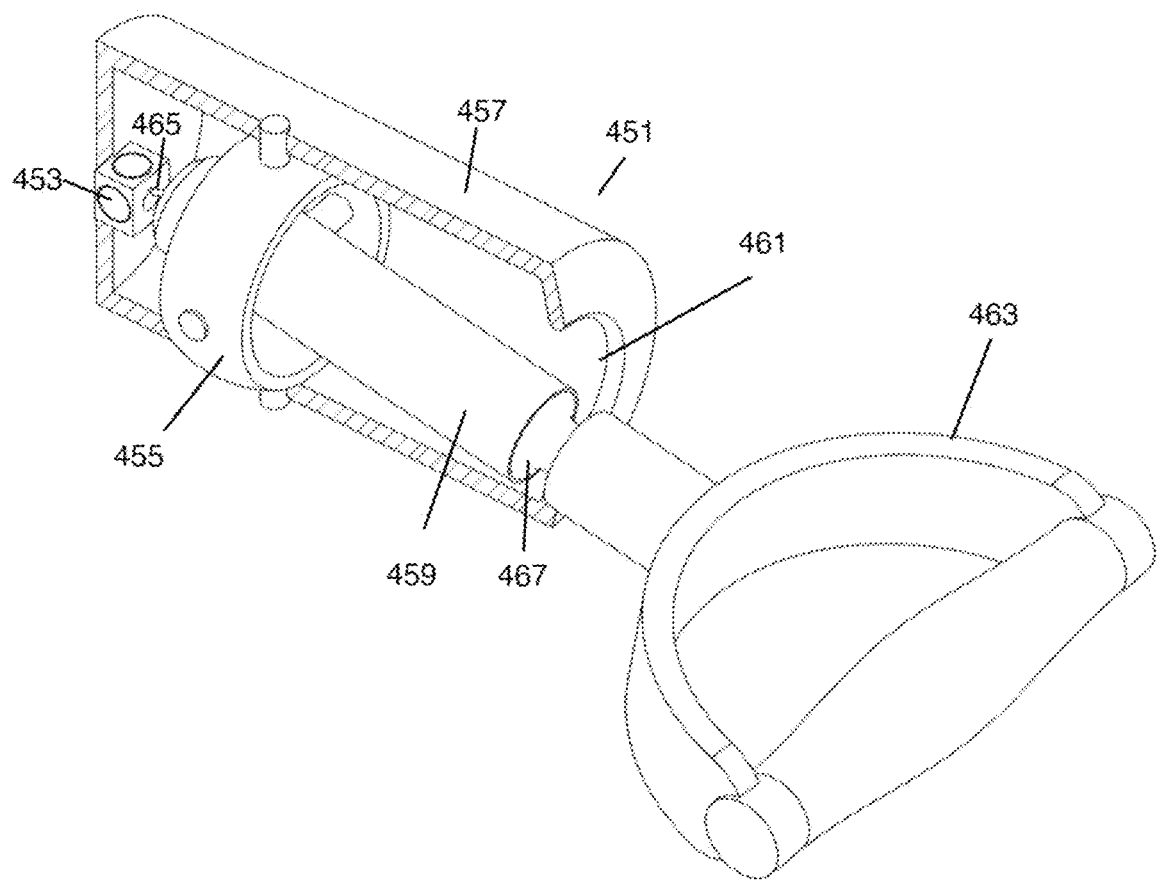
Figure 31:
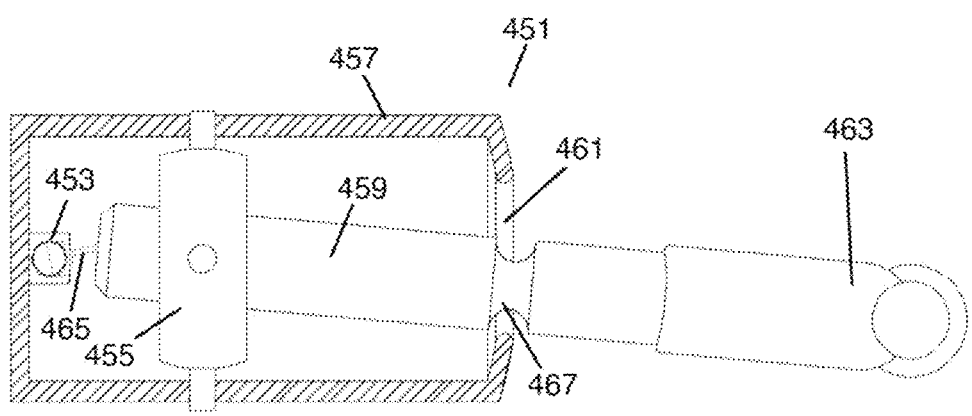

With reference to FIG. 30 is a perspective view of the movement sensor handgrip 451 and FIG. 31 is a side view of the sensor handgrip 451. The handgrip 463 and rod 459 have been moved by the user out of the 'center/neutral' position in the that is in an off center position with the rod 459 positioned lower than the center/neutral position in the circular opening 461. This movement of the rod 459 indicates that the user has initiated a move of the handgrip 463 in a downward direction. The system can detect any movement direction within a 360-degree sphere that can be moved in by the user based upon the movement of the rod 459 in combination with compression or tension detected by sensors such as potentiometers. In other embodiments, the compression or tension can be detected with other sensors such as strain gages. The joystick sensor 453, opposite the handgrip 463, has detects the movement and emits an electrical signal that the user is moving in a direction. The electrical movement signal can be communicated to the controller CPU, which can interpret this signal as a motion by the user. The CPU can calculate the motion required to return the joystick sensor 453 back to a 'centered/neutral' position. The controller CPU can cause the distal end of the corresponding linear actuator can move as rapidly as the user's hands or feet to restore the centered/neutral position of the joystick sensor 453. Thus, the controller CPU can 'mirror' the user's motion.

As discussed, the hand grips and foot holds are attached to the distal ends of different primary linear actuators. During normal operation, the controller CPU can respond to this detected movement by moving the distal end of the primary linear actuator to re-center the rod 459 in the circular opening 461. Because the system moves the hand grips and foot holds in response to user movements, the user does not detect that the hand grips and foot holds are following the user's motion. In an embodiment, the controller can predict the movements of the user's limbs and move the distal end of the primary linear actuator to the predicted future positions.

Figure 32:
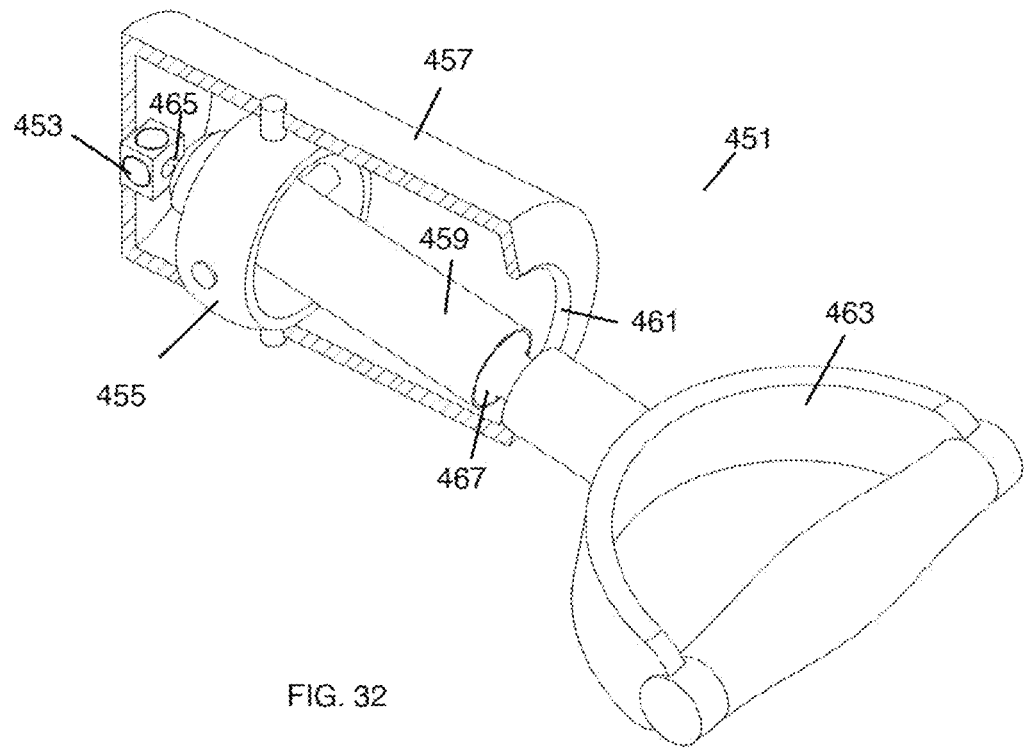
Figure 33:
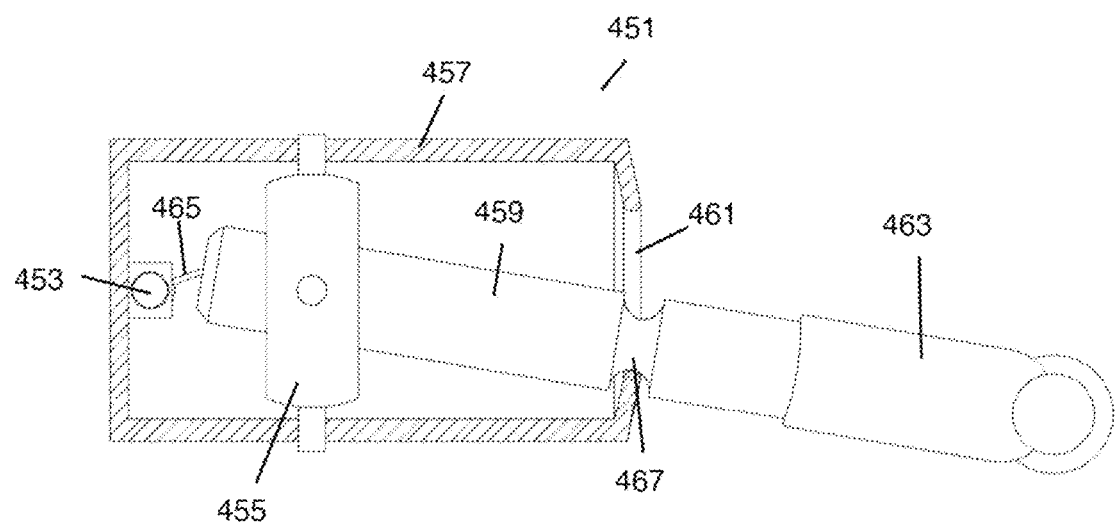

With reference to FIG. 32 is a perspective view of the sensor handgrip 451 and FIG. 31 is a side view of the sensor handgrip 451 that is in an off center position with the rod 459 positioned against the lower stop edge of the circular opening 461. The rod 459 may contact the stop position when the controller cannot keep up with the re-centering movement of the primary linear actuator. The contact with the edges of the circular opening 461 can protect the internal components of the sensor hand grip 451 including the joystick sensor 453, potentiometers, and any other fragile system components. The contact of the rod 459 with the edge stop of the circular opening 461 can occur just before or when a user virtually contacts a virtual asset such as a virtual object in the VR space. In an embodiment, the hand grip or foot hold can stop all motion. The user can attempt to continue their motion in the direction of the asset or virtual object, however the controller can cause the linear actuators prevent movement through virtual objects and the system no longer mirrors the user's motion. When the rod 459 physically collides with the edge of the circular opening 461 of the housing 457, this creates the very real sensation that the user has collided with the virtual entity. As long as pressure is exerted by the user in the direction of the virtual, solid entity, the armature will remain locked, and the grip arm will remain bottomed out against the chasses.

If the user intends to release their virtual grip on or contact with the virtual entity, the user can do so by moving their hand (or feet) and therefore the rod 459 in a different direction. If the system user pulls the handgrip 463 (or foot hold) away from the virtual assets or virtual object, the controller will again move with the user. The Joystick senses that the user has moved their hand position, indicating that they have released their virtual grip. At a designated angle before a 'centered/neutral' position is reached, the controller CPU returns the armature to 'mirror mode', where the primary linear actuators once again move in response to all detected motions of the user's hand.

Figure 34:
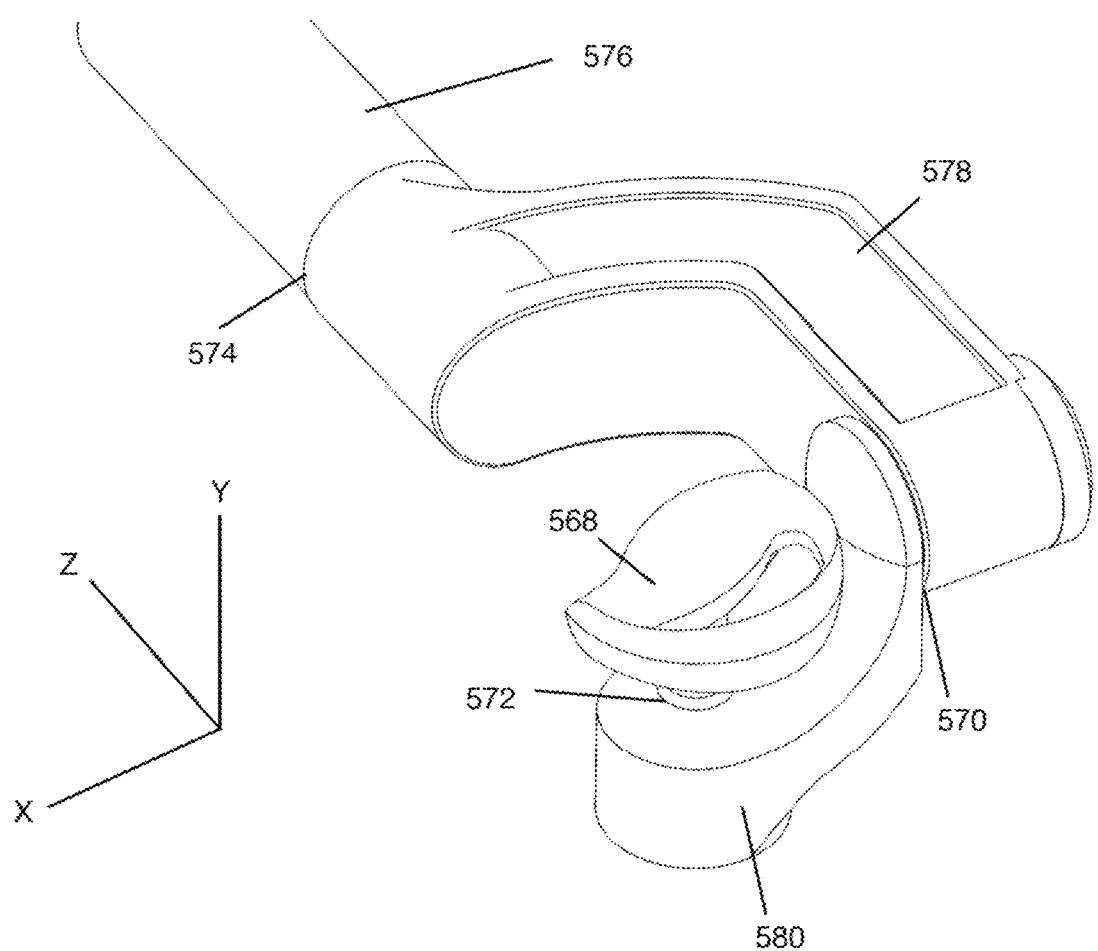
FIG. 34 illustrates a perspective view of an embodiment of a hand grip mounted on rotational mechanisms.

The different VR haptic apparatus can have gimbaled hand grips which can provide a full range of motion in three axes. The inventive VR haptic apparatus described above requires the user to maintain constant contact with the physical interface components including the hand grips, while moving their hand in any natural position in their range of motion. To achieve this with reference to FIG. 34, the hand grip 568 is mounted to a vertical y-axis rotational movement mechanism 572, which is mounted to a linkage 580, which allows the hand grip 568 to rotate about the y-axis relative to the linkage 580. The linkage 580 is coupled to a horizontal x-axis rotational movement mechanism 570 which allows the hand grip 568 to rotate about the x-axis relative to the linkage 578. This linkage 578 is mounted to a z-axis rotational movement mechanism 574 which allows rotation of the hand grip 568 about the z-axis relative to the arm 576. The hand grip 568 can be coupled to the linkage with universal joints. The combination of three axis movement allows any rotational position of the hand to be achieved while maintaining the user's grip on the VR haptic apparatus throughout the user's VR experience.

In an embodiment, the gimbal grip can have locking pivots which can be actuated by the VR control system. In order to create the 'haptic illusion' when the user contacts a virtual, solid object, the user's hand must feel as if it is contacting a solid, non-moving, physical object. The VR software is designed to detect when the user's hand position is within an acceptable proximity to or in contact with a virtual object that may be gripped in virtual space. When this proximity or contact is determined between the user and the virtual object, then the VR software can lock rotational components at each axis of the hand grip interface are actuated, stopping all motion of the gimbal. For example with reference to FIG. 32, when the rotational components are locked, the system can prevent the rotation of the hand grip 568 about x-axis movement mechanism 570, the y-axis movement mechanism 572, and the z-axis mechanism 574. The effect to the user is that the user will perceive contact with a physical, solid object adjacent to free open space. Upon moving their hand away from that object in a direction determined to be acceptable to the software, the VR software can disengage the locking components, allowing the gimbal to rotate freely in all directions once again. All rotational locks may be activated simultaneously when a user grips a virtual, solid entity such as a branch, for example to prevent rotation in any of the three axis of rotation. In another instance only a single lock may engage, in order to simulate the effect of making contact with a virtual, solid entity without grabbing it. Thus, the gimbal can rotate in two axes of rotation and lock in one axis of rotation. For example, in a simulated VR first punching a virtual wall object would be able to rotate axially, though two other rotational (pitch and yaw) axis would lock, so that only one degree of freedom would be allowed.

In some embodiments, the locking pivots used in the hand grips or foot holds may be replaced with rotational motor actuators. The rotational motor actuators can allow free rotation, no rotation, limited in rotational range or possibly even having variable levels of rotational resistance. In these embodiments, rotational motion of the wrist through hand grips can be unencumbered, fully locked, or could allow specific range of motion to that hand's motion. This would allow the user to feel the sensation of gripping an object that moves either autonomously or in reaction to their pressure. If a user were to grasp a virtual tree branch, for example, the VR software can be configured to allow the virtual tree branch to bend under the user's downward weight or force. To create this physical illusion, the VR software can be configured so that the user would have to feel the grip of a solid object, the virtual branch, and then simulate the motion of the branch bending in a manner determined by the physical characteristics of the branch, and the wrist gimbal would rotate in such a way to simulate the angular orientation of the branch. In other embodiments, the VR software can provide users with simulated movement of other virtual objects. For example, the VR software can simulate the movement of a virtual skateboard rolling on a virtual surface. The user can step on the virtual skateboard and foot hold may slide in a horizontal direction that the skateboard is virtually rolling.

In an embodiment, the hand grips and foot holds of the VR haptic apparatus can include ball and socket 'float' to improve haptics. A joystick has a limited range of motion of the potentiometers comprising it. In order that the motion of the wrist gimbal assembly does not exceed this limited range of motion, a physical stop must be created. In the proposed invention, a moving toroid or sphere is mounted to the sliding, moving element. A negative of this component surrounds it, shaped by the angular offset determined by the desired range of motion limitation in all directions. When the user moves their hand in an unencumbered state, the sphere or toroid floats within this negative volume, never contacting it.

When the user's virtual hand approaches a virtual solid object, an eminent collision is detected. The software then locks the motion of the armatures allowing the sphere or toroid to continue in its path until it collides with the negative volume, stopping the motion of that grip, and creating for the user a sense that they have contacted a physical object. Simultaneously, the gimbal's locking pivots may engage, and all rotation is locked, further enhancing the sensation of that contact.

Figures 35, 36:
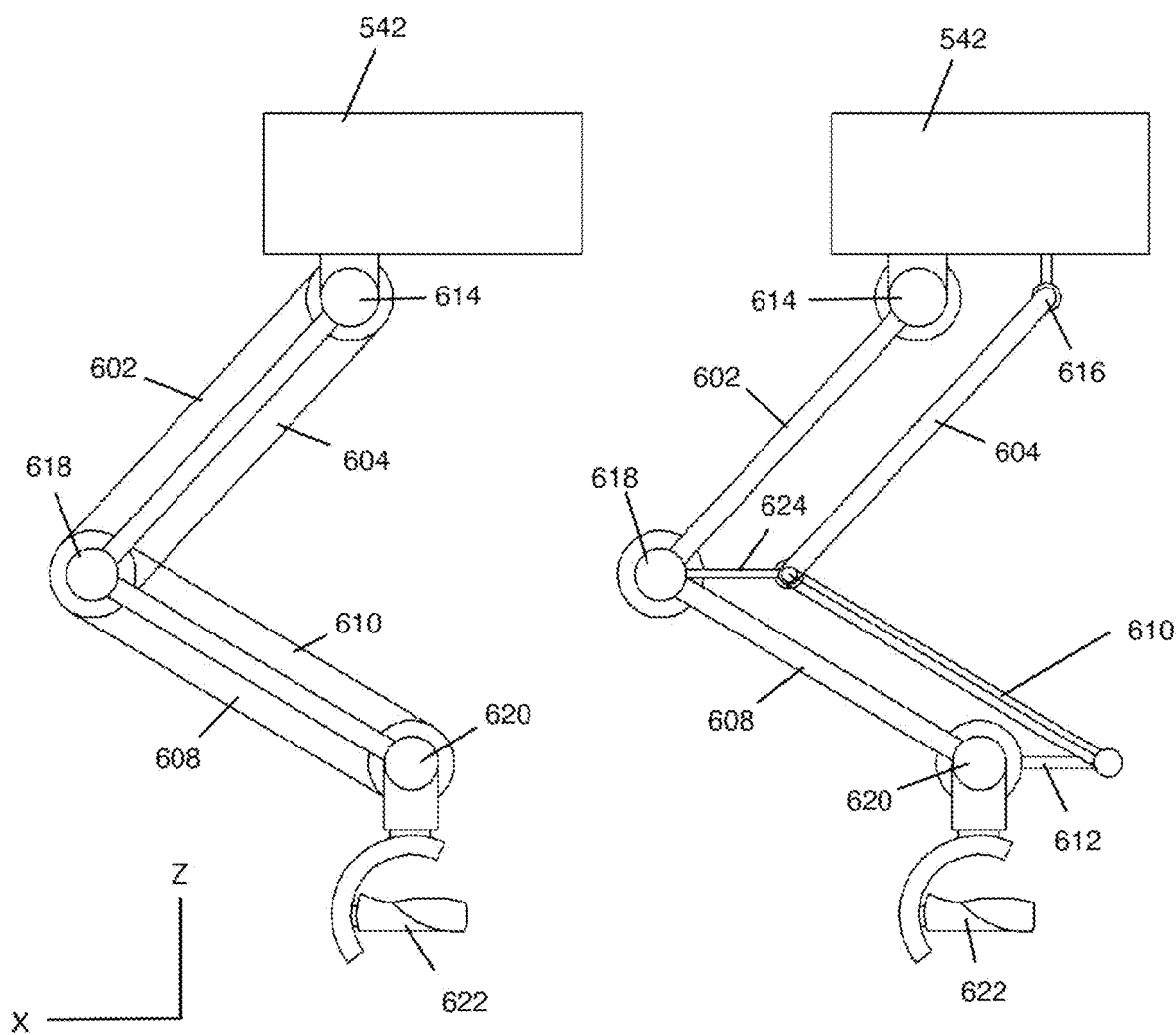
FIGS. 35-37 illustrate top views of linkage system arms for a VR movement apparatus.
Figure 37:
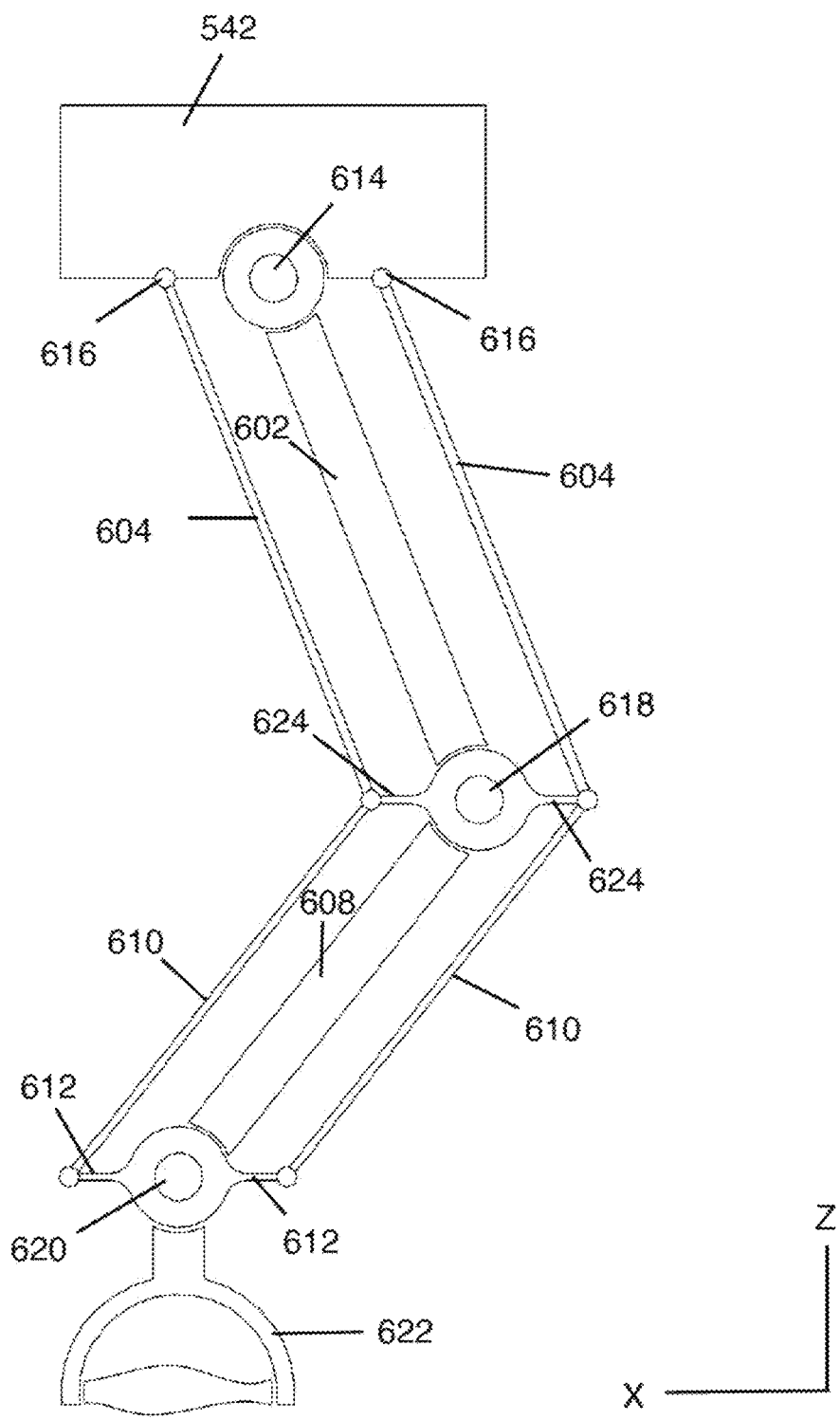

In an embodiment, the hand and feet actuators include parallelogram or pantograph linkages that allow the distal hand grip and foot hold ends of the armatures to remain parallel with back plane in any location to provide consistent baseline. With reference to FIGS. 35, 36 and 37, various embodiments of the linkages coupled to a car that moves vertically on a track mounted on a frame. The linkages can provide planar movement of the hand grips and foot holds in a horizontal plane. With reference to FIGS. 35, 36, and 37, the linkages can include a car hinge 614, an inner arm 602, an inner parallel linkage 604, an arm hinge 618, an outer arm 608, and an outer parallel linkage 610. The inner arm 602 and the inner parallel linkage 604 are parallel elongated structures. Similarly, the outer arm 608 and the outer parallel linkage 610 are also parallel elongated structures. The inner arm 602 can be coupled to the car 542 with a car hinge 614 and the outer arm 608 is coupled to a user interface hinge 620 which is attached to the hand grip 622. This parallel configuration of the parallel linkages is maintained regardless of the angular orientation of the inner arm 602 and the outer arm 608. If the linkage systems are used with foot holds, the user interface hinge 620 can be coupled to the foot holds rather than the hand grips 622.

The differences between FIGS. 35, 36 and 37 include the number of parallel linkages 604, 610, the relative positions of the inner arm 602 and the inner parallel linkage 604, and the relative positions of the outer arm 608 and the outer parallel linkage 610. FIG. 35 illustrates an inner parallel linkage 604 in close proximity to the inner arm 602 and an outer parallel linkage 610 in close proximity to the outer arm 608. For example, in this embodiment, the spacing between the arms 602, 608 and parallel linkages 604, 610 is between 5 to 20 centimeters. In contrast in FIG. 36, the inner parallel linkage 604 spaced farther apart from the inner arm 602 and the outer parallel linkage 610 farther apart from the outer arm 608. The inner parallel linkage 604 can be coupled to the car 542 with a separate linkage hinge 616 and an arm hinge offset 624. The outer parallel linkage 610 can be coupled to the arm hinge offset 624 and a grip hinge offset 612. In this embodiment, the spacing between the arms 602, 608 and parallel linkages 604, 610 is between 20 to 50 centimeters. In FIG. 37, an embodiment of the linkage system is illustrated that has two inner parallel linkages 604 on opposite sides of the inner arm 602 and two outer parallel linkages 610 on opposite sides of the outer arm 608. The inner parallel linkage 604 can be coupled to the car 542 with separate linkage hinges 616 and arm hinge offsets 624. The outer parallel linkages 610 can be coupled to the arm hinge offsets 624 and grip hinge offsets 612.

As the user moves up, down, left or right in virtual space, the VR apparatus can recenter the user as needed and described above. The VR system can perform the recentering in order to prevent the hand grips and foot holds from exceeding the physical boundaries which can be the movement limits of the hand and foot interfaces of the VR machine. Since the movement of the hand grips and foot holds to the movement limitation stops of the hand and foot actuators must not be detected by the user. Thus, during recentering, the hand and feet grips that are not in unencumbered mode must move at the same speed, along the same vector, and without altering the angular orientation of the grip. In an embodiment, the synchronized movement of the hand grips and foot holds is achieved using motors at the 'wrist' pivots. This adds weight to the end of the armature, and adds cost.

In another embodiment, a simpler approach includes a VR apparatus having linkages, chains or belts that are fixed at the 'shoulder' end of the armature, connected at the 'elbow' end, terminating at the 'wrist' end. In this pantograph approach, the grip assembly will remain orthogonal to the back plane of the machine, regardless of the position of the armature.

In embodiment, the VR apparatus can be optical sensors and/or video cameras for optical detection of user recentering. For example, the optical sensors or video cameras can detect the hand and foot centroids using spheres mounted on the hand grips and foot holds. The cameras can be mounted to surrounding VR apparatus frame for position detection. In the described invention, the software must be aware of the exact Cartesian location and rotational position of the center of the user's hand (together, the 'centroid') at all times, for the purposes of repositioning, recentering the user, and locating the hand of the avatar with precision, both in its cartesian and rotational position.

Figure 38:
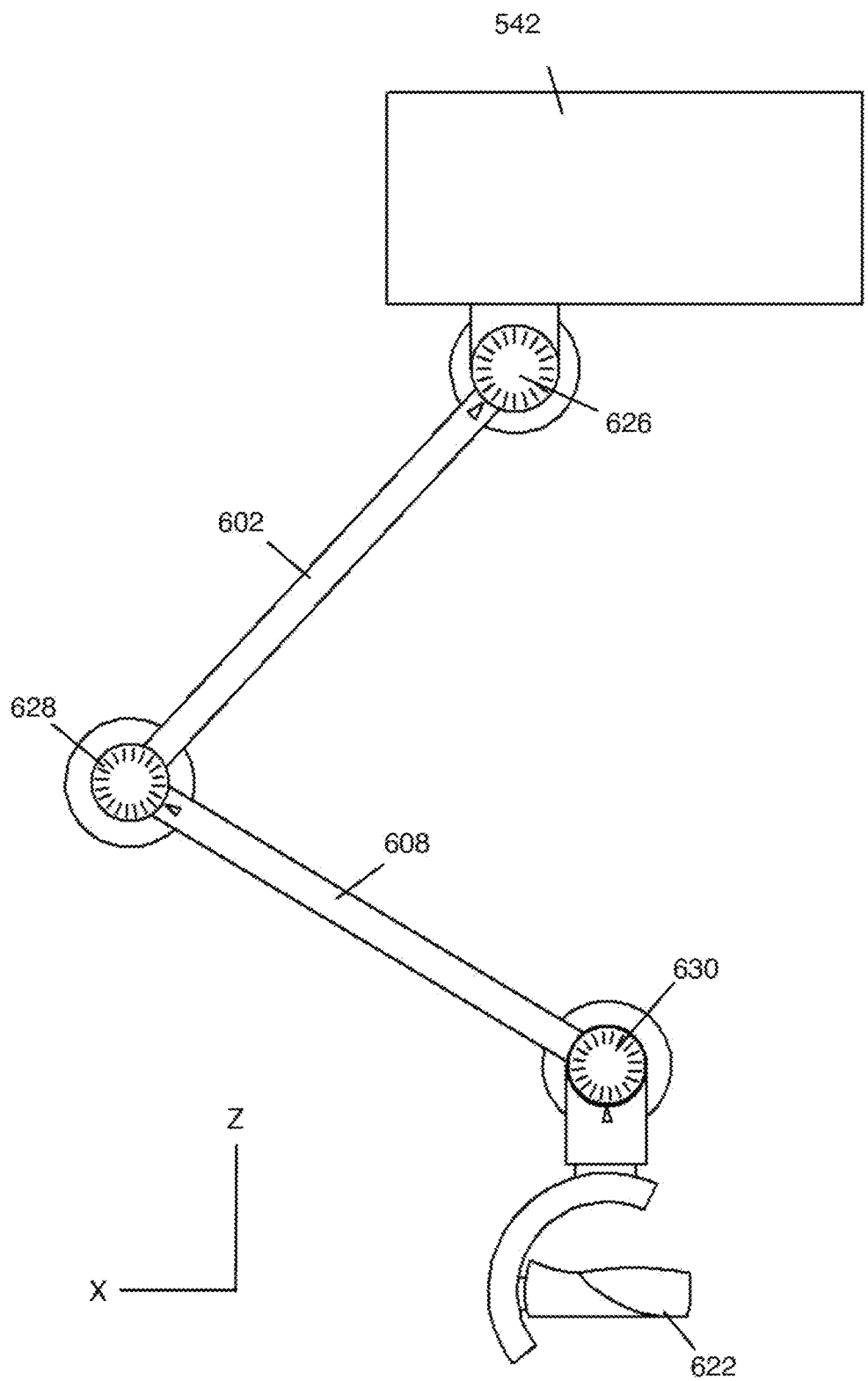
FIG. 38 illustrates a top view of an embodiment of an articulated armature that includes rotary encoders.

In another embodiment with reference to FIG. 38, an articulated armature might include integrated rotary encoders at all rotation joints and a linear encoder at any sliding components. In illustrated embodiment, five rotary encoders and one linear encoder can be required per arm and leg actuator. The rotary encoders can measure the angular positions of the rotational components such as the inner arm, outer arm and hand gimbal. The linear encoder can measure the vertical linear position of the car on the track. For example, a car hinge rotary encoder 626 can measure the angular position of the inner arm 602 relative to the car 542. The arm hinge rotary encoder 628 can measure the angular position of the outer arm 608 relative to the inner arm 602 and the grip hinge rotary encoder 630 can measure the angular position of the hand grip 622 (or foot hold not shown) relative to the outer arm 608. In addition to the three illustrated rotary encoders 626, 628, 630, the armatures can also include a rotary encoder for measuring the rotation of the hand grip 622 about the Z-axis and a rotary encoder for measuring the rotation of the hand grip 622 about the X-axis. The rotary and linear encoders transmit the angle and position information to the VR control processor which can provide location information for the hand grips and foot holds. This approach provides exact location of the actuators as well as the hand grips and foot holds to the VR control processor which can then perform the recentering of the actuators so the user can continue to move in the VR space.

The described VR apparatus can be in communication with a VR processor which can create the VR environment and display users or user avatars within the VR environment. In an embodiment, the VR apparatus can perform kinetic scanning of the user's body for avatar creation and the avatar can be seen by the user and others in a third-person view output on a VR display. In the invention, the body of the user can be digitally represented for several purposes. For example, the user to choose to watch themselves from a 'third person' perspective, as if watching from out of their body. Spectators, similarly, may watch the user in third person view, similar to watching any athlete. Scanning the user's body while it is in motion to allow the user to see their own body as they move on a visual VR display, further confirming the realism of the VR environment. In video games, this is known as third person view. An avatar overlay model may be applied in a visual display, so that a user may appear in the virtual environment as a robot, knight in armor, superhero, animal, or whatever enhances their experience. Scanning the user's body can also create a 'collision field' for reference. The VR processor CPU will be aware of the shape and position of the armatures at any moment in time, and the shape and location of the user's body at any moment in time. With this data, the system's VR software may anticipate a potential collision between armature and user in the physical space. The VR software can stop the motion of the hand and foot actuators to prevent contact with the user to prevent physical injury to the system user. An accurate three dimensional image capture of the user's body can allow for multi-player interaction in a VR space. For example, if two players exist in a virtual environment, they may see an accurate representation of an avatar of the other and themselves. If players box, for example, the scan data of each player becomes a 'collision field'. When a player punches the other, the intersection of the data fields represents a punch that has struck the other. This can be registered to the hitter by stopping motion on all armature actuators, simulating the feeling of a strike. The receiving player may feel a jolt from all armatures, to simulate the avatar's reaction to being struck in VR space. This jolt can provide notice of contact while avoiding physical impact.

In an embodiment, the VR apparatus can have articulated armatures that can provide improved performance through higher strength-to-weight characteristics. A haptic armature is especially sensitive to moving mass and the user's quality of VR experience can be diminished by the burden of moving the weight of the mechanical structures. On the other hand, the structure and moving parts must be strong enough to suspend the user with each armature and to stop their motion as required to best simulate the haptic experience.
Ideally, the mechanical armatures are optimized so that they are both as light and as strong as possible.

Figure 39:
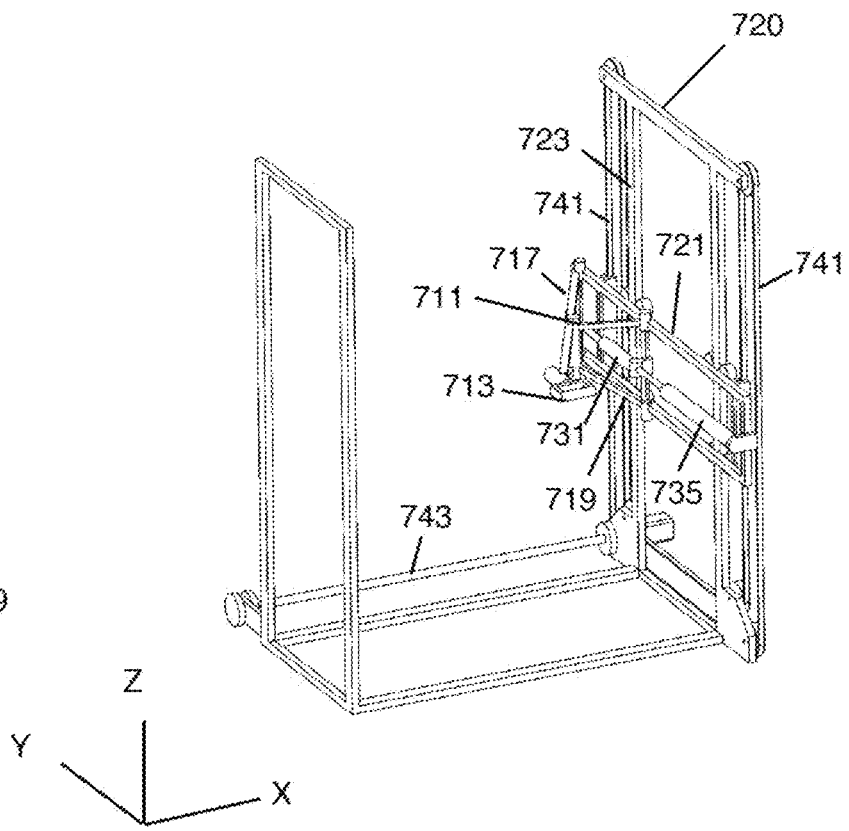
FIG. 39 illustrates a simplified embodiment of a VR apparatus frame with a right hand armature and a right hand UI in a retracted position.
Figure 40:
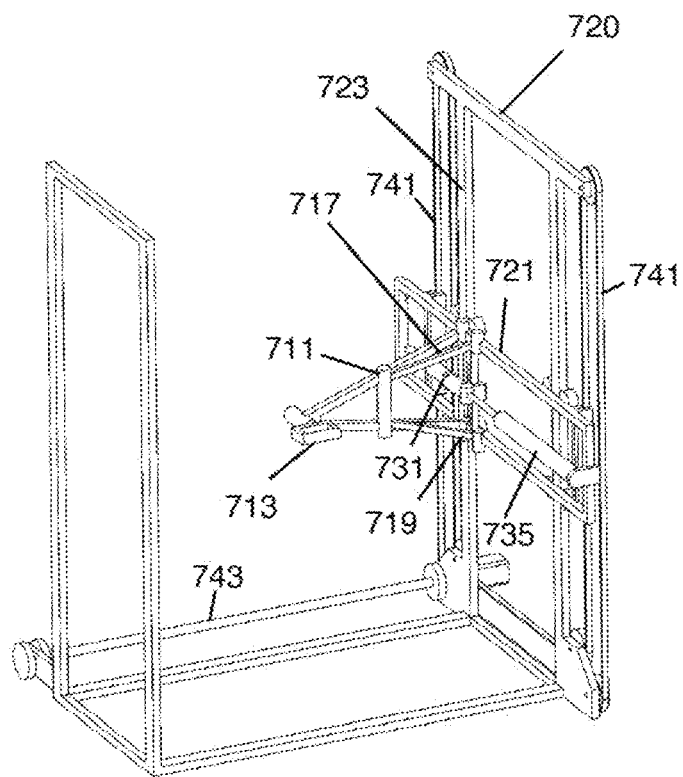
FIG. 40 illustrates a simplified embodiment of a VR apparatus frame with a right hand armature and a right hand UI in an extended position.

In an embodiment, the VR apparatus can have articulated armatures that can each have two hinged A-arms. FIGS. 39 and 40 illustrated a simplified VR apparatus that has a frame 720 and a right-hand armature 711. FIG. 39 illustrates right-hand armature 711 in a retracted state with the right-hand interface 713 which can be a hand grip close to the right side of the VR apparatus frame 720 in a positive X axis direction. FIG. 40 illustrates right-hand armature 711 in an extended state with the right-hand interface 713 extended away from the right side of the VR apparatus frame 720 in a negative X axis direction. The other components of the VR apparatus have been omitted so that the described articulated armature can be illustrated.

The articulated armatures 711 that can each have two hinged A-arms 717, 719 that slide along a horizontal track 721. The horizontal track 721 slides vertically along a fixed vertical track 723, which is mounted to the overall structural frame 720. The two hinged A-arms 717, 719 can each have two ends that are attached to the horizontal track 721 using bearings or low friction bushings. The A-arm parts allow motion lateral in the X direction relative to the user by the hinge at the top of the A-arms 717, 719 opening and closing. A lateral actuator 731 such as a pneumatic piston coupled to a VR controller can be attached at both a fixed end and a moving end to the two moving A-arms 717, 719 that allows the VR controller to control of the lateral motion of the right-hand interface 713, creating the haptic movement.

A horizontal actuator 735 which can also be a pneumatic piston can be attached to the smaller of the A-arms 717, 719 where the engages the horizontal track 721. The horizontal actuator 735 allows the controller to control the horizontal motion (Y direction) of the A-arms 717, 719 in the fore-aft motion.

Figure 41:
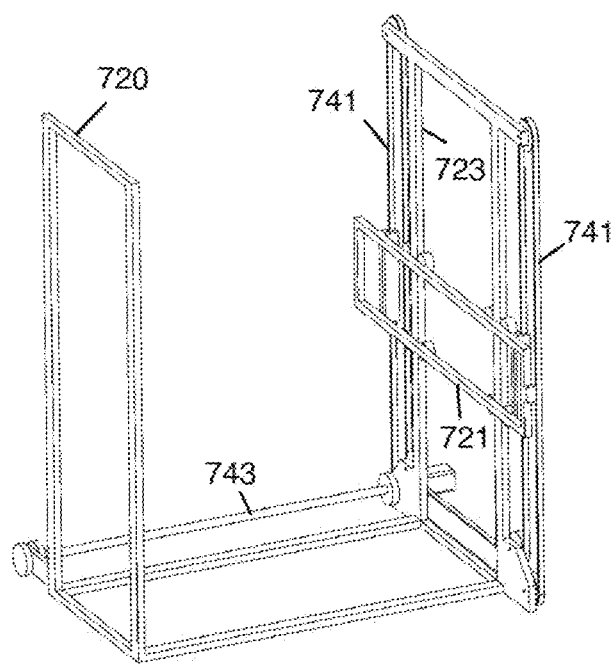
FIGS. 41 and 42 illustrate a simplified embodiment of a VR apparatus frame with a right hand vertical track and horizontal track.
Figure 42:
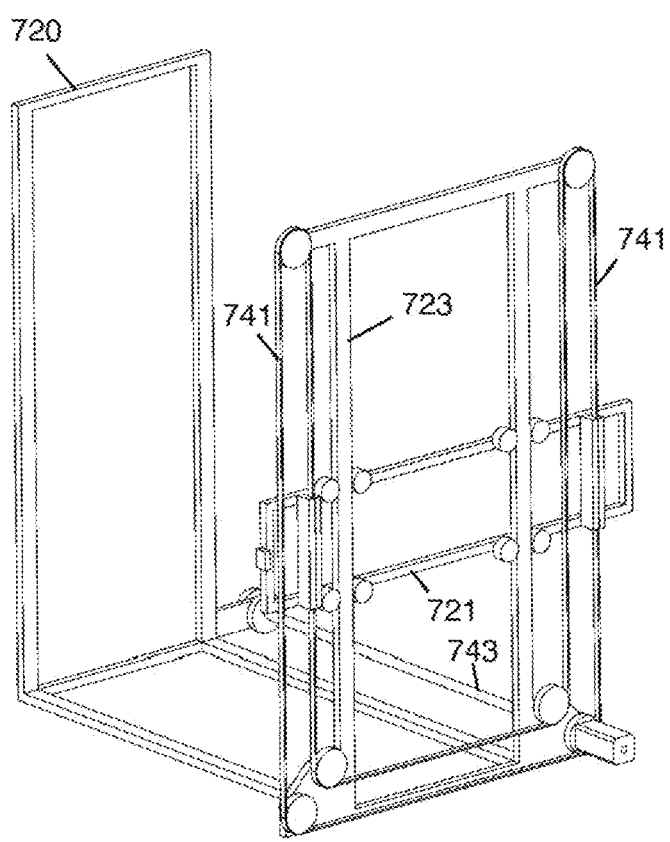

The motion of the armature 711 and the horizontal track 721 carriage assembly are coupled to a vertical track 723. With reference to FIGS. 41 and 42, a further simplified assembly of the VR apparatus that has a frame 720, a horizontal track 721 and a vertical track 723 is illustrated. The vertical position of the armature 711 and the horizontal track 721 on the vertical track 723 can be controlled by belts 741, which connects to pulleys mounted on a common drive shaft 743. In an embodiment, the coupling at the point of the drive shaft 743 and a rotational motor (not shown) can be by means of a clutch such as a pneumatic or electromagnetic or other clutch mechanism. This allows the armature 711 to move vertically freely, or in a way fixed to the drive shaft 743. In the illustrated embodiment, the belts 741 or chains that connects the horizontal track 721 or vertical carriage assembly to the drive shaft 743 can be configured in such a way that both ends of the horizontal track 721 are attached to the same belt 741 or chain. This can insure that both ends of the horizontal track 721 move vertically in a synchronous manner, therefore preventing any 'binding' of the armature when the downward weight is unevenly distributed on the horizontal track 721 as shown in FIG. 42.

As discussed above, FIGS. 39 and 40 illustrate a single right hand armature. In other embodiments, the VR apparatus can have four armature that are the same or similar to the illustrated armature for the left hand, right hand, left foot and right foot. All four armatures similarly interact with this drive shaft 743 by means of a clutch which can engage or disengage their mechanical connectivity to the shaft 743. This allows each to move freely or in sync with the other armatures, depending on the conditions set by the haptic experience. If the user, in virtual reality, experiences climbing a rigid structure, then the clutches of each armature engage when the user's virtual hand or foot engage that virtual structure. If they are climbing vertically, then the motor that controls that drive shaft 743 will lower them at the same pace as their vertical climb, thereby keeping the user in the center of the machine or VR frame 720, away from the upper ceiling of the machine, though their perception will be that of climbing infinitely. In another embodiment, each armature is mounted to an individual motor, which controls the vertical motion for each armature either individually or in a coordinated manner, as would be the case to simulate the user climbing a fixed structure.

Figure 43:
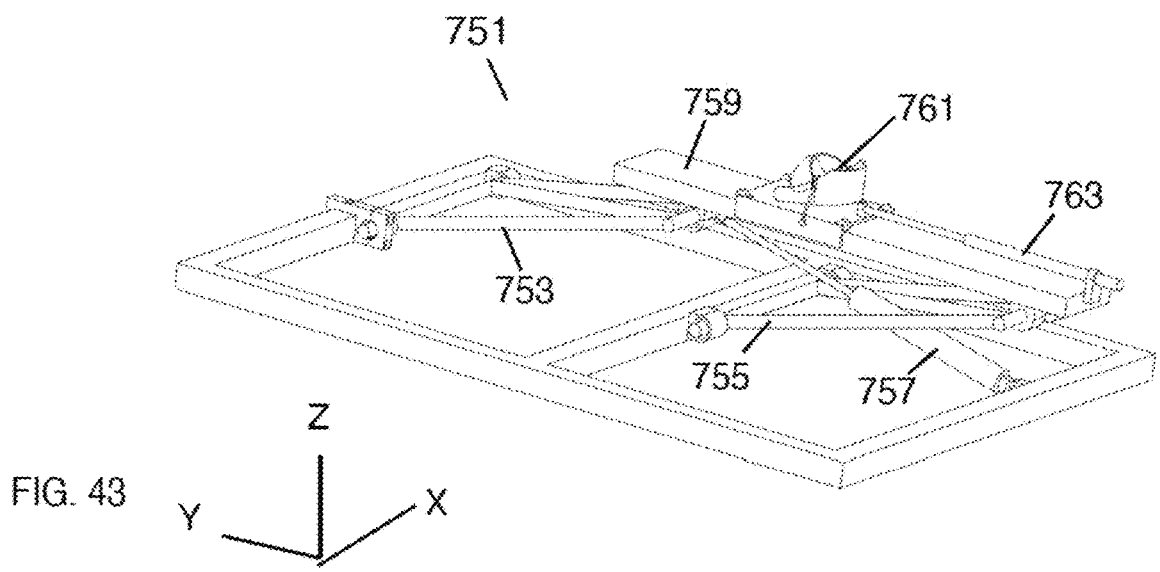
FIG. 43 illustrates a foot armature in a retracted position.
Figure 44:
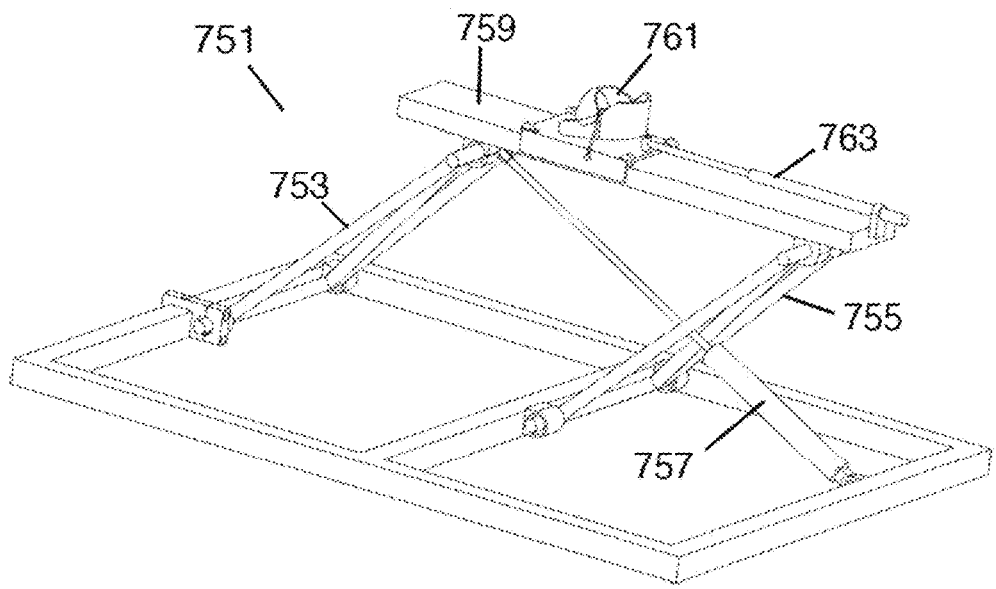
FIG. 44 illustrates a foot armature in an extended position.

In another embodiment with reference to FIGS. 43 and 44, the VR apparatus can have leg armatures 751 exist as a parallelogram mechanism that can extend vertically (Z direction). The leg armatures 751 can each have a foot interface 761 that slides on a horizontal track 759 (Y direction). The position of the foot interface 761 on the horizontal track 759 can be controlled by an actuator 763 coupled to a VR controller. The horizontal track 759 can be attached with hinges to two A-armatures 753, 755 that swing up or down to control the vertical position. The weight of the track 759 can be offset by mechanical spring, pneumatic, electric or hydraulic actuation in such a way that it remains nearly neutrally buoyant at any location. This leg armatures 751 assembly allows a strong and lightweight overall structure that can most easily support the weight of the user. The horizontal motion is controlled by actuators 757 coupled to a VR controller, which are driven by the experiential needs determined by the virtual reality experience. In this embodiment, the user's horizontal, fore-aft (Y-direction) motion is controlled by a horizontal actuator 763 that can be a piston or motor/belt assembly.

The leg armatures 751 can be used to simulate various VR movements. For example, in order to create the experience of pushing a sled, the VR system can have two leg armatures 751. A first foot interface 761, the 'fixed leg', can remain rigidly locked in place, while a second foot interface 761, the 'pushing leg', can slide rearward with force feedback pressure determined by the VR experience. Since the user's VR experience will show them moving forward, the VR system users will perceive a world where they are moving forward, being pushed by their 'pushing leg'.

In another embodiment, the parallelogram lower armatures could be affixed to a common rotating drive shaft (such as shaft 743 shown in FIGS. 39-42) using clutches, allowing them to engage or disengage with the other limbs as needed. In this embodiment, the frame of the structure surrounds the user, in order to allow attachment of the vertical tracks on either side of the user. This surrounding frame is ideal for the machine's overall stability, since it results in a large footprint with the user at the center.

A frame that surrounds the user in any way can be enhanced to improve the overall hygiene of the machine. With plastic or glass doors and windows added so that the user's compartment is completely enclosed, the device may be sterilized with UVC light, ozone, desiccation, or a combination of known sterilizing processes in between uses, when the machine has no user within it.

In some embodiments of the VR apparatus, can have left hand, right hand, left foot and right foot armatures that can have resistance mechanisms which can function as friction 'brakes' are added to in order to create body movement resistance. The resistance can be selectively applied to the armatures by the VR controller based upon the VR experience to resist the VR apparatus component motions. These resistance mechanisms may be actuated using pneumatic, hydraulic or electrical methods that regulate the amount of force applied in order to achieve the desired resistance.

In order to create a haptic facsimile of reality while in a virtual environment, the user experiences several general categories of physical interactions that can be controlled by software running on a VR processor that controls the VR apparatus including 1) completely stopping user motion, 2) pulling a virtual object, 3) pulling against a virtual entity that pulls back against the user's motion, and 4) moving a virtual hand freely in the air. More details for each of these general categories are listed below.

In a first VR simulation condition, a user's motion is stopped completely in a direction. An example of this VR simulation can be to stop a hand movement by stopping the movement of a hand interface as if the user had punched or kicked a solid wall. In such a case, the VR software running on the VR controller would detect an imminent collision with an unmovable virtual object, and cause the actuators controlling the movement of the hand interface in the movement direction to lock motion upon collision, so that the user feels a simulated wall strike. In an embodiment, the VR apparatus can include sensors in the described hand and/or feet armatures are used to determine when the user intends to pull their hands or feet in the opposite direction of the strike. When this pull back condition is detected by the sensor(s), the corresponding actuators can then be released, so that the user feels no resistance pulling their hands (or feet) back in an opposition direction from the initial movement direction. In this manner, the interface and armatures can be controlled to simulate a solid object that the hand and feet interfaces cannot pass through.

In a second VR simulation condition, a user may pull a virtual object across a virtual surface. For the object being pulled to simulate weight, the actuator must simulate the frictional movement resistance forces based upon a simulated weight of a virtual object and a coefficient friction of the virtual object sliding on a virtual surface. The controller can calculate the simulated resistance force and apply the resistance forces to the armature(s) to simulate sliding resistance of the virtual object in any direction. In an embodiment, the VR controller can apply a specific brake pressure to the armatures or moving part for the duration of the specific motion. This may also be achieved using pneumatic actuators or resistance mechanisms that regulate pressure, based on signals from the VR controller software. This VR movement resistance can functionally serve fitness goals as well, since the VR machine can apply specific pressures to meet the health and fitness goals of the user, and adjust the resistance pressure as the physical strengths of the users' changes over time.

In a third VR simulation condition, a user may pull against a virtual entity that pulls against the user's motion. Examples of this VR simulation can include resistance movements such as pulling a bow and arrow, or lifting an object against gravity. When the user releases the virtual entity, that pulling or resistance force can be suddenly released. This can be achieved using an actuator that grips an elastic or spring element when the user begins to pull, then releasing the opposing force upon release of the virtual arrow or virtual lifted object.

In a fourth VR simulation condition, the VR apparatus can be configured to allow a user move their virtual hand(s) freely in the air. Since the user may constantly maintain a grip on the armature's end effector or hand interface, this free motion must have as little resistance as possible by the VR hand interface mechanism in order to simulate free motion. To achieve this, the VR hand interface motion components can be designed to be 'neutrally buoyant' in default, non-collision state. This can be achieved mechanically through counterweighting, where an equal weight is suspended by a pulley and connected to the motion components by cable. In another embodiment, the VR apparatus can use offloading springs, which apply equal force to counteract the weight of the motion components. Alternatively, the VR apparatus can use a pneumatic piston to regulate the upward pressure to offset the gravitational forces of the VR apparatus components. The offloading may be regulated in such a way that it applies upward pressure, beyond simply counteracting gravity. This effect can be used deliberately to simulate physical effects, such as different gravity pressure, water, water viscosity, among others.

As discussed above, with reference to FIGS. 39-42, the vertical (Z movement) of the multiple armatures for the hands and/or feet can be driven or coupled to a single rotating drive shaft and each of these armatures can be coupled to a clutch mechanism to power or depower the armatures. The user may choose or a VR controller can be configured to engage with a virtual element VR object with one or multiple limbs in any combination of hands and feet VR interactions. In such a case, the motion that the hand and feet VR interfaces should move in perfect synchronicity in order to provide a coordinated VR feel and maintain the VR illusion.

The inventive VR system can create a physical/mechanical platform allowing a user to interact with a virtual environment. A haptic approach using force feedback allows a simulation that simulates physical experience. The described VR machine can be comprised of four armatures that are attached to a larger structure by way of guide wheels, pivots and belts, in order to allow their motion. The limitations of the motions of the hand and feet user interface (UI) armatures in the VR machine can use actuators such as pneumatic actuators, electric motors or hydraulic actuators. To interact with a VR environment, the user engages the hand UIs with their hands and/or feet UIs with their feet. The VR machine UIs can be end effectors of four mechanical armatures that can support the weight of user at the ends of four beams. When disengaged, the hand and feet UI armatures allow freedom of motion of the user, and, when engaged by the actuators, restrict motion of the user on demand, or generate specific resistance against specific motion by the user as needed to simulate the VR environment by the VR controller coupled to the VR apparatus.

In an embodiment, the processor can be coupled to a memory which stores a three-dimensional VR environment and the processor can identify stationary, moving, and/or movable objects within the VR environment. The hand and feet UIs can move freely in the open three-dimensional VR environment. However, the processor can prevent the hand and feet UIs from passing from open spaces to solid object volumes in the VR environment by controlling the armatures to prevent the hand and feet UIs. The processor can simulate movable objects in the VR environment by resisting the movement of the hand and feet UIs when the move from open spaces to movable object(s) in the VR environment by controlling the armatures to resist movement of the hand and feet UIs. The level of resistance can be controlled by the size, weight, and coefficient of friction of the movable object. For example, the controller will provide a lower resistance to hand and feet UIs when the object is a small and light weight object having a low coefficient of friction such as a sports ball. The duration of the hand or feet UI movement resistance will also depend upon the movement of the movable objects. A simulation of a ball being hit or kicked will have a very short duration resistance because the virtual ball receives the energy and immediately bounces away. The processor will cause the armatures to provide a temporary force resistance to the hand or feet UI movement and then remove the hand and feet UI resistance.

In contrast, a virtual large and heavy object having a high coefficient of friction will result in the processor providing much more force resistance to movements of the hand and feet UIs. The duration of the hand or feet UI movement resistance will be much longer than for a smaller object. The movement resistance can depend upon the movement of the virtual movement of the movable objects. For example, the processor can simulate a virtual horse and may initially resist forces of the armatures opposing the hand or feet UI movements. Then the processor can cause the virtual horse to become more compliant and the processor can lower the resist forces of the armatures on the hand or feet UI movements.

In an embodiment, the hand and feet UI interfaces can move within a UI volume within a VR apparatus frame. The UI volume can be identified as specific X, Y, and Z coordinates that can define individual blocks in the UI volume and each of these individual blocks can be stored in a memory coupled to the VR processor. Each of the individual blocks can be defined with a block status as free, solid, or movable and the status of each of these blocks can be stored in a UI volume database memory. The positions of the hand and feet UIs can also be identified based upon X, Y, and Z coordinates. The VR processor can allow the VR apparatus to allow the range of movement of the UI interfaces to move freely through the individual blocks in the UI volume that are free space. However, the VR processor can prevent the hand UIs and/or feet UIs from moving from free space blocks through the solid blocks in the UI volume. In some embodiments, there can be differences between the block status based upon the foot or hand UI. For example, if the VR simulation is a bicycle, the movements of the feet UIs can be restricted to two parallel circular paths with the foot UIs on opposite sides of the two parallel circular paths to simulate the feet being attached to bicycle pedals. Thus, only a very small number of blocks that define the free movement circular paths have a free status and all other surrounding blocks can have a solid status to prevent movement of the foot UIs outside the circular paths. However, since the hands are free the hand UIs do not have the same free and solid block status. The hand UIs can have some solid blocks in the VR volume that simulates a bicycle structure but the surrounding blocks can have a free status so the user can move their hands freely. In the bicycle simulation, the VR apparatus can include a fixed bicycle seat that the user can sit on. The seat can be attached to a seat armature that can move in the same manner as the VR bicycle in the VR volume.

The VR processor can also create VR objects that are virtual movable within the VR space volume. The VR processor can create resistances to the hand and feet UIs when they contact the virtual movable objects. The resistance to the movements of the can be based upon a virtual mass, inertia, coefficient of friction, of the virtual movable object. In an embodiment, the VR processor can run software that determines the collisions between the hand and feet UIs and the objects within the VR environment based upon the movements of the hand and feet UIs and the positions of the static VR objects such as ground, walls, and other structures and movable dynamic VR objects such as paddles, vehicles, sports equipment, etc.

The software can allow the VR processor to simulate the physics of the VR objects in the displayed VR environment and corresponding forces that are applied to the VR apparatus that match the rules of physics within the VR environment that are felt by the user of the VR apparatus. The VR processor can calculate and process the complex interactions of the VR users and VR objects and VR fluids within the VR environment. The visual display of the VR objects and haptic feedback through the VR apparatus is based upon software rules of physics including: aerodynamics, inertia, friction, etc.

The detail of the VR experience can be based upon a quantity of individually identifiable blocks within the UI volume. A smaller number of blocks can result in a VR system where the texture of the virtual solid objects is less detailed while the texture detail can be improved by increasing the number of blocks within the UI volume. In some embodiments, the detail of the virtual solid objects can be variable based upon the hand UIs and feet UIs. The user will notice more details based upon the hand UI interactions with virtual solid objects and not notice the details based upon the interactions of the feet UIs with virtual solid objects.

A problem with a typical VR experience, is that the user can typically be represented in a "first person" perspective as a pair of floating hands displayed on the visual display worn by the VR system user. The VR system may track the human hand motion accurately, however, the VR display lacks simulation realism since the user only sees the hands floating in the VR space without the rest of the body to provide context. These displayed disembodied VR hands can create a poor VR experience for the user allegedly being immersed into a VR world environment.

In an embodiment, the inventive VR system can provide users with a "third person" perspective where the processor can display a full-body avatar that accurately tracks the users' motions and depict the users to scale in a VR environment. This third person perspective can provide a better user immersed in the VR environment. Additionally, multiple full-body customizable avatars can exist within the VR environment. Each user's avatar can be recognized by other VR system users in the shared multi-player VR world, since human body motion is a unique and the avatars can have recognizable biometric identifiers, even without being an exact replica of the live human users.

Full body avatars can present unique challenges, since no single avatar body can represent the wide range of human users. Scaling is not a solution, since a short person is not simply a proportionally reduced version of a taller person. It may only be possible to create proper avatar scaling by ratios of the lengths of each user's limbs and torso. Simply creating a scaled avatar does not itself lend to the enhanced sense of realism in VR. The VR processor must also display the movements of the avatar accurately, and in real time, with the real physical motions of the user in the VR apparatus in order to give the users the sense of true VR environment immersion. In order to allow the processor to enable the avatar to recreate the human motion accurately, the processor must have positional inputs in enough places on the human body that the motion control software can extrapolate the motion of human by reverse-engineering those positions in such a way that an unambiguous positional likeness of that human can be generated as the displayed avatars.

The processor can display the avatar movements that match its user's real motions in real time, at what the user perceives as a 1:1 scale. This is done through the process of inverse kinematics, which translates six points of motion of the user into a digital skeleton. The six positions are determined through a form of optical tracking, which accurately determines both the trackers' location in space and rotation on three axes. The six body tracking positions can include: two hands, two feet, one head and one tracker located on the user's back, midway down their spine, though this could as easily be positioned at the user's chest. The trackers that capture the positions of the user's hands and feet are mounted to the grip and foot binding end effectors of the movable armatures of the machine, and not to the user. While in use, the user's hands grip the hand grip end effectors, and their feet remain affixed to the foot bindings at the lower two end effectors. In this way, those trackers mounted to the end effectors (hand and feet UIs) move synchronously with the hands and feet, and can be accurately offset to determine the correct location of the user's hands and feet. The processor can display the movements of full body avatars, based on the six point tracking of the user in the VR apparatus and real-time motion of these body tracking points.

In other embodiments, the VR system can utilize additional tracking points on the user's body that can include the knees, elbows and shoulders. By using more body track points the processor can more accurately display the user's avatar. In an embodiment, the user's body tracking points can be optical high contrast markers which are placed on the designated points of the user's body. When the user is using the VR apparatus, the markers are visible to multiple cameras mounted on or around the VR apparatus. The cameras can be coupled to a processor which can use triangulation processing such as photogrammetry to determine the locations of each of the markers in a three-dimensional space. Alternatively, in other embodiments, the cameras can identify the locations of specific joints on the user's body based upon photographic and/or video images of the VR system user. By viewing the body movements, the bending of the limbs can be detected and the positions of the joints can be identified these identified locations can be used for the body tracking. In other embodiments, the body markers can be electronic devices which Since the underlay skeleton of the avatar is scaled to the proportions of the user's body markings, the position of any tracker determines the bend angle between that tracker and the adjacent body part. For example, if only the right hand moves, but the five remaining trackers do not, then the VR processor can determine that the elbow joint must have changed to enable this new detected body marker position, and this data can be interpreted by the processor and the avatar's skeleton can be updated on the displayed avatar accordingly. Since the digital skeleton includes built-in motion limitations at every joint based on the human motion constraints of each joint, the resulting direction and angle of those two arm bones is further refined so that the VR processor can accurately recreate the original human body motion on the visual display.

In an embodiment, the avatar displayed by the VR processor can be scaled to any user's proportions, in order to create an accurate illusion that they have been accurately integrated into the VR environment settings. To do this, the VR processor can determine the height of the user's eyes from the floor, because all system users are wearing VR headsets over their eyes and the locations of the VR headsets can be measured, and the floor location is known. Once the user's height from foot/ground surface to eye (VR headsets) is known, every other proportion can be determined by proportional relationship based on human factors charts. For example, in general, the length from a user's wrist to elbow is approximately 17% the distance of ground-to-eye on most humans. Other body dimensions can be calculated by the VR processor in a similar proportional manner based upon average or ranges of normal body proportions.

The proposed invention creates an avatar for the user, based on the interpretation of the user's height of their eyes, which can be unambiguously determined by their VR headset position. The height of the eyes can then be divided by various known denominators based on human statistical proportions so that the length of every segment of every limb is determined by the VR processor. The avatar templates used by the VR processor therefore do not simply scale to change size, but apply each of these proportions to determine the distance between the joints in the limb segments. To change size, each of the avatar's limb segments telescope in a sliding motion together or apart, changing in length as needed to achieve the intended length between the adjacent joints. Once at the appropriate length, that limb segment length remains fixed to that user's avatar displayed by the VR processor.

Figure 45:
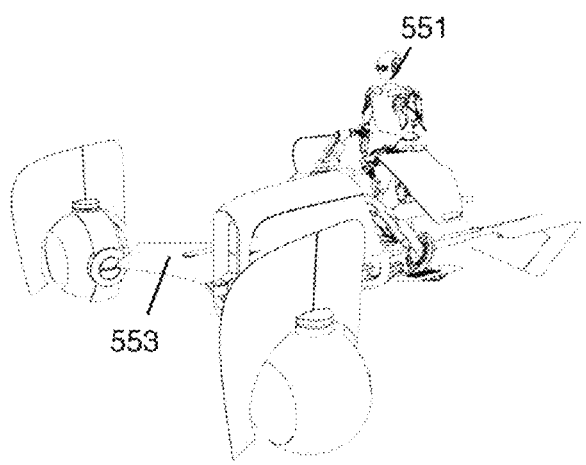
FIG. 45-48 illustrate embodiments of VR avatars interacting with VR objects in VR environments.

Given these proportions, the avatar's long limbs can scale, since each long bone comprises two telescoping parts designed to allow such scaling. Since the hands, feet, head and torso of the user are accurately tracked in positional and rotational motion and location, a wide variety of avatars may be mapped to the same tracking positions, giving the user the sense that they have transformed into other human or non-human forms. The avatars can match the appearance of the user or be completely customizable by the user. The avatar be designed by the user through the VR processor and stored in a memory coupled to the VR processor. An avatar may take any visual shape and appearance. The appearance may depend upon the context of the VR environment. For example, a middle ages VR environment may utilize knight in armor avatars and a futuristic science fiction VR environment ca utilize robot or alien being avatars. The VR processor can also create avatars that could also take the form of a primate, with simian proportions for the body, as long as the hands, feet, head and torso remain in the same locations. In still other embodiments, the VR process can allow the users' avatars to become a snowman, a cluster of rocks, a cloud, a swarm of bees, folded origami, among others. FIG. 45 shows a VR display third person view of a VR display of a user's avatar 551 riding a flying vehicle 553 where the avatar is standing on a vehicle platform and holding the vehicle controls. The VR processor can be configured to cause the VR apparatus to simulate the movement of the flying vehicle in the VR display.

Virtual and haptic experiences for fitness, realism, gaming, etc. have been created. In order to create a VR visualization display that simulates a human performing a specific activity, that activity device must be virtually created either as a VR likeness of the activity device, or as a dissimilar virtual device that is similar in physical functionality. For example, a user might ride a stationary bicycle, but through their VR headset, they perceive themselves as an athlete riding a racing bicycle through the Alps among other racers in a VR environment. In other embodiments, the VR system can create science fiction VR environments using real exercise equipment. A user exercising on a real rowing machine may appear to the user in a VR display to be a spaceship traveling through asteroids at a pace determined by the pace of real rowing exercise machine. The VR system can have a sensor on the real rowing machine that can detect the speed to the rowing machine which can be used by the VR processor to control the speed of the spaceship on the VR display.

Figure 46:
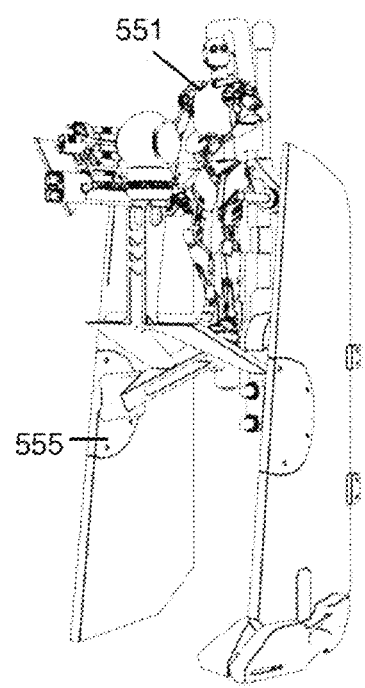

In another example, the user may use a stationary bicycle while wearing a VR headset to distract from the tedium of stationary riding. The stationary cycling activity can be limited to the single pedaling motion of that real-world machine and the pedaling speed of the stationary bicycle can be detected by a sensor and the speed data can be transmitted to the VR processor which can display a VR environment where a virtual bicycle or other VR object can be displayed that moves in a manner that is proportional to the pedaling speed of the stationary bicycle. FIG. 46 illustrates an embodiment of a VR display showing an avatar 551 pedaling a VR machine 555 with the movements of the VR avatar corresponding to the detected movement of an actual user on a stationary bicycle.

This single real exercise machine can be problematic because it only allows a user to perform one or a limited number of movements. In order to offer a full-body workout, multiple user movement machines must be used. This can require moving the user from a first machine to a second machine. The second machine may also require donning and doffing and setup of the VR equipment for each additional real machine prior to use by the user. Furthermore, the mechanical machine must be set to the correct ergonomic position for each user in order to avoid harm.

In order to overcome the problem of switching machines for different user movements, the inventive system can use Mechs as interstitial intermediary devices which are intermediary VR devices that translate the user's actions into believable VR world activities. The proposed invention can be a substantial improvement over traditional real exercise machine approaches in that the Mechs can create various virtual intermediary devices through the described VR apparatus that is controlled by a VR processor. With this system, the user doesn't need to move to a different movement machine when different movements are being detected. The Mech can be any virtual machine that requires the human's physical input to actuate. The human motion may include the user moving their arms up and down, away from the body and toward, squats, leg lifts, cross-country ski motion, cycling leg rotations, running, or any number of motions that would typically be found in a fitness environment. The VR machine and processor create specific force feedback in order to simulate the forces that a user might expect, if the virtual machine were real. By creating a fictitious machine in the virtual world, the VR machine and processor are able to engage the user in an activity with a heightened sense of realism and engagement, which drives greater compliance with an ongoing fitness regimen.

As discussed, the VR machine can allow or prevent movements of the users arms and legs. In an embodiment, the VR machine can simulate cycling by allowing the leg armatures to only allow the leg UIs to move in a coordinated circular rotational movement where each leg UI rotates in a circular motion that can have a 175 mm radius where each leg UI is offset by 180 degrees from the other leg UI. If the user attempts to move outside of a circular movement or the leg UIs are not coordinated, the VR processor can prevent these movements that do not match with a real machine movement and provide force feedback to simulate the rotational movement based upon force transducers in the leg (and arm) UIs. For example, the VR machine can only allow the foot UIs to move within parallel circular low or essentially zero resistance paths within the VR volume that simulates pedals at the ends of bicycle crank arms. If the user attempts to move the foot UIs outside the circular path the VR machine will prevent this movement. This circular movement If a user pedals in one rotational direction with the left foot with a first force and simultaneously attempts to pedal in the opposite rotational direction with the right foot with less force, the VR machine will rotate the foot UIs in the direction that the user has applied the most force which is the left foot UI direction. However, the VR apparatus will measure the left foot force and the right foot force. The VR apparatus will then resist the left foot force with the opposite measured right foot force and UI will also apply the measured left foot force to the right foot UI. When the user has completed cycling, the VR system can then use a Mech to transition into a different body movement such as getting off or the VR bicycle, walking through a VR environment to a VR boat, and then rowing in the VR boat. The Mechs can be experienced in first person or third person through the user's avatar. The virtual mechanical devices in the VR apparatus provide a gaming experience that gives the user a sense of interacting with a machine, both visually, audibly, and due to the haptic feedback coming from their motion. In these cases, the user's motion is constrained into a specific direction or axis, intended to provide the most effective fitness results.

The mechs can be controlled by the VR system to the body size proportions of the user. Since the user's height is known, then the locations of elbows, hips, knees, etc. is also known. Therefore, the mech can self-scale proportionally so that its sliding components align with the known, ideal location for the user's fitness interest. For example, if the user's VR Avatar appears to be driving a tractor, the VR system can set the height of the virtual grips to an ideal location for the user's fitness, based on their physiology and proportions. The VR system can automatically adjust the VR apparatus for any user's physical dimensions.

The Mechs can also be used as an intermediary device that improves the quality of user fitness by allowing the VR apparatus machine to set various heights and motion limits to the specific settings required for the individuals' unique body proportions. Each virtual mech scales and adjusts the virtual 'tracks' and 'pistons' and other simulated components in such a way that they position the user accurately for the safest and most effective motions, avoiding hyperextension of the user's limbs or any other potentially harmful variation in motion of the VR apparatus.

In an embodiment, the VR system can also be configured to provide virtual intermediary devices that may take the form of hand-held VR objects, such as a paddle or a sword in the described VR display and environment. The VR processor is able to make such a hand-held VR device physically simulate contact with water or an opponent by applying a designated type of force feedback to that activity by applying resistance to the armatures and hand/feet UIs. A virtual paddle, for example, will feel resistive pressure against a paddling motion only while pulling the blade of the paddle through virtual fluid such as water or other liquid substances. However, if the VR processor determines that the blade of the paddle is only in virtual air and not within the virtual water, the VR processor will control the hand UIs to not apply pressure when the paddle moves through air between strokes.

Figure 47:
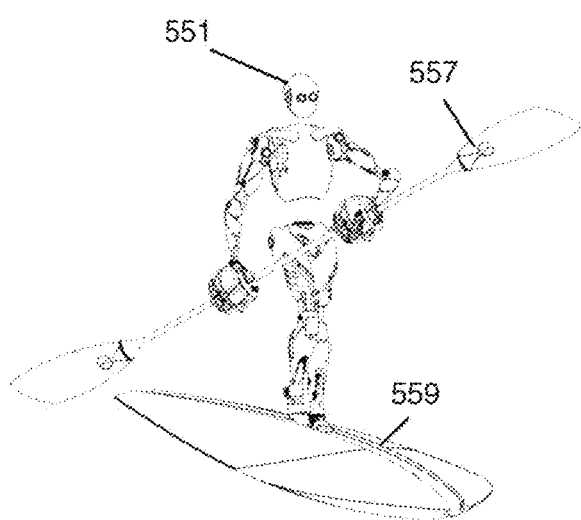

FIG. 47 illustrates an avatar 551 with a VR paddle 557 standing on a VR paddleboard 559 displayed on a VR display worn by a system user. The VR apparatus does not provide resistance in the illustrated position other than the gravitational forces on the hands to simulate the weight of the VR paddle 557 because the paddle blade is not in the virtual water. Similarly, if a user pulls the VR paddle 557 to the left or right with the right hand UI, this force will be detected by the VR machine and the VR processor can transmit a corresponding left or right force to the left hand UI and maintain a fixed distance between the left hand UI and the right hand UI. The VR processor can also apply a water resistance force to the left foot armature and the right foot armature wherein the water resistance force is proportional to a speed of the VR paddle board through the VR body of water. In this example, the VR apparatus provides resistances to user's movements. In contract, other UI simulations can have full stop rather than movement resistance. For example, a VR object can be a VR sword or striking weapon, which will stop all motion immediately upon impact of the VR object against a solid VR object, simulating the sensation of a strike.

As discussed, the resistance applied to the motion of the armatures may be set by the software so that it simulates the real-life experience as well as numerous enhanced capabilities. For example, with reference to FIG. 48, the user's avatar 551 can utilize a VR flying apparatus 560 which can provide the avatar 551 with the ability to fly within the VR environment. The VR flying apparatus 560 can have a support surface for the feet and hand controls 562 that the avatar can grasp and manipulate to control the VR flying apparatus 560 in the VR environment.

As discussed, the VR apparatus can have force and/or pressure sensors built into the armatures and/or UIs. Speed of the UIs can be determined by the motion trackers can monitor the forces and speed exerted during the activity. The software can then adjust that resistance based on the user's fitness expectations, or safety considerations designed into the software. Because the VR apparatus can have force sensors and the VR processor can detect the forces applied by the user to during the VR movements. The VR processor can be configured to 'learn' and adapt the movement resistance as the user's strength improves or decreases or based upon coach, trainer, and/or physical therapist recommendations. If a user has specific physical fitness goals, the VR system can be configured to gradually increase the force required to perform the VR exercises so that the user's required exertion can increase and the resulting strength can improve.

The ability to set both the positions of the movable armatures, the range of their motions, and their force resistance in any direction also makes the device ideal for physical therapy and rehabilitation. Physical Therapy often suffers from the user either doing a rehab motion incorrectly, often with the wrong amount of force, or the wrong position. The VR system can guarantee that both the position/motion and force are correct for their particular stage of rehabilitation, and can adapt as needed, based on their progress.

A further value of the VR system is compliance monitoring of physical therapy and rehabilitation movements. Patients may not comply with the physical regimen as prescribed by physical therapist or other medical professionals. Non-compliance can be due to boring movement, time consuming, and painful movements. Because physical therapy can be performed without supervision or monitoring, a doctor will not know if the patient has reduced or skipped the prescribed physical therapy regimen. The VR system can be used to improve the physical therapy regimen which will be more entertaining and engaging in a VR environment. The VR system can entice the patient to perform the specified physical therapy and commit the required time. The prescribing doctor or physical therapist may also monitor the progress of the patient's strength and endurance through software communications between the VR apparatus and a computing device of the doctor. My monitoring the patient's activities and communicating with the patient, the doctor or other medical professional can have much better knowledge of patient compliance and hopefully determine that the progress is proceeding as expected. A sudden change in the force feedback metrics transmitted from the VR apparatus to the computing device of the medical professional may indicate a noteworthy change in the patient's condition.

The VR system can also function as a competitive or solo sport platform. In a competitive sport environment, users may compete in a setting with simulated physics that function outside the parameters of the physical world, in order to make a more compelling immersive VR environment experience. One example may be in the ability to create an illusion that a competitor may experience a gravity in a direction different from other VR users. In such a case, that user might feel gravity in the familiar, downward direction. But their visual and haptic experience could indicate to them that their VR surroundings are different from the expected real-world gravitational forces. For example, the user can configure the VR system in an opposite gravitational direction with the visual display set so that the user experiences an opposite upward gravitational force. In this opposite gravitational configuration, the user (or user's avatar) may climb the Eiffel Tower from the top downward to the bottom with the VR environment completely inverted. The user can stand in the VR environment with the feet up and head down so that the VR experience requires looking up to see Paris above them, while other virtual climbers in the same VR environmental simulation can have a normal gravitational simulation. From the VR display, these other VR users (or users' avatars) can climb from the bottom to the top of the Eiffel Tower moving past the user in an opposite direction and opposite body orientation.

The VR system can also be used for performing interactive VR games between system users. In an embodiment, the VR game can include special powers such as improved VR strength, altered gravitational forces, and powers applied to other VR game users. For example, in a VR game, a player may acquire the ability 'freeze' the VR motion of a competitor, effectively locking all motion of that person's VR apparatus. The 'frozen' user would see no motion from their avatar in their VR display, and the user would experience this frozen state physically because he or she would be unable to move hands or feet due to locked armatures and locked hand and feet UIs.

In another embodiment, a VR game competitor could virtually dismember an opponent. This may occur due to a simulated VR combat injury. This would be simulated by the disappearance, for example, of the player's right arm from the VR display, and all haptics being disengaged for the user's right arm in the VR apparatus can be locked so that while the user has a real (uninjured) right arm, the right arm UI in the VR apparatus no longer moves and no longer has the ability to contribute to balance or any other real physical or VR activity.

Figure 48:
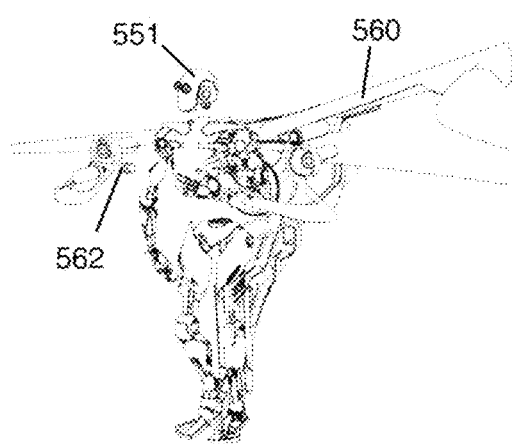
Figure 49:
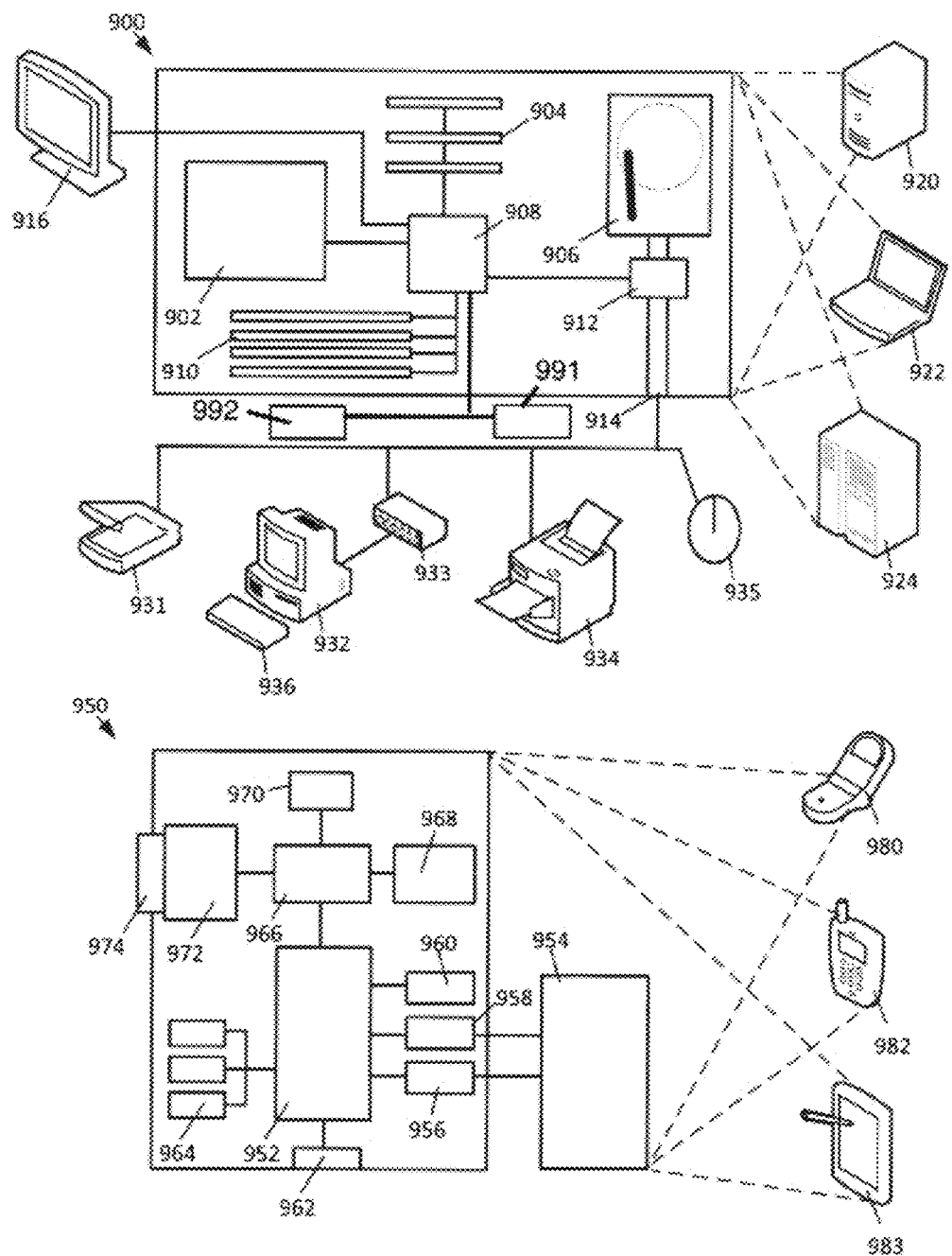
FIG. 49 illustrates an embodiment of a computer system used with a VR system.

FIG. 48 shows an example of a generic computer device 900 and a generic mobile computer device 950, which may be used to implement the processes described herein, including the mobile-side and server-side processes for installing a computer program from a mobile device to a computer. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to bus 914 and storage device 906. Each of the components processor 902, memory 904, storage device 906, high-speed interface 908, high-speed expansion ports 910, and low speed interface 912 are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple busses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in a information carrier. The computer program product may also contain instructions that, when executed, perform one or more methods, such as those described above. The information carrier may be a non-transitory computer- or machine-readable storage medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and port 914. The low-speed expansion port 914, which may include various communication ports (e.g., USB, Bluetooth, Ethernet, wireless Ethernet), may be coupled to one or more input/output devices, such as a keyboard 936 in communication with a computer 932, a pointing device 935, a scanner 931, or a networking device 933 such as a switch or router, e.g., through a network adapter. In the illustrated example, the high speed controller 908 can be coupled to a visual display 992 which can display a visual VR environment generated by the processor 952. The visual display 992 can be part of a VR headset worn by a user of the described VR system. The external interface 962 can also be coupled to the VR movement apparatus which can provide haptic VR environments which are coordinated and synchronously output with visual VR environments as described above.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a Microdrive, solid state memory or other device, to provide additional storage. Each of the components computing device 950, processor 952, memory 964, display 954, communication interface 966, and transceiver 968 are interconnected using various busses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used. The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, a tablet computer 983 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A virtual reality (VR) system comprising:
a VR apparatus for providing a haptic VR environment, the movement apparatus comprising:
a frame;
a left hand armature coupled to the frame and a left hand user interface (UI) wherein the left hand armature restricts the movement of the left hand UI;
a left hand force sensor coupled to the left hand UI;
a right hand armature coupled to the frame and a right hand UI wherein the right hand armature restricts the movement of the left hand UI;
a right hand force sensor coupled to the right hand UI;
a left foot armature coupled to the frame and a left foot UI wherein the left foot armature restricts the movement of the left foot UI;
a left foot force sensor coupled to the left foot UI;
a right foot armature coupled to the frame and a right foot UI wherein the right foot armature restricts the movement of the right foot UI;
a right foot force sensor coupled to the right foot UI;
a VR display for displaying a VR environment;
a VR processor running a VR program wherein the VR processor receives user force data from the left hand force sensor, the right hand force sensor, the left foot force sensor, and the right foot force sensor, and the VR processor transmits haptic VR object data to the left hand armature, the right hand armature, the left foot armature and the right foot armature and transmits visual VR environment data to the VR display; and
a memory coupled to the VR processor for storing statuses of blocks in a VR volume wherein the VR processor identifies the block locations of the left hand UI, the right hand UI, the left foot UI, and the right foot UI within the VR volume and the VR processor controls the left hand armature, the right hand armature, the left foot armature, and the right foot armature to prevent the left hand UI, the right hand UI, the left foot UI, and the right foot UI from moving from free blocks to solid blocks in the VR volume.

2. The system of claim 1 wherein the VR object data includes a VR paddle and a paddle force detected by the left hand force sensor causes the VR processor to apply a force to the right hand armature.

3. The system of claim 2 wherein the VR object data includes a VR body of water and the VR processor applies a left hand resistance force to the left hand armature and a right hand resistance force to the right hand armature when the VR paddle contacts the VR body of water.

4. The system of claim 2 wherein the VR object data includes a VR paddle board on the VR body of water and the VR processor applies a water resistance force to the left foot armature and the right foot armature wherein the water resistance force is proportional to a speed of the VR paddle board through the body of water.

5. The system of claim 2 wherein the VR object data includes a VR paddle board on the VR body of water and the VR processor applies a water turbulence motion to the left foot armature and the right foot armature wherein the left foot armature and the right foot armature move vertically in cyclical waves.

6. The system of claim 2 wherein the VR object data includes a VR vehicle wherein the VR processor displays the VR vehicle moving at a speed in the VR environment that is proportional to a rotational speed of the left hand UI and the right hand UI.

7. The system of claim 1 wherein the VR object data includes a first VR foot pedal and a second VR foot pedal wherein the free blocks in the VR volume form two parallel circular paths in the VR volume.

8. The system of claim 1 wherein the VR object data includes a VR bicycle and a force detected by the left foot force sensor causes the VR processor to apply a force to the right foot armature.

9. The system of claim 1 wherein the VR object data includes a VR pedal vehicle wherein the VR processor displays the VR pedal vehicle moving at a speed in the VR environment that is proportional to a rotational speed of the left foot UI and the right foot UI.

10. A virtual reality (VR) system comprising:
a VR apparatus for providing a haptic VR environment, the movement apparatus comprising:
a frame;
a left hand armature coupled to the frame and a left hand user interface (UI) wherein the left hand armature restricts the movement of the left hand UI;
a left hand force sensor coupled to the left hand UI;
a right hand armature coupled to the frame and a right hand UI wherein the right hand armature restricts the movement of the left hand UI;
a right hand force sensor coupled to the right hand UI;
a VR display for displaying a VR environment;
a VR processor running a VR program wherein the VR processor receives user force data from the left hand force sensor, the right hand force sensor, the left foot force sensor, and the right foot force sensor, and the VR processor transmits haptic VR object data to the left hand armature, the right hand armature, the left foot armature and the right foot armature and transmits visual VR environment data to the VR display; and
a memory coupled to the VR processor for storing statuses of blocks in a VR volume wherein the VR processor identifies the block locations of the left hand UI, the right hand UI, the left foot UI, and the right foot UI within the VR volume and the VR processor controls the left hand armature and the right hand armature to prevent the left hand UI and the right hand UI from moving from free blocks to solid blocks in the VR volume.

11. The system of claim 10 wherein the VR object data includes a VR paddle and a paddle force detected by the left hand force sensor causes the VR processor to apply a force to the right hand armature.

12. The system of claim 11 wherein the VR object data includes a VR body of water and the VR processor applies a left hand resistance force to the left hand armature and a right hand resistance force to the right hand armature when the VR paddle contacts the VR body of water.

13. The system of claim 10 wherein the VR object data includes a solid stationary object and the VR processor applies a left hand resistance force to the left hand armature to simulate virtual contact of the left hand UI with the solid stationary object and a right hand resistance force to simulate virtual contact with the solid stationary object to simulate virtual contact of the right hand UI with the solid stationary object.

14. A virtual reality (VR) system comprising:
a VR apparatus for providing a haptic VR environment, the movement apparatus comprising:
a frame;
a left foot armature coupled to the frame and a left foot UI wherein the left foot armature restricts the movement of the left foot UI;

a left foot force sensor coupled to the left foot UI;

a right foot armature coupled to the frame and a right foot UI wherein the right foot armature restricts the movement of the right foot UI;

a right foot force sensor coupled to the right foot UI;

a VR display for displaying a VR environment;

a VR processor running a VR program wherein the VR processor receives user force data from the left hand force sensor, the right hand force sensor, the left foot force sensor, and the right foot force sensor, and the VR processor transmits haptic VR object data to the left hand armature, the right hand armature, the left foot armature and the right foot armature and transmits visual VR environment data to the VR display; and a memory coupled to the VR processor for storing statuses of blocks in a VR volume wherein the VR processor identifies the block locations of the left foot UI and the right foot UI within the VR volume and the VR processor controls the left foot armature and the right foot armature to prevent the left foot UI and the right foot UI from moving from free blocks to solid blocks in the VR volume.

15. The system of claim 14 wherein the VR object data includes a VR paddle board on the VR body of water and the VR processor applies a water resistance force to the left foot armature and the right foot armature wherein the water resistance force is proportional to a speed of the VR paddle board through the body of water.

16. The system of claim 14 wherein the VR object data includes a VR paddle board on the VR body of water and the VR processor applies a water turbulence motion to the left foot armature and the right foot armature wherein the left foot armature and the right foot armature move vertically in cyclical waves.

17. The system of claim 14 wherein the VR object data includes a VR vehicle wherein the VR processor displays the VR vehicle moving at a speed in the VR environment that is proportional to a rotational speed of the left foot UI and the right foot UI.

18. The system of claim 14 wherein the VR object data includes a first VR foot pedal and a second VR foot pedal wherein the free blocks in the VR volume form two parallel circular paths in the VR volume.

19. The system of claim 14 wherein the VR object data includes a VR bicycle and a force detected by the left foot force sensor causes the VR processor to apply a force to the right foot armature.

20. The system of claim 14 wherein the VR object data includes a VR pedal vehicle wherein the VR processor displays the VR pedal vehicle moving at a speed in the VR environment that is proportional to a rotational speed of the left foot UI and the right foot UI.

\* \* \* \* \*